United States Patent

Kobayashi et al.

[11] Patent Number: 6,014,649
[45] Date of Patent: Jan. 11, 2000

[54] ATM OPERATION SUPPORTING SYSTEM

[75] Inventors: Norio Kobayashi; Kenichi Chigira; Hiroyuki Ishijima; Junko Ohshima; Hiroko Takahashi; Hiroe Tsuchihashi; Syuichi Tsubura; Hiroshi Kawada, all of Maebashi, Japan

[73] Assignee: Fujits Limited, Kawasaki, Japan

[21] Appl. No.: 08/734,789

[22] Filed: Oct. 22, 1996

[30] Foreign Application Priority Data

Feb. 29, 1996 [JP] Japan .................................. 8-043824

[51] Int. Cl.[7] .............................. G06F 17/60; G06K 7/10; G07D 7/00
[52] U.S. Cl. .................................... 705/43; 705/7; 705/42
[58] Field of Search .............................. 235/379; 705/43, 705/42, 7

[56] References Cited

U.S. PATENT DOCUMENTS

| 4,625,870 | 12/1986 | Nao et al. ........................... 235/379 X |
| 4,988,849 | 1/1991 | Sasaki et al. ........................... 235/379 |
| 5,152,512 | 10/1992 | Yoshida et al. ........................... 271/3.1 |
| 5,313,050 | 5/1994 | Hiroki et al. ........................... 235/379 |
| 5,389,773 | 2/1995 | Coutts et al. ........................... 235/379 |
| 5,436,435 | 7/1995 | McMillan ................................. 235/379 |
| 5,563,393 | 10/1996 | Coutts ...................................... 235/379 |
| 5,593,149 | 1/1997 | Kimura et al. ........................ 235/379 X |
| 5,606,157 | 2/1997 | Awatsu et al. ........................... 235/379 |
| 5,799,288 | 8/1998 | Tanaka et al. ............................. 705/43 |

FOREIGN PATENT DOCUMENTS 2 244 838   12/1991   United Kingdom .

OTHER PUBLICATIONS

"Automatic Transaction Facility" IBM Technical Disclosure Bulletin, vol. 28, No. 3, Aug. 1, 1985, p. 1032 XP002058709.

Primary Examiner—Allen R. MacDonald
Assistant Examiner—Pedro R. Kanof
Attorney, Agent, or Firm—Armstrong, Westerman, Hattori, McLeland & Naughton

[57] ABSTRACT

An ATM operation supporting system for managing the number of bills in a plurality of ATMs. The system includes a mobile cart, a counting section, and a control section. The mobile cart has a handling mechanism capable of installing a bill cassette into each ATM and removing the bill cassette from each ATM. The mobile travels to each ATM and installs and removes the bill cassette using the handling mechanism, thereby performing bill replenishment/collection operation for each ATM. The counting section counts the number of bills stored in the bill cassette which is directly or indirectly loaded onto the mobile cart by a clerk in charge. The control section controls the bill replenishment/collection operation performed by the mobile cart such that the numbers of bills in the ATMs are balanced. The ATM operation supporting system can manage the number of bills in an ATM, thereby realizing efficient utilization of cash as well as easing the operational burden on a clerk in charge.

22 Claims, 41 Drawing Sheets

FIG. 15

| ATM No. | PRIORITY LEVEL | | INSTRUCTION | NUMBER OF 10,000-YEN BILLS | NUMBER OF 1,000-YEN BILLS |
|---|---|---|---|---|---|
| 3 | HIGH | 1 | COLLECTION | 5000 | 1000 |
| 2 | | 2 | COLLECTION | 4000 | 3000 |
| 1 | | 3 | COLLECTION | 4000 | 2000 |
| 4 | | 4 | COLLECTION | 1000 | 5000 |
| 5 | | 5 | REPLENISHMENT | 5000 | 1000 |
| 7 | | 6 | REPLENISHMENT | 4000 | 3000 |
| 6 | | 7 | REPLENISHMENT | 4000 | 2000 |
| 8 | LOW | 8 | REPLENISHMENT | 1000 | 1000 |

FIG. 16

| CASSETTE No. | PRIORITY LEVEL | | COUNTED/ UNCOUNTED | LOADED ON MOBILE CART | NUMBER OF (10,000-YEN BILLS & 1,000-YEN BILLS) |
|---|---|---|---|---|---|
| 3 | HIGH | 1 | UNCOUNTED | | UNKNOWN |
| 2 | | 2 | COUNTED | ○ | 1000 |
| 1 | | 3 | COUNTED | | 1000 |
| 4 | LOW | 4 | COUNTED | | 1200 |

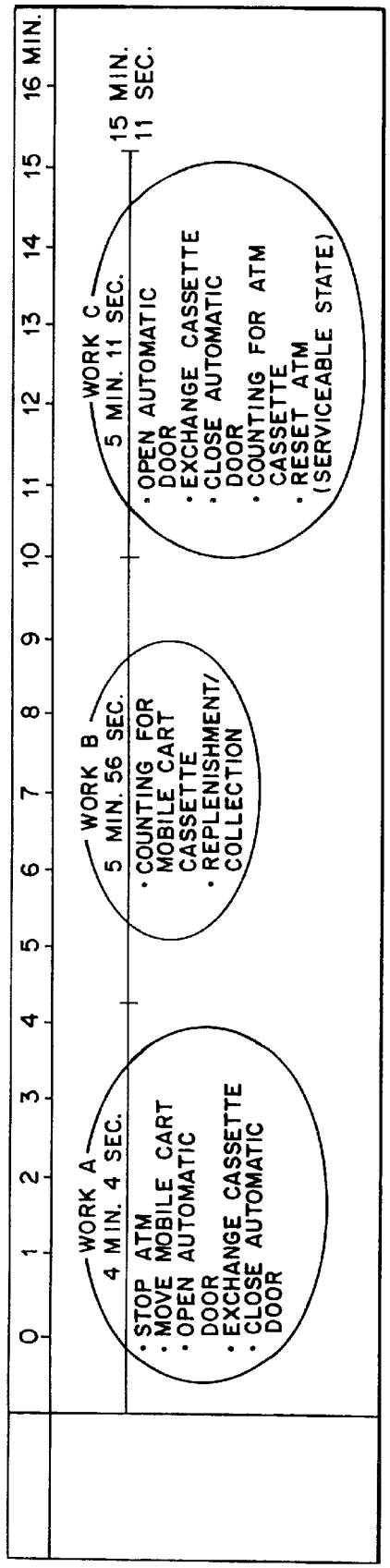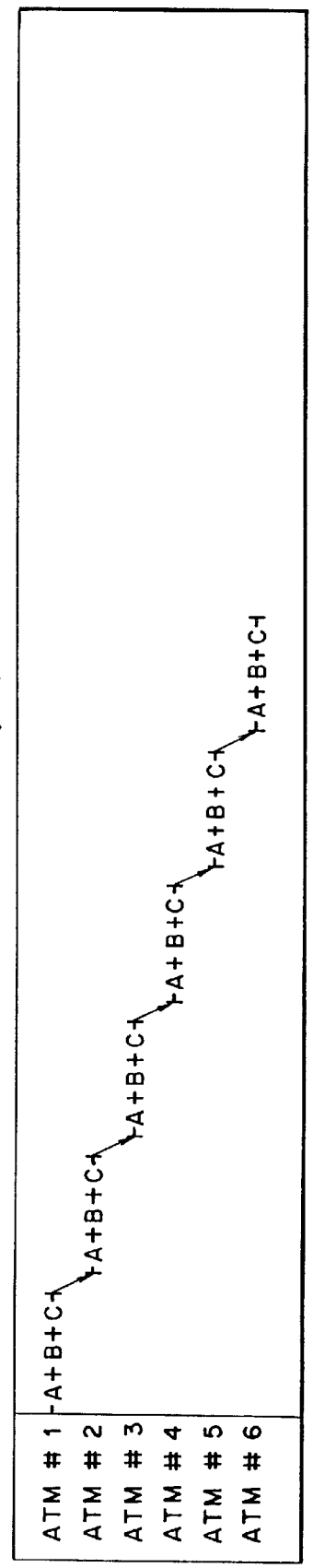

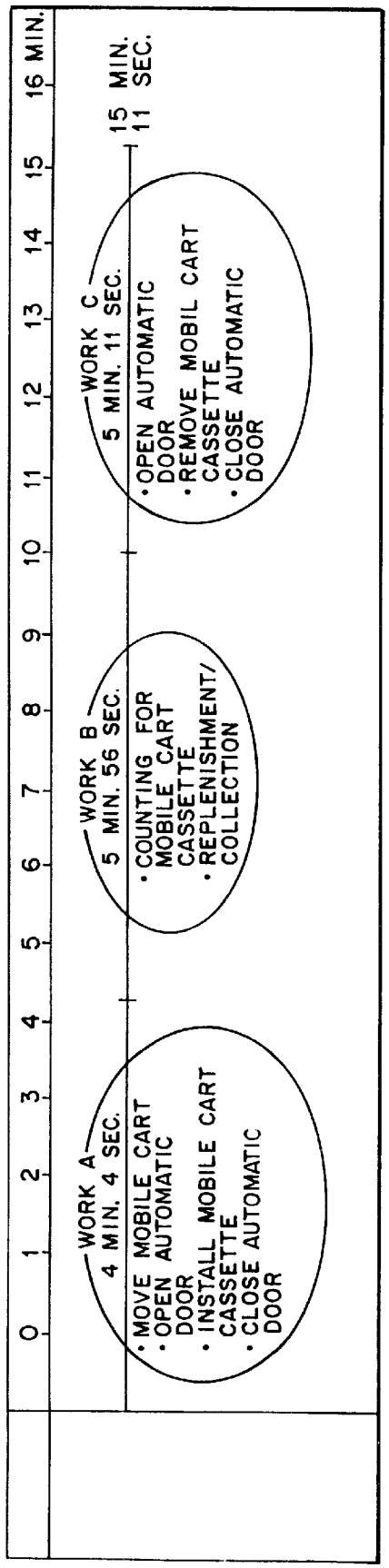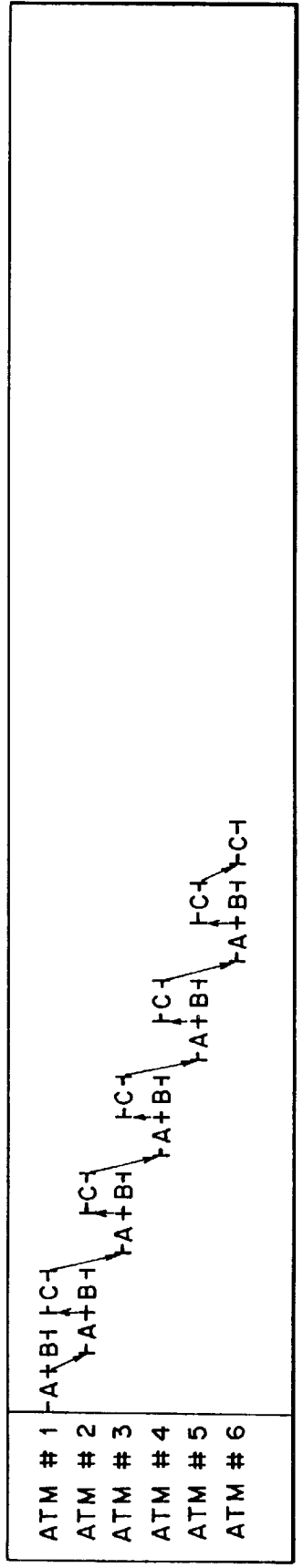

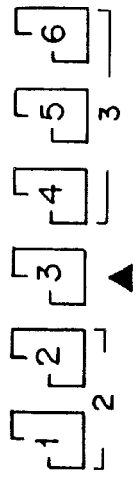
FIG. 42(a)  ONE ATM IS DESIGNATED (▲: MAINTENANCE ATM)
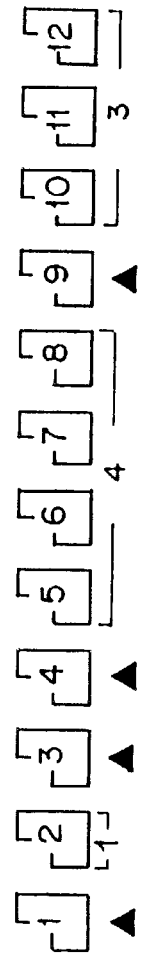
FIG. 42(b)  A PLURALITY OF ATMS ARE DESIGNATED (▲: MAINTENANCE ATM)
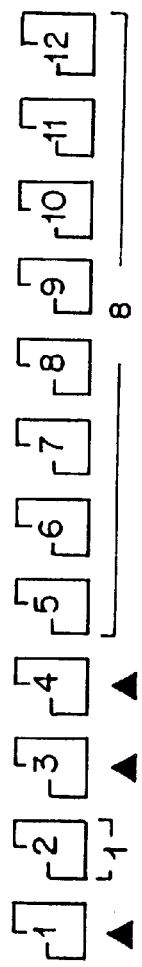
FIG. 42(c)  ATM HAVING UNDERGONE MAINTENANCE IS CANCELLED (▲: MAINTENANCE ATM)

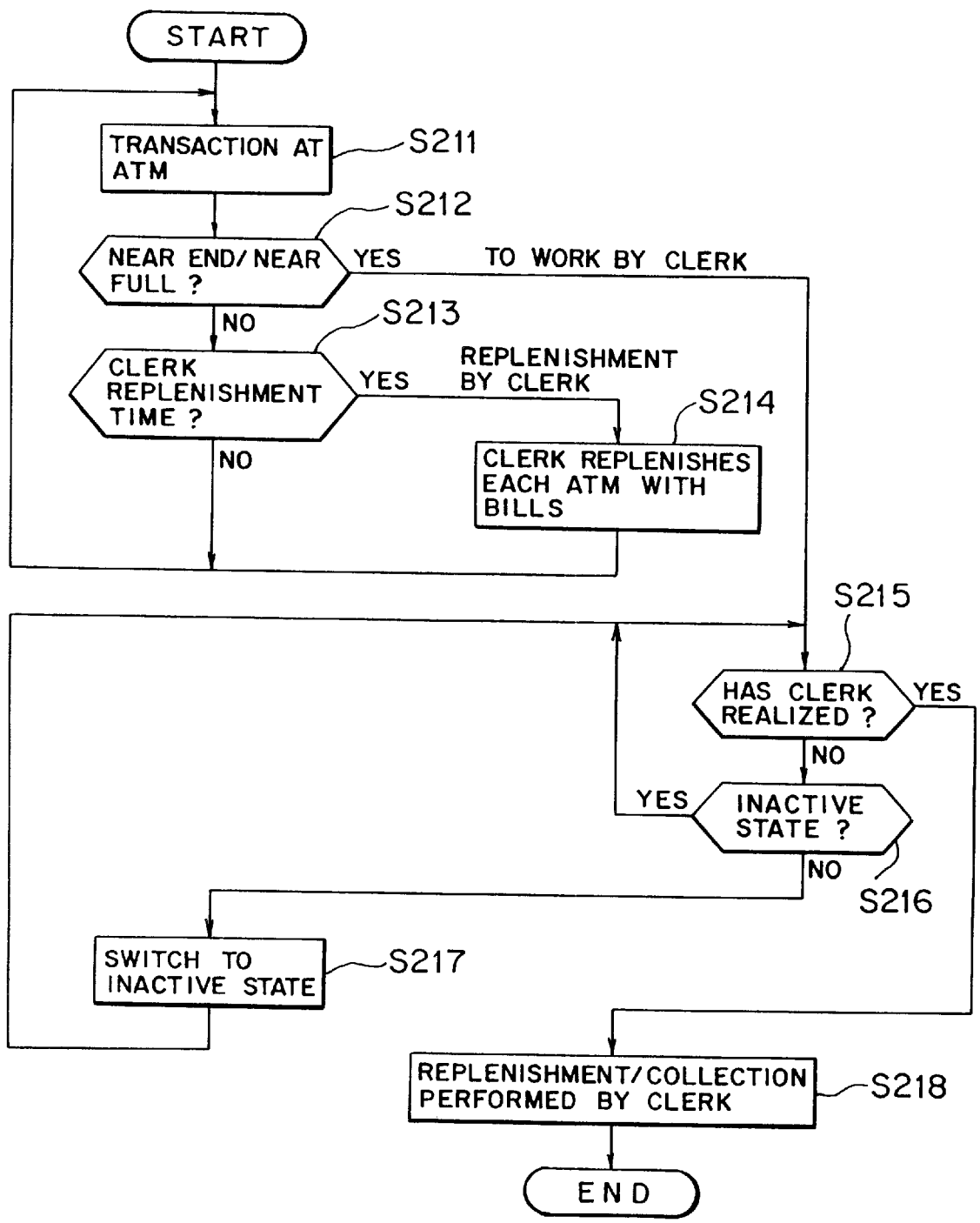

ATM OPERATION SUPPORTING SYSTEM

BACKGROUND OF THE INVENTION

(1) Field of the Invention

The present invention relates to an ATM operation supporting system for managing the number of bills (stock amount) in automatic-teller machines installed in a financial institution such as a bank to optimize an amount of money in each of the automatic-teller machines.

(2) Description of the Related Art

In general, a clerk in charge collects cash from automatic-teller machines [hereinafter referred to as ATM (Automatic Teller Machines) or an automatic machines] installed in a financial institution such as a bank, and replenishes the ATM with bills.

For example, in the case where the clerk in charge replenishes an ATM with bills, a sequence of operations (1) to (9), which will be described below, have to be performed. That is, (1) opening a back door, (2) switching the ATM to an inactive state, (3) removing a bill cassette, (4) installing a replenishing bill cassette into the ATM in lieu of the original bill cassette, (5) operating an operator control panel so as to replenish a stacker in the ATM with bills from in the replenishing bill cassette, (6) removing the replenishing bill cassette from the ATM, (7) installing the original bill cassette into the ATM, (8) switching the ATM to a transaction acceptable state, and (9) closing the back door.

The number of bills to be used for replenishing the ATM or the number of bills to be collected from the ATM, as well as the time to carry out a bill replenishment/collection operation, usually depend on the experience and intuition of the clerk. In practice, the clerk is called by the ATM at the time when the cash in the ATM runs short, and the clerk then replenishes the ATM with bills. In ATMs generally used, when the bill cassette (or an ATM cassette) is removed from the ATM while it is in the transaction acceptance state, an error will arise, which in turn results in an ATM failure. To prevent such a problem, the ATM is switched to an inactive condition, as previously described as step (2), when the bill cassette is removed from the ATM.

FIG. 43 (a flow chart: steps S211 to S218) shows the flow of processing to be executed before the clerk replenishes the ATM with bills or collects bills therefrom in the manner as previously described.

As shown in FIG. 43, when none of the ATMs are in a near-end or near-full state (a negative judgment is made in step S212) while the ATMs are performing transaction (step S211), and the current time is not the time for the clerk to replenish the ATMs with bills (a negative judgment is made in step S213), the processing returns to step S211 so as to allow the ATMs to continue performing ordinary transactions.

When the clerk realizes that the time has came to replenish the ATMs with bills (a positive judgment is made in step S213), that clerk replenishes each of the ATMs with bills according to the previously-described procedures (1) to (9) (step S214).

When a certain ATM enters either a near-end or near-full state (a positive judgment is made in step S212) and the clerk has realized it (a positive judgment is made in step S215) that clerk replenishes the ATM with bills according to the procedures (1) to (9) if the ATM is in a near-end state, or collects bills therefrom if the ATM is in a near-full state, performing both in substantially the same manner (step S218).

When a certain ATM enters a near-end or near-full state (a positive judgment is made in step 212), the clerk has not realized it (a negative judgment is made in step S215), and the ATM is not in an inactive state (a negative judgment is made in step S216), the ATM is automatically switched to an inactive state (step S217) and waits for a clerk until the clerk detects the near-end or near-full state of the ATM and replenishes the ATM with bills or collects bills therefrom.

The near-end state used herein means the state in which there is a risk of the execution of operations (i.e., a transaction) being hindered because of a shortage of bills in the ATM; namely, the state which requires a resupply of bills. In contrast, the near-full state used herein means the state in which there is a risk of the execution of operations (i.e., a transaction) being hindered because of the excessive storage of bills in the ATM; namely, the state which requires the collection of bills.

As described above, the clerk in charge conventionally manages the bills stored in the ATM, which results in a great burden on the clerk. Particularly, the burden on the clerk increases accordingly as the number of ATMs increases.

Where a plurality of ATMs are installed in an automatic machine area, each ATM has different amounts of received and withdrawn money. The ATMs from which a smaller amount of money has been withdrawn may have an increase in the amount of unused cash. To cope with such a situation, the clerk in charge also performs optimization of the amount of cash remaining in each ATM, which in turn results in a much greater burden on the clerk in charge.

Recently, various types of financial institutions have utilized an increased number of ATMs so as to perform transaction with customers, and larger amounts of cash have been handled by the ATMs. Under these circumstances, it has been desired to construct a system for supporting the operations of the ATMs without relying on the clerk in charge, so as to ease the operational burden on the clerk and to realize efficient utilization of cash.

SUMMARY OF THE INVENTION

The present invention has been conceived in view of the above-described problems, and an object of the present invention is to provide an ATM operation supporting system which can manage the number of bills in an ATM, thereby realizing efficient utilization of cash as well as easing the operational burden on a clerk in charge.

To this end, according to one aspect of the present invention, there is provided an ATM operation supporting system for managing the number of bills in a plurality of automatic-teller machines (hereinafter referred to as ATMs), the system comprising: a mobile cart having a handling mechanism capable of installing a bill cassette in and removing the bill cassette from each ATM, and adapted to travel to each ATM and to install and remove the bill cassette using the handling mechanism, thereby performing bill replenishment/collection operation; a counting section for counting the number of bills stored in the bill cassette which is directly or indirectly loaded onto the mobile cart by a clerk in charge; and a control section for controlling, based on the number of bills in each ATM and the number of bills stored in the bill cassette which have been counted by the counting section, the bill replenishment/collection operation performed by the mobile cart such that the numbers of bills in the ATMs are balanced.

By virtue of the ATM operation supporting system of the present invention, it becomes possible to manage the number of bills in the ATM and to perform bill replenishment/ collection operation using the mobile cart. As a result, it becomes unnecessary for the clerk in charge to perform bill replenishment/collection operation, which makes it possible to realize centralized management of cash in the ATMs and to appropriately manage the cash with a reduced amount of know-how. Consequently, the operational burden on the clerk in charge is significantly reduced. Further, it becomes possible to optimize the amount of cash stored in the ATM and the time to replenish the ATM with bills or collect bills therefrom. As a result, it becomes possible to considerably reduce the total amount of money stored in the ATM.

BRIEF DESCRIPTION OF THE DRAWINGS

FIG. 15 is a table which explains a method for determining the priority levels of ATMs to be subjected to a collective replenishment/collection operation according to the present embodiment;

FIG. 16 is a table which explains a method for determining a bill cassette to be set to the ATM according to the present embodiment;

FIGS. 19(a) and 19(b) are timing charts for explaining the collective replenishment/collection operation according to the present embodiment;

FIGS. 31(a) and 31(b) are timing charts for explaining the modification of the replenishment/collection operation according to the present embodiment;

FIGS. 42(a), 42(b), and 42(c) are schematic representations for explaining the exemplary selection of a specific controllable ATM by the group control workstation according to the present embodiment; and FIG. 43 is a flowchart for explaining the flow of processing to be carried out before the clerk in charge performs bill replenishment/collection operation.

DESCRIPTION OF THE PREFERRED EMBODIMENT

(a) Aspect of the Invention

With reference to the accompanying drawings, an aspect of the invention will now be described.

Figure 1:
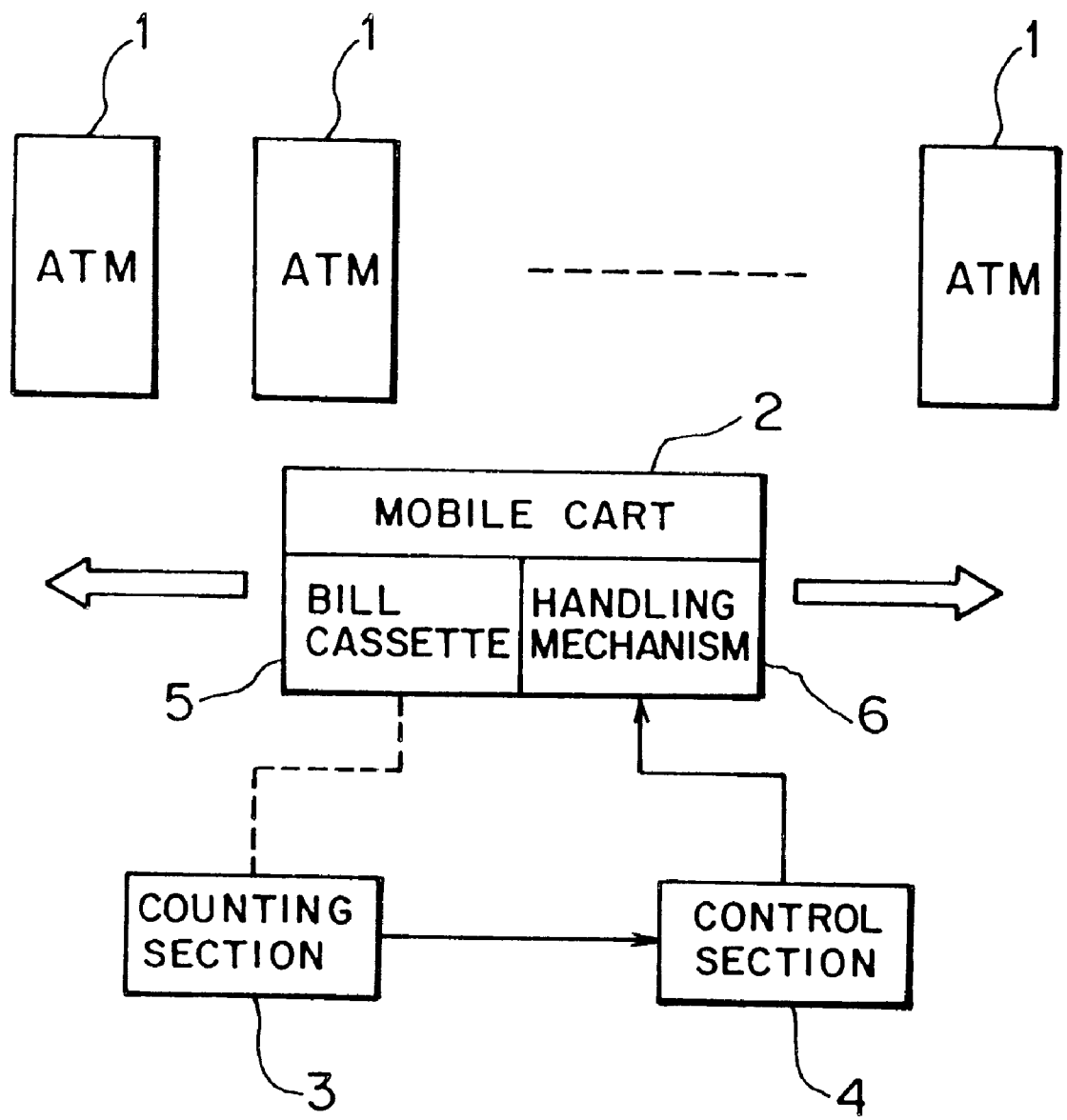
FIG. 1 is a block diagram showing an aspect of the present invention.

FIG. 1 is a block diagram showing the aspect of the present invention. An ATM operation supporting system of the present invention shown in FIG. 1 is adapted to manage the number of bills in a plurality of ATMs 1. The ATM operation supporting system comprises at least a mobile cart 2, a counting section 3, and a control section 4.

The mobile cart 2 is provided with a handling mechanism 6 for installing a bill cassette 5 into and removing it from each of the ATMs 1. The mobile cart 2 travels to each ATM 1 so as to install the bill cassette 5 into the ATM 1 and remove it from the ATM 1 using the handling mechanism 6, thereby performing a bill replenishment/collection operation.

The counting section 3 counts the number of bills in the bill cassette 5 which is directly or indirectly loaded onto the mobile cart 2 by a clerk in charge. The control section 4 controls the bill replenishment/collection operation performed by the mobile cart 2, on the basis of the number of bills in each ATM 1 and the number of bills in the bill cassette 5 counted by the counting section 3, in such a way that the numbers of bills in the ATMs 1 are balanced.

With the above-described configuration, it becomes possible to manage the number of bills in the ATM 1. Further, it becomes possible to perform the bill replenishment/collection operation for each ATM 1 using the mobile cart 2 under control of the control section 4 without help of the clerk, which operation has been conventionally carried out by the clerk.

Accordingly, in the ATM operation supporting system according to the present invention, it becomes possible to manage the number of bills in the ATM 1 and to perform the bill replenishment/collection operation using the mobile cart 2. As a result, it becomes unnecessary for the clerk in charge to perform the bill replenishment/collection operation, which makes it possible to realize centralized management of cash in the ATMs 1 and to appropriately manage the cash with a reduced amount of know-how. Consequently, the operational burden on the clerk in charge is significantly eased. Further, it becomes possible to optimize the amount of cash set in the ATM 1 and the time to replenish the ATM 1 with bills or collect bills therefrom. As a result, it becomes possible to considerably reduce the total amount of money set in the ATMs 1.

In this event, the counting function of one of the plurality of ATMs 1 may be used as the counting section 3. In other words, as a result of a bill cassette 5 being installed into the ATM 1 using the mobile cart 2, it becomes possible to count the number of bills in the bill cassette 5 using the counting mechanism of that ATM 1 without separately providing a special counting mechanism.

Accordingly, the use of the counting mechanism of the ATM 1 makes it possible to count the number of bills in the bill cassette 5 without separately providing a special counting mechanism, whereby the ATM operation supporting system can be constructed in a simplified manner.

The control section 4 may be provided with a collective replenishment/collection function, a periodical replenishment/collection function, an urgent replenishment/collection function, and a forced replenishment/collection function which will be described later.

The control section 4 controls the bill replenishment/collection operation performed by the mobile cart 2 such that the numbers of bills in the ATMs 1 are collectively balanced by means of the collective replenishment/collection function at the time when the clerk in charge directly or indirectly sets the bill cassette 5 on the mobile cart 2 or when a preset collective replenishment/collection time has come.

By virtue of the previously described collective replenishment/collection function, the bill replenishment/collection operation for the ATMs 1 is collectively carried out using the mobile cart 2, and the numbers of bills in the ATMs 1 are balanced. Consequently, the operational burden on the clerk in charge can be eased, and the amount of money stocked in an ATM area (automatic machine area) can be reduced. The collective replenishing function of the present invention allows the ATM 1 not to be replenished with bills after the bills stored in the ATM 1 has run short, but allows the ATM 1 to be previously replenished with the required amount of bills. As a result, the number of times the mobile cart 2 runs can be reduced, which in turn results in a longer life of the mobile cart 2. Further, it becomes possible to prevent the mobile cart 2 from hindering the clerk's jobs.

The periodical replenishment/collection function allows the control section 4 to constantly manage the number of bills currently being stored in each ATM 1, to periodically estimate the demanded number of bills in each ATM 1 on the basis of changes in the number of bills in each ATM 1, and to control the bill replenishment/collection operation performed by the mobile cart 2 in accordance with the demanded number of bills such that the numbers of bills in the ATMs 1 are balanced.

By virtue of the above-described periodical replenishment/collection function, the ATMs 1 from which a larger amount of money has been withdrawn are periodically replenished with bills, whereas bills are periodically collected from the ATM 1 which has received a larger mount of money. Eventually, the number of bills in each ATM 1 is constantly optimized. Further, it is possible to transfer bills among the plurality of ATMs 1 without taking bills in and out of a cashier's section. For these reasons, the amount of bills which remain unused in the ATM 1 is reduced, and it is possible to automatically optimize the amount of money in financial institutions such as a bank.

In this way, the periodical replenishment/collection function makes it possible to constantly optimize the number of bills in each ATM 1 and to transfer the bills among the plurality of ATMs 1. As a result, the number of bills which remain unused in the ATM 1 is reduced, which in turn makes it possible to automatically optimize the amount of money in the financial institution such as a bank.

The urgent replenishment/collection function allows the control section 4 to constantly manage the number of bills currently being stored in each ATM 1, and to control the mobile cart 2 so as to urgently carry out the bill replenishment/collection operation for the ATM 1 in which the number of bills currently being stored has reached the near-end number of bills which nearly run short or the near-full number of bills which nearly overflow previously set for each ATM 1. In this event, it is also possible to arrange the ATM operation supporting system in the following manner. Specifically, the control section 4 constantly manages the number of bills in the bill cassette 5 loaded onto the mobile cart 2. When the number of bills in the bill cassette 5 has reached the near-end number of bills/the near-full number of bills previously set for the mobile cart 2. In this case, the mobile cart 2 is controlled to carry out the bill replenishment/collection operation between the bill cassette 5 and the ATMs 1 capable of being subjected to the bill replenishment/collection operation, in such a way that the number of bills in the bill cassette 5 falls within the range between the near-end number of bills/the near-full number of bills set for the mobile cart 2.

By virtue of the previously described urgent replenishment/collection function, it is possible to set the near-end number of bills/the near-full number of bills for each ATM 1 and to cause the control section 4 to monitor the number of bills in each ATM 1. As a result, it becomes possible to urgently replenish the ATM 1 with bills or collect bills from the ATM 1 using the mobile cart 2 before the ATM 1 enters the near-end/near-full state.

Further, it is possible to constantly hold the appropriate number of bills in the bill cassette 5 loaded onto the mobile cart 2. Accordingly, even when the number of bills in an ATM 1 suddenly becomes close to the near-end number of bills/the near-full number of bills, it is possible to prevent that ATM 1 from going out of service due to entrance into the near-end/near-full state, because the ATM is replenished with bills from the bill cassette 5 or bills are collected from the ATM 1 to be stored in the bill cassette 5.

As described above, the urgent replenishment/collection function makes it possible to urgently replenish the ATM 1 with bills or collect bills therefrom via the mobile cart 2 before the ATM 1 enters the near-end/near-full state. Further, the bill cassette 5 loaded onto the mobile cart 2 constantly holds the appropriate number of bills. Therefore, even when the number of bills in the ATM 1 suddenly becomes close to the near-end number of bills/the near-full number of bills, it is possible to reliably prevent the ATM 1 from going out of service due to entrance of the ATM 1 into the near-end/near-full state, because the ATM 1 is replenished with bills from the bill cassette 5 or bills are collected from the ATM 1 to be stored in the bill cassette 5. Thus, it is possible to considerably reduce the out-of-service rate of the ATMs.

When the number of bills in the bill cassette 5 loaded onto the mobile cart 2 is set from outside, the forced replenishment/collection function enables the control section 4 to control the mobile cart 2 so as to carry out the bill replenishment/collection operation between the bill cassette 5 and the ATMs 1 capable of being subjected to the bill replenishment/collection operation, such that the number of bills in the bill cassette 5 becomes equal to the preset number of bills. The previously described forced replenishment/collection function allows the clerk in charge to forcibly perform the replenishment/collection operation between the mobile cart 2 and the ATMs 1 which are currently operating.

As described above, the forced replenishment/collection function allows the clerk in charge to forcibly execute the bill replenishment/collection operation between the mobile cart 2 and the ATMs 1 which are currently operating, which contributes to a reduced burden on the clerk and the reduced amount of money to be set in the ATM.

The control section 4 determines the order in which the mobile cart 2 carries out the bill replenishment/collection operation for the ATMs 1, based on the result of judgment as to whether to execute the replenishing operation or the collecting operation, the number of bills to be used in the replenishment operation or collected by the collection operation, and the type of bills to be used in the replenishment operation or collected by the collection operation. In the case where there exist a plurality of bill cassettes 5 usable for the bill replenishment/collection operation, the control section 4 determines a bill cassette 5 to be used for the bill replenishment/collection operation for each ATM 1, based on the result of judgment as to whether or not the number of bills in each bill cassette 5 has already been counted, the result of judgment as to whether or not the bill cassette 5 has already been loaded onto the mobile cart 2, and the number of bills in each bill cassette 5.

The order in which the mobile cart 2 performs the bill replenishment/collection operation for the ATMs 1 is determined on predetermined criteria, and when a plurality of bill cassettes 5 exist, a bill cassette 5 to be used for the bill replenishment/collection operation is determined. As a result, the bill replenishment/collection operation can be efficiently carried out.

In the case where the bill replenishment/collection operation is carried out using the mobile cart 2 as described above, the ATM operation supporting system may be arranged such that after the bill cassette 5 has been installed into the ATM 1 to be subjected to the bill replenishment/collection operation, the mobile cart 2 closes the automatic door of the ATM 1, and at the same time with this, the ATM 1 counts the number of bills in the bill cassette 5.

In this way, as a result of the closing of the automatic door on a rear side of the ATM 1 and the counting of the number of bills in the bill cassette 5 being simultaneously carried out, a subsequent operation can be executed before one operation has been completed, which makes it possible to reduce replenishment/collection time.

By virtue of the closing of the automatic door of the ATM I and the counting of the number of bills in the cassette 5 being carried out simultaneously, a subsequent operation can be executed before one operation has been completed, which makes it possible to reduce replenishment/collection time. As a result, it becomes possible to considerably improve system performance.

In this event, the control section 4 controls the mobile cart 2 such that when the counting of the number of bills and the bill replenishment/collection operation are performed in the ATM 1, the bill replenishment/collection operation are performed for another ATM 1 simultaneously.

When at least two bill cassettes 5 are loaded onto the mobile cart 2, it becomes possible to simultaneously perform the bill replenishment/collection operation for two or more ATMs 1. It becomes possible to start the bill replenishment/collection processing for the second ATM 1 before the completion of the replenishment/collection processing for the first ATM 1, which makes it possible to reduce the replenishment/collection time to a much greater extent.

By performing replenishment/collection processing simultaneously for two or more ATMs 1, it becomes possible to reduce the replenishment/collection time as well as to improve the system performance to a much greater extent.

In the case where the counting function of the ATM 1 is used as the counting section 3, the ATM operation supporting system may be arranged in the following manner. Specifically, the ATM operation supporting system is provided with a cassette station which consists of the plurality of bill cassettes 5 which are to be loaded onto the mobile cart 2 or unloaded from the mobile cart 2. The handling mechanism 6 of the mobile cart 2 which has travelled to the cassette station transfers the bill cassettes 5 between the mobile cart 2 and the cassette station. The control section 4 grasps whether or not the number of bills in each bill cassette 5 retained in the cassette station has been determined. When there exists a bill cassette 5 holding bills the number of which has not been determined yet, the mobile cart 2 is controlled so as to load that bill cassette 5 into one of the plurality of ATMs 1. The number of that bill cassette 5 is determined by means of the counting function of the ATM 1. In this case, when the number of bills in the bill cassette 5 is counted in the ATM 1 so as to determine the number of the bills, the control section 4 controls the mobile cart 2 so as to perform the bill replenishment/collection operation for the ATM 1.

As a result, even when there exists a bill cassette 5 which holds an undetermined number of bills, among the bill cassettes loaded onto the mobile cart 2 and the cassette station, the number of such bills can be immediately determined.

Accordingly, even when there exists a bill cassette 5 which holds an undetermined number of bills, among the bill cassettes loaded onto the mobile cart 2 and the cassette station, it becomes possible to immediately determine the number of such bills. Therefore, it is possible to grasp the number of bills in the system quite quickly, and the thus obtained information is reflected in the bill replenishment/collection processing.

The ATM operation supporting system may also be arranged in the following manner. Specifically, the mobile cart 2 is provided with position detecting means for detecting by itself that the mobile cart 2 has arrived at a target ATM according to a movement instruction from the control section 4. Each ATM 1 is provided with an arrival sensor for detecting that the mobile cart 2 has arrived at the rear side of the ATM 1. The control section 4 is arranged to confirm whether or not the mobile cart 2 has arrived at the target ATM on the basis of a detection result obtained by the position detecting means and a sensing result obtained by the arrival sensor of the target ATM. As a result, it becomes possible to confirm that the mobile cart 2 has arrived at the target ATM, thereby reliably carrying out the bill replenishment/collection operation between the mobile cart 2 and the target ATM.

Accordingly, it becomes possible to reliably confirm whether or not the mobile cart 2 has arrived at the target ATM by double-checking the detection result received from the position detecting means and the sensing result received from the arrival sensor. As a result, the reliability can be improved, and it is possible to reliably replenish the target ATM with a large amount of bill or collect a large amount of bill therefrom.

Further, the ATM operation supporting system may also be arranged in the following manner. The mobile cart 2 is provided with a timer for counting a predetermined time. The timer is activated when the mobile cart 2 has opened the automatic door on a rear side of an ATM 1 which is to be subjected to the bill replenishment/collection operation. When the automatic door remains opened at the time when the timer has clocked out the predetermined time, the mobile cart 2 closes the door. The ATM 1 is provided with a charging mechanism for charging the mobile cart 2 while it is stopped behind the target ATM 1. When the automatic door is closed, the mobile cart 2 goes into a chargeable mode in which it can be charged by the charging mechanism. On the other hand, when the automatic door of the ATM 1 is opened, the mobile cart 2 goes into a nonchargeable mode in which charging by the charging mechanism is prevented. As a result of this, in the event of a power failure arising while the automatic door of the ATM 1 is opened, it is possible to prevent the automatic door of the ATM 1 from remaining open by automatically closing the automatic door of the ATM 1 when the timer has clocked out.

Accordingly, even when a power failure arises while the automatic door of the ATM 1 is opened, it is possible to prevent the automatic door of the ATM 1 from remaining open by automatically closing the automatic door of the ATM 1 when the timer has clocked over. Therefore, the security of the system is ensured.

The control section 4 may further be provided with the following four functions. (1) a function for managing the number of bills currently stored in each ATM 1 and the number of bills stored in the bill cassette 5 held on the mobile cart 2 and for displaying or printing out the numbers; (2) a function for managing, for each ATM, the total number of bills used for replenishing a plurality of ATMs 1 using the mobile cart 2 and the total number of bills collected from the plurality of ATMs 1 using the mobile cart 2, and for displaying or printing out the total numbers; (3) a function for managing the history of variations in the number of bills used for replenishing a plurality of ATMs 1 using the mobile cart 2 and in the number of bills collected from the plurality of ATMs 1 using the mobile cart 2, and for displaying or printing out the history; and (4) a function for managing the history of variations in the number of bills loaded onto the mobile cart 2 through the bill cassettes 5 and for displaying or printing out the history. As a result, a variety of information items necessary for close examination are accumulated, and it becomes possible for the clerk in charge to easily grasp various kinds of information as a display on a display screen or a print result.

Since various kinds of information necessary for close examination are output as a display on a display screen or a print result, it becomes possible for the clerk in charge to easily grasp various kinds of information as a display on a display screen or a print result, which contributes to significantly reduced burden on the clerk.

When maintenance is carried out for each ATM 1, the control section 4 selects an ATM 1 for which the mobile cart 2 can perform the bill replenishment/collection operation, from among ATMs 1 outside the ATMs 1 to be subjected to maintenance, on the basis of the positions of the ATMs to be subjected to maintenance. The control section 4 then controls the mobile cart 2 so as to replenish the thus selected ATM 1 with bills or collect bills therefrom. When there are a plurality of ATMs to be subjected to maintenance, the control section 4 selects an ATM 1 for which the mobile cart 2 can perform the bill replenishment/collection operation, from among ATMs 1 for which maintenance has been completed and ATMs 1 outside the ATMs 1 to be subjected to maintenance, on the basis of the positions of the ATMs 1 to be subjected to maintenance except for the ATMs 1 having finished undergoing maintenance, every time the maintenance has been completed for the ATM to be subjected to maintenance. As a result, it becomes unnecessary for the clerk in charge to set and input the ATMs 1, which are capable of being subjected to the bill replenishment/ collection operation, to the ATM operation supporting system one by one when maintenance is performed for the ATMs. Eventually, the clerk's operation can be simplified, and errors associated with the entry of the ATMs capable of being subjected to the bill replenishment/collection operation can be reduced.

As described above, it becomes unnecessary for the clerk in charge to set and input the information of ATMs 1 capable of being subjected to the bill replenishment/collection operation one by one at the time of maintenance for the ATMs. Eventually, the clerk's operation can be simplified, and errors, associated with the entry of the ATMs capable of being subjected to the bill replenishment/collection operation can be reduced. Further, the work for supporting the operation of the ATM can be performed quite efficiently.

(b) Embodiment of the Invention

With reference to the accompanying drawings, one embodiment of the invention will now be described.

Figure 2:
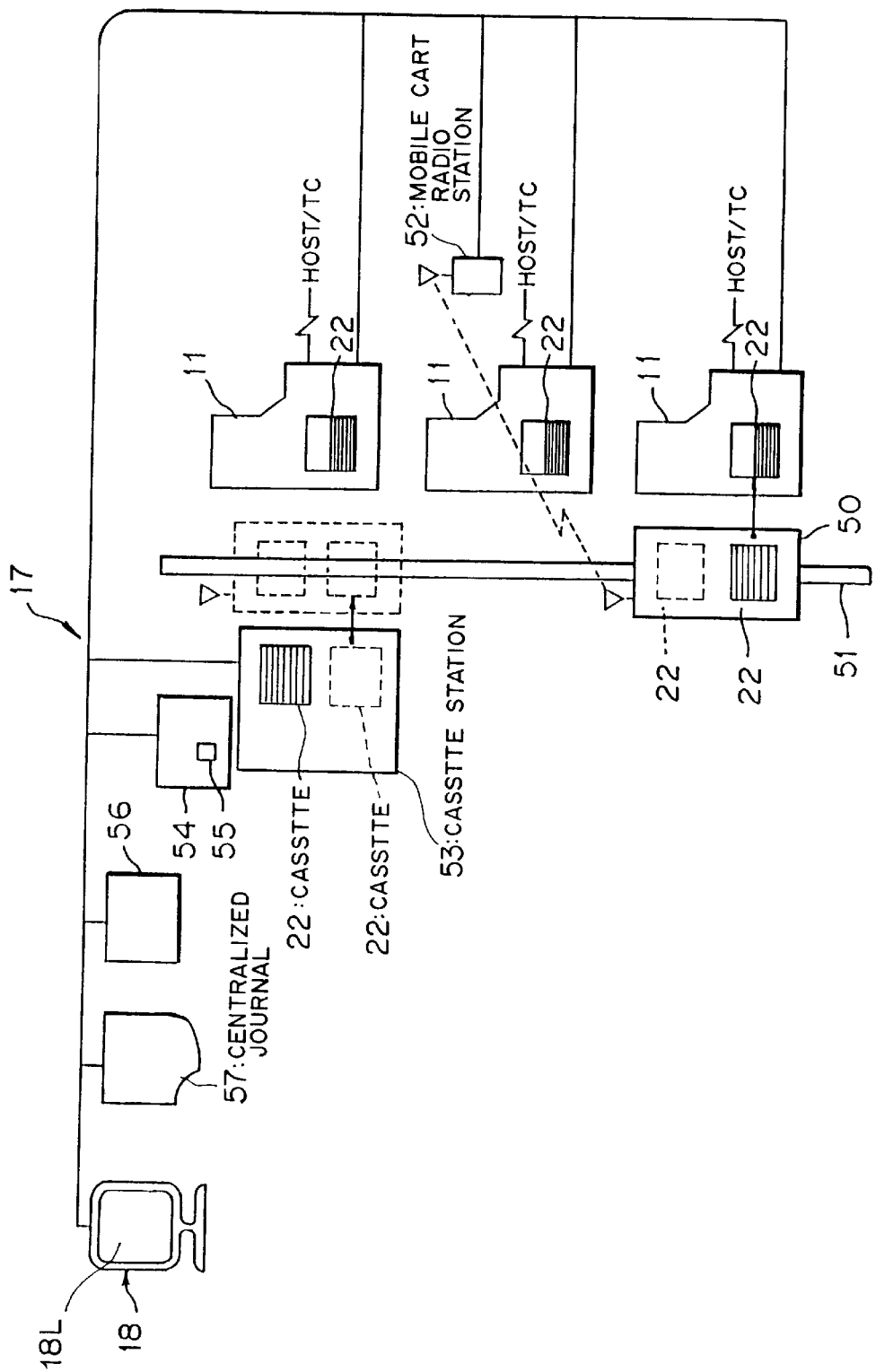
FIG. 2 is a block diagram showing the overall configuration of an ATM operation supporting system according to one embodiment of the present invention.

(b-1) Description of Configuration of ATM Operation Supporting System According to the Present Embodiment FIG. 2 is a block diagram showing the overall configuration of an ATM operation supporting system according to one embodiment of the present invention. Referring to FIG. 2, the overall configuration of the ATM operation supporting system of the present embodiment will be described.

In the ATM operation supporting system as shown in FIG. 2, a mobile cart (a mobile robot) 50 for automatically replenishing each ATM with bills or collecting bills therefrom is disposed behind a plurality of ATMs 11 installed in an automatic machine area 10 so as to be able to travel between them. The mobile cart 50 is provided with a handling mechanism 50B (see FIG. 6) for installing a bill cassette 22 into and removing it from the ATM 11. The mobile cart 50 travels to each ATM 11, and the bill cassette 22 is installed into and removed from the ATM 11 by means of the handling mechanism 50B.

The present ATM operation supporting system is provided with a group control workstation (a control section: hereinafter sometimes referred to as WS) 18 for collectively managing the overall system through a LAN 17.

The WS 18 of the present embodiment collects transaction data from each of the ATMs 11 through the LAN 17, as well as estimating and managing the number of bills loaded in each ATM 11 (i.e., the number of bills remaining in each ATM 11) on the basis of the thus collected transaction data. In addition, the WS 18 controls the bill replenishment/ collection operation performed by the mobile cart 50 so as to balance the numbers of bills stored in the ATMs 11 on the basis of the number of bills in each ATM 11 and the number of bills in the bill cassette 22 counted by the ATM 11. More specifically, the WS 18 of the present embodiment carries out various functions which are the features of the present invention and which will be described later with reference to FIGS. 14 through 34 and FIGS. 37 through 42.

The mobile cart 50 (see FIG. 3) performs radio communication with a mobile cart radio station (a radio communication base station) connected to the LAN 17. The mobile cart 50 receives instructions from the WS 18 [i.e., an instruction for moving to a target ATM 11 and an instruction for bill replenishment/collection operation (including an instruction for opening and closing of an automatic door 11D, which will be described later)] through the LAN 17 and the mobile cart radio station over a radio communication line (a radio LAN). Thus, the operation of the mobile cart 50 with respect to the ATM 11 is controlled.

The mobile cart 50 of the present embodiment is provided with a timer (a 60-second timer) for clocking a predetermined time, as will be described with reference to FIG. 35. The closing of the automatic door 11D in a back of the ATM 11 (see FIGS. 3 and 4) and the control for switching the operation mode between a battery chargeable mode and a battery nonchargeable mode are carried out according to the counting action of the timer.

A free track for the mobile cart 50 is formed by adhesively laying a magnetic tape 51 on the floor behind the ATMs 11. As will be described later, the mobile cart 50 travels along the magnetic tape (i.e., the free track) 51 while sensing it. The mobile cart 50 installs the bill cassette 22 into and removes it from the ATM 11 from behind, whereby the bill replenishment/collection operation is carried out.

The ATM operation supporting system of the present invention is further provided with a cassette station 53 capable of retaining at least two bill cassettes 22 (one is to be installed into the mobile cart 50, and the other is removed from the mobile cart 50). The mobile cart 50 installs the bill cassette 22 into and removes it from the cassette station 53 in the same manner as it does for the bill cassette 22 of the ATM 11.

The LAN 17 is connected to a station controller (hereinafter often referred to as STC) 54, which is disposed adjacent to the cassette station 53. The STC 54 has functions serving as a cassette station control section 54*b*, and a sensor monitoring section 54*d*, and also has a power supply 54B, which will be described later with reference to FIG. 3. As will be described later with reference to FIG. 36, the STC 54 has a function for controlling battery backup operation carried out in the event of a power failure (in the event of the power being shut down). An operation panel 55 is disposed on the STC 54 so as to permit the entry of instructions for controlling the operational state of the mobile cart 50. It is possible for the clerk to control the operational state (emergency stop, etc.) of the mobile cart 50 by operating the operation panel 55.

The LAN 17 is further connected to a monitoring apparatus 56 for monitoring the status of the ATM operation supporting system and a centralized journal output section 57 for collectively printing an automatic machine journal. Each ATM 11 is connected to an accounting host computer located in a computer center via a terminal controller (HOST/TC) and a dedicated communication line.

With reference to FIGS. 3 through 13, a description will be given of the functional structure and the more detailed configuration of the ATM operation supporting system, which has been described with reference to FIG. 2.

Figure 3:
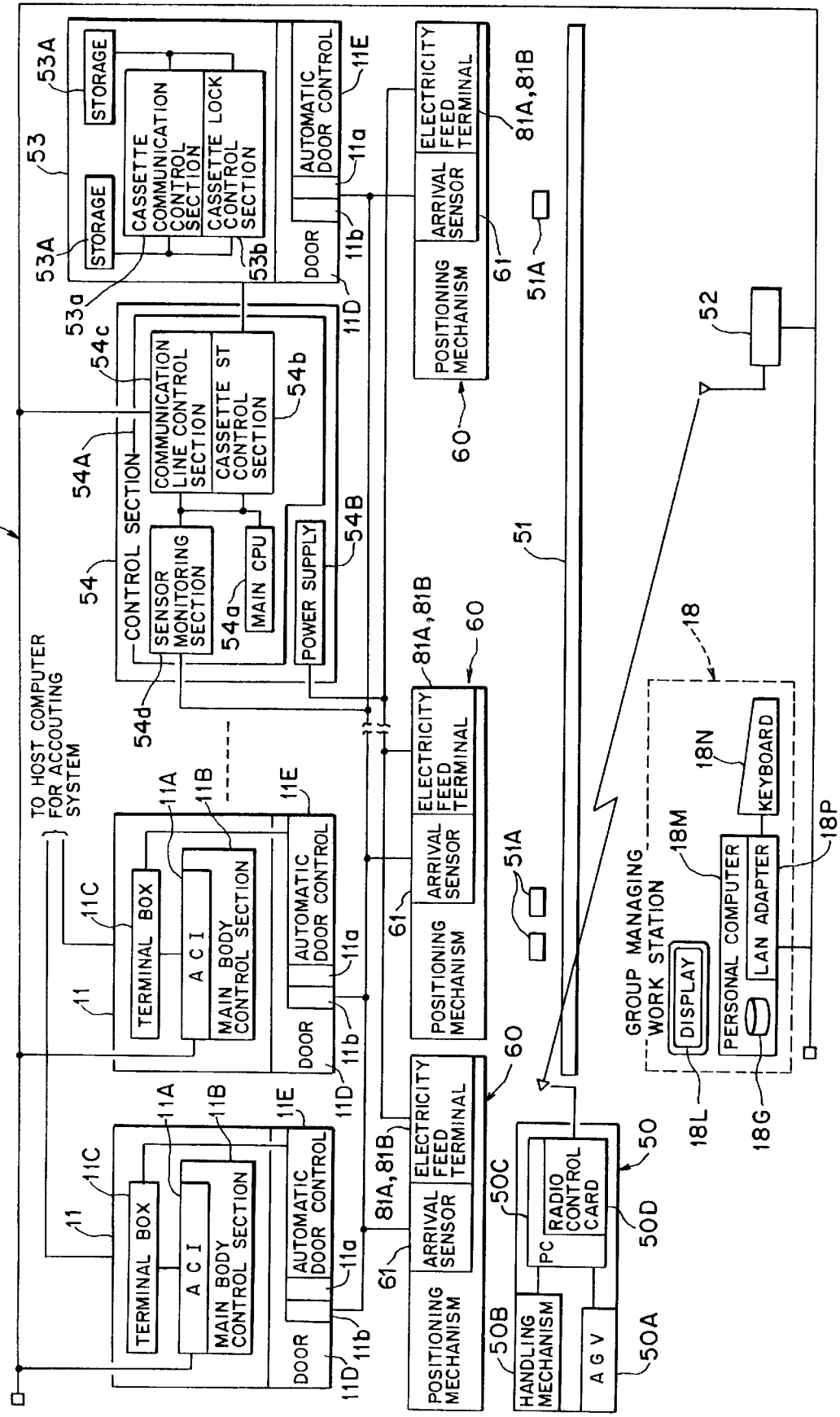
FIG. 3 is a block diagram showing the details of functional configuration of the ATM operation supporting system according to the present embodiment.

As shown in FIG. 3, each ATM 11 comprises a communication interface (ACI) 11A which provides interface to the LAN 17 serving as a communication line for use with an automatic monitoring system, a main body control section 11B for controlling operations carried out in the ATM 11 in a supervising manner, a terminal box 11C, a slidable automatic door 11D provided on the rear side of the ATM 11, a door control section 11E for controlling the opening and closing of the automatic door 11D, a door open/close motor 11*a* which drives the automatic door 11D so as to open or close upon receipt of an instruction from the door control section 11E, and a closed door sensing switch (a sensor for detecting the opening and closing of the back door) 11*b* which detects the open and closed states of the automatic door 11D and notifies the STC 54 of the result of the detection.

Figure 4:
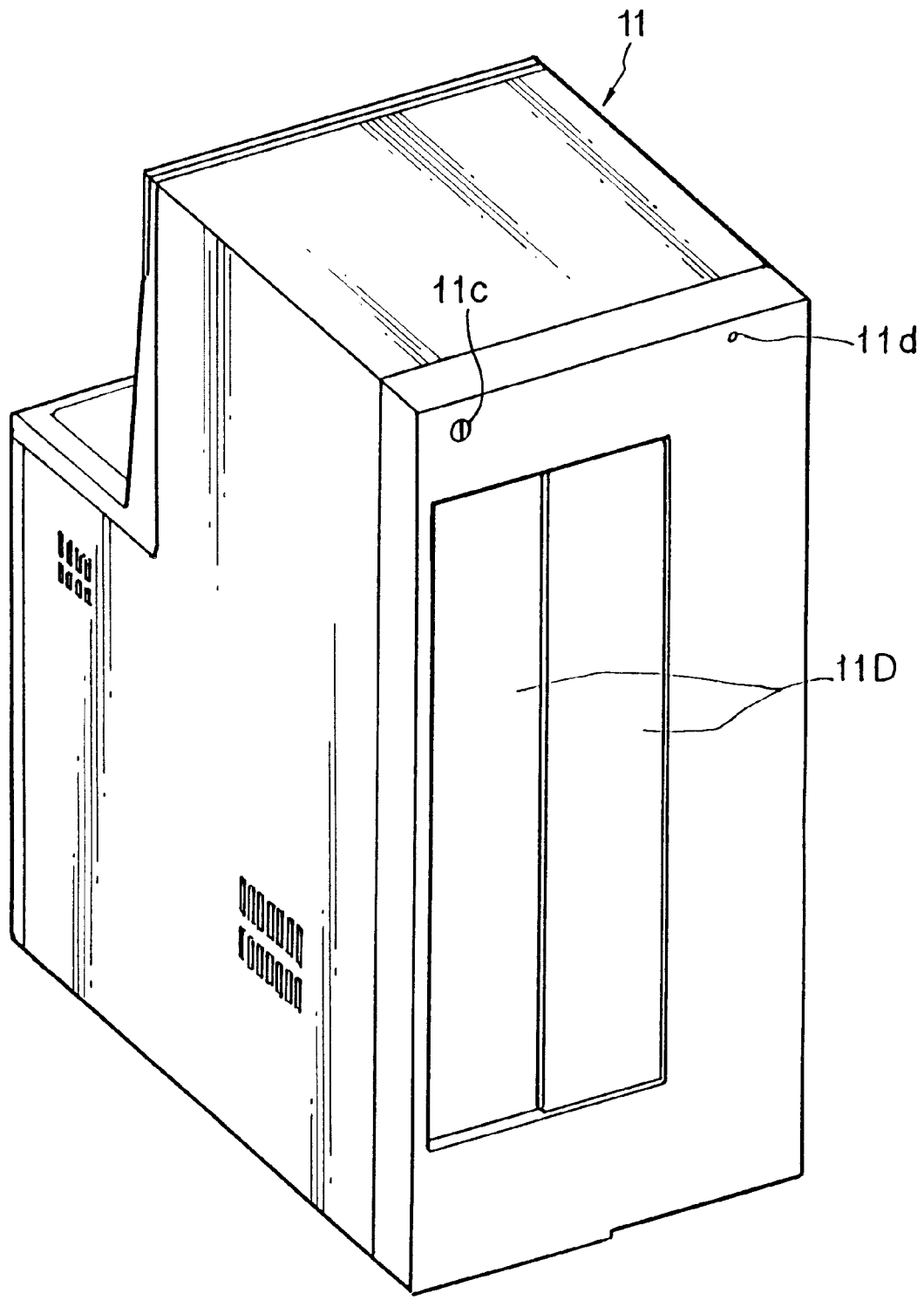
FIG. 4 is a perspective view showing the rear side (the door in the closed state) of the ATM according to the present embodiment.
Figure 5:
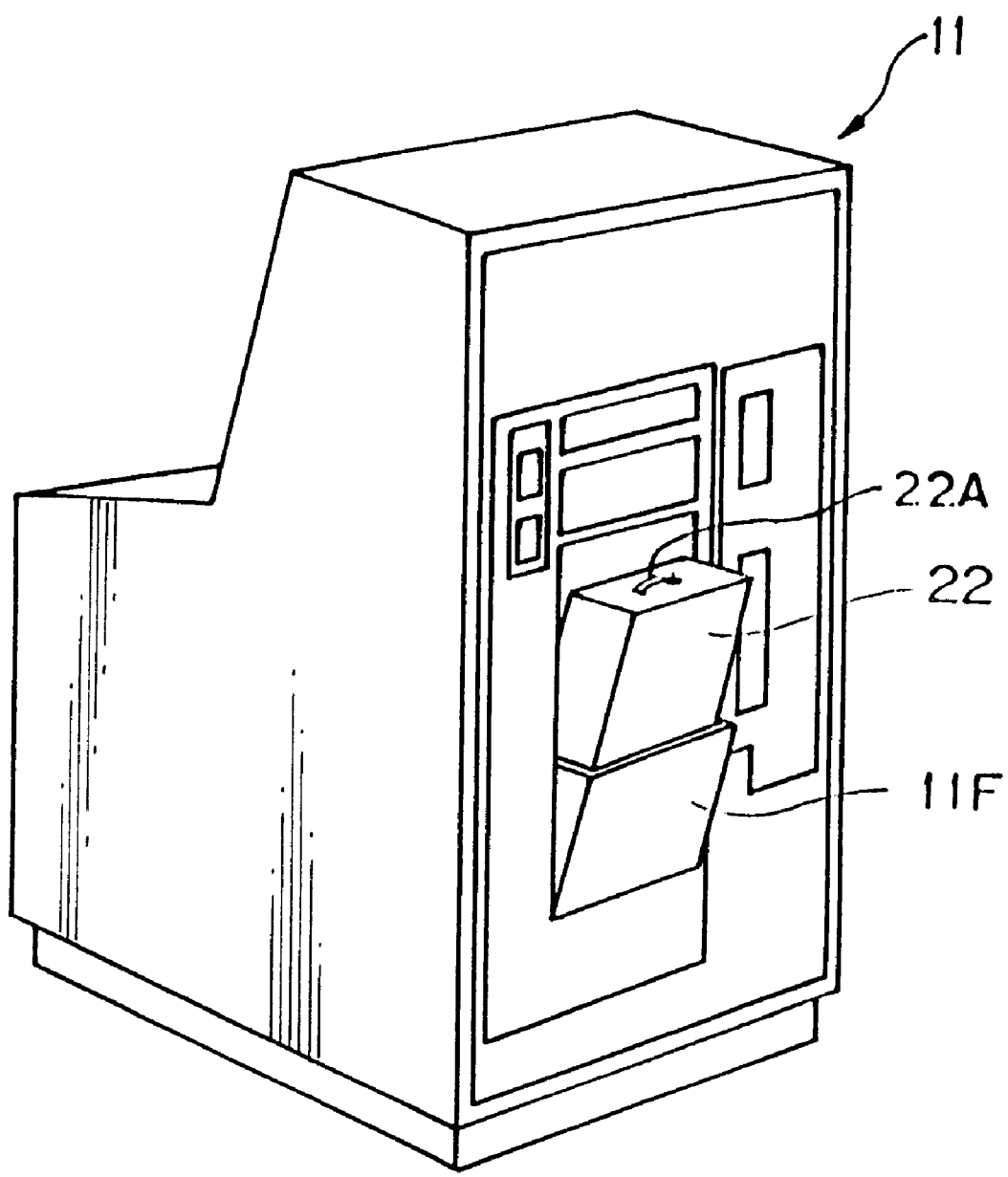
FIG. 5 is a perspective view showing the rear side (i.e., the door in the open state) of the ATM according to the present embodiment.

The automatic door 11D of the ATM 11 is composed of two slidable doors, as shown in FIG. 4. When the automatic door 11D is opened, a cassette holder 11F projects to the outside at an angle, as shown in FIG. 5. The cassette holder 11F receives the bill cassette 22. In the state in which the cassette holder 11F is inclined to the outside as shown in FIG. 5, the mobile cart 50 installs the bill cassette 22 into and removes it from the cassette holder 11F. The door open/close motor 11a for slidably moving the automatic door 11D operates on the power fed from the power supply 54B of the STC 54.

As shown in FIG. 4, each ATM 11 is provided with a door key slot 11c and a door open/close light receiving element 11d. A door key (not shown) is inserted from the mobile cart 50 into the door key slot 11c when the automatic door 11D is to be opened so as to permit the installation and removal of the bill cassette 22. The thus inserted door key is rotated by a key rotating unit 75 shown in FIG. 6. When the automatic door 11D is opened so as to permit the installation and removal of the bill cassette 22, the door open/close light receiving element 11d receives the light emitted from the mobile cart 50 which is stopped behind the ATM 11.

When the door key inserted into the door key slot 11c has been rotated and the door control section 11E of the ATM 11 has determined that information related to this ATM 11 is included in a light signal received by the light receiving element 11d as a result of decoding the light signal, the door control section 11E controls the automatic door 11D so as to open. When the door key inserted into the door key slot 11c from the mobile cart 50 has been rotated and removed from the door key slot 11c, the door control section 11E controls the opened automatic door 11D so as to close.

The terminal box 11C connects the communication interface 11A to the door control section 11E. The state of the automatic door 11D controlled by the door control section 11E is sent to the STC 54 via the communication interface 11A and the LAN 17.

The cassette station 53 comprises storages 53A for storing the bill cassettes 22, a cassette communication control section 53a which receives instructions, etc., from a cassette ST control section 54b of the STC 54, and a cassette lock control section 53b for controlling a locked state of the storage 53A (the bill cassettes 22) according to the instruction, etc., received by the cassette communication control section 53a.

According to the present embodiment, one cassette station 53 is provided with two storages 53A, for example. Each of the storages 53A is provided with the automatic door 11D and the closed door sensing switch 11b which are the same as those of the previously described ATM 11. The cassette station 53 is provided with a lock mechanism (not shown) for regulating the removal of the bill cassette (22) in terms of security. The previously described cassette lock control section 53b controls the locking and unlocking operations of the lock mechanism.

The WS 18 is composed of a personal computer (PC) 18M comprising a hard disk drive 18G, a display 18L, a keyboard 18N, and the like. The personal computer 18M is connected to the LAN 17, so as to be able to communicate therewith via an LAN adapter 18. The personal computer 18M estimates and manages the number of bills in the ATM operation supporting system, as well as implementing various functions which are features of the present invention and will be described later with reference to FIGS. 14 through 34 and FIGS. 37 through 42.

Figure 6:
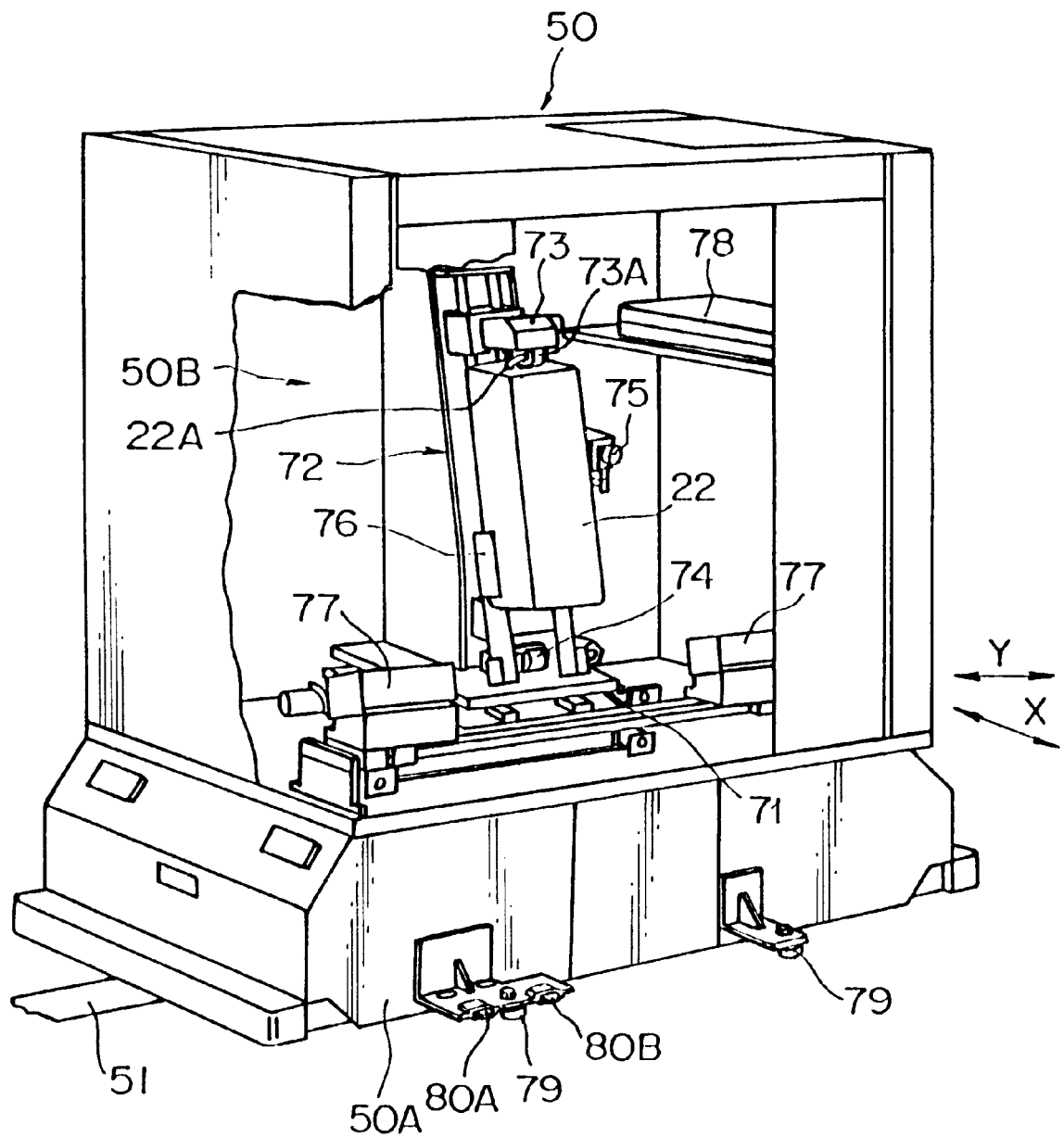
FIG. 6 is a partially cutaway perspective view of a mobile cart according to the present embodiment.

The mobile cart 50 comprises an automated guided vehicle (AGV) 50A which travels along the magnetic tape 51 serving as the free track by sensing it using a magnetic guide sensor 82 (see FIG. 7), and a handling mechanism 50B which is disposed on the automated guided vehicle 50A and performs the bill replenishment/collection operation by installing the bill cassette 22 into and removing it from the ATM 11 from behind, as shown in FIG. 6.

The mobile cart 50 is provided with a personal computer (PC) 50C for controlling the operations of the previously described automated guided vehicle 50A and the handling mechanism 50B. The personal computer 50C is capable of performing radio communication with the mobile cart radio station (the radio communication base station) 52 via a radio control card 50D, so that the personal computer 50C can communicate with the WS 18.

Figure 7:
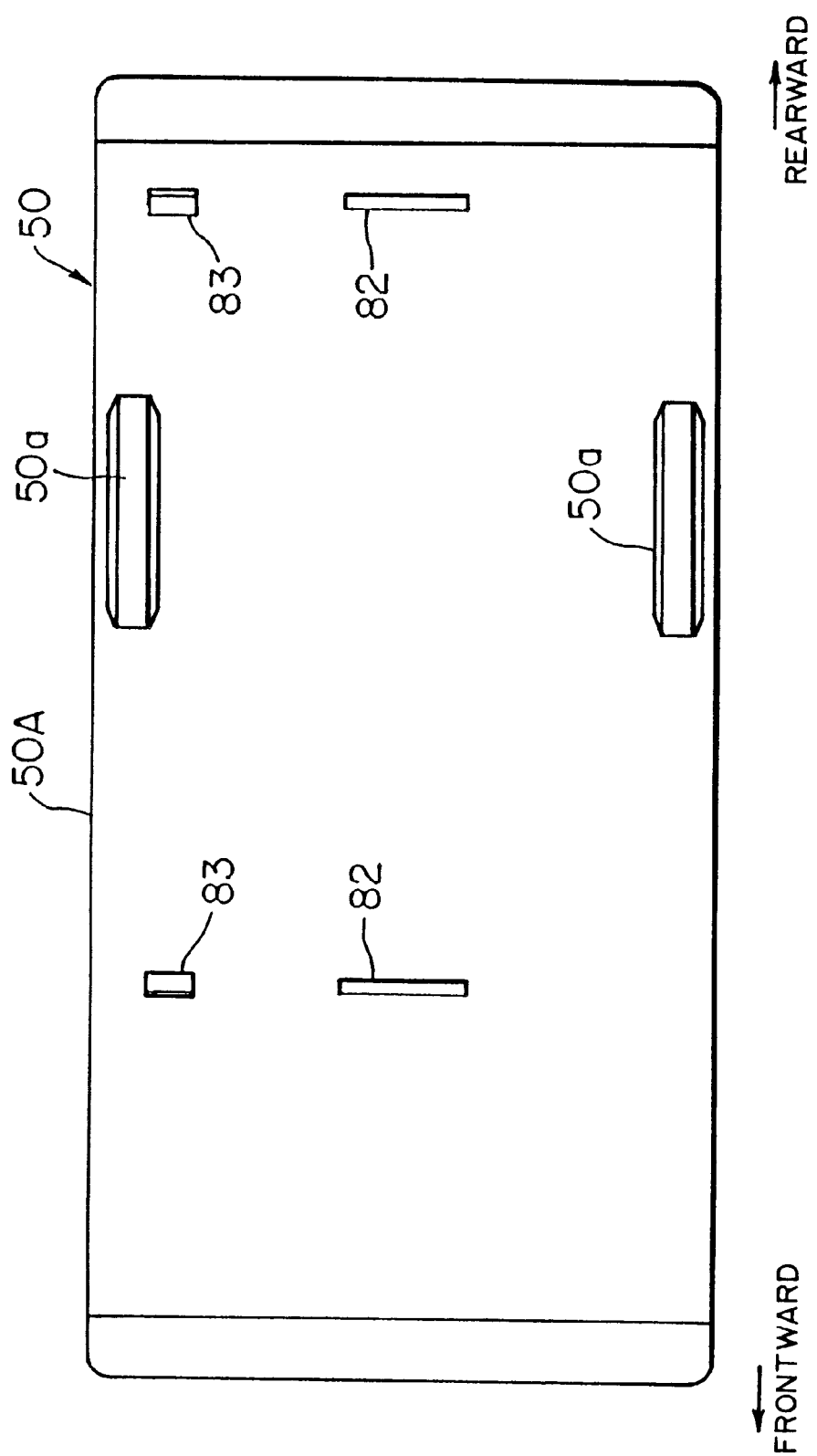
FIG. 7 is a bottom view of the mobile cart according to the present embodiment.
Figure 8:
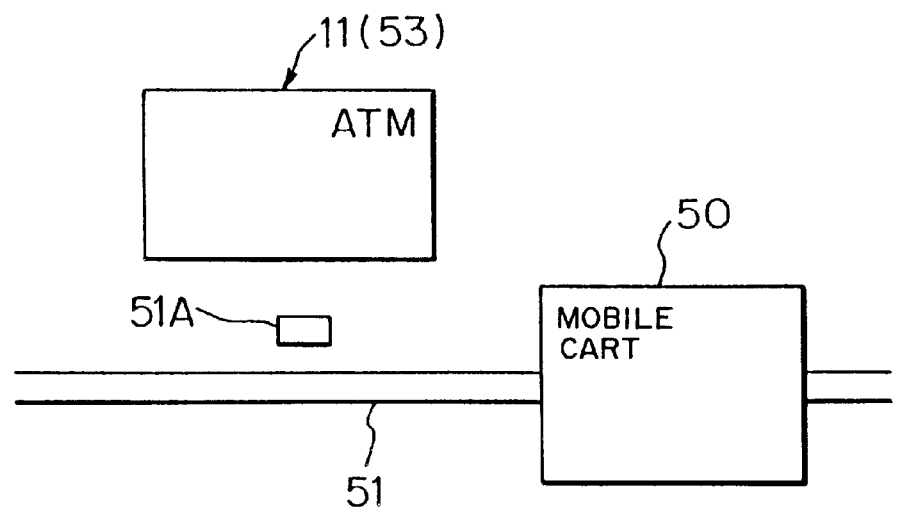
FIG. 8 is a schematic plan view for explaining a magnetic tape for marking according to the present embodiment.

The free track (a magnetic tape) 51 for use with the mobile cart 50 is formed on the floor over which the mobile cart 50 travels, as shown in, e.g., FIG. 3 or FIG. 8. Further, magnetic marking tapes 51A are adhered to the floor along the magnetic tape 51 so as to specify stop positions (see FIG. 8) at which the mobile cart 50 stops for the ATMs 11 (or for the cassette station 53) and branch points (not shown) at which the mobile cart 50 must perform a switch-back operation. The mobile cart 50 detects the magnetic marking tapes 51A using a magnetic marking sensor 83 (see FIG. 7). As a result, the stop positions for the ATMs 11 (or the cassette station 53) and the branch points of the free track are specified. Further, the ATM 11 (or the cassette station 53) for which the WS 18 instructs the mobile cart 50 to carry out the bill replenishment/collection operation is specified.

Paired right and left drive wheels 50a, 50a are provided at the bottom of the mobile cart 50, as shown in FIG. 7. The mobile cart 50 travels by means of rotational torque of the drive wheels 50a, 50a. Paired front and rear magnetic guide sensors 82, 82 are also provided on the bottom surface of the mobile cart 50 along its center line. Paired front and rear magnetic mark sensors 83, 83 are further provided on the bottom surface of the mobile cart 50 along a line separated from the center line.

During the course of travel of the mobile cart 50, the personal computer 50C controls the movement of the automated guided vehicle 50A (i.e., the direction in which the mobile cart 50 travels) such that the magnetic guide sensors 82, 82 constantly detect the magnetic tape 51. The personal computer 50C determines, based on the signals detected by the magnetic mark sensors 83, 83, whether or not the mobile cart 50 has arrived at an ATM 11 or the cassette station 53 specified by the WS 18 through an instruction. Further, the personal computer 50C determines whether or not the mobile cart 50 has arrived at a branch point at which the switch-back operation must be performed.

Figure 9:
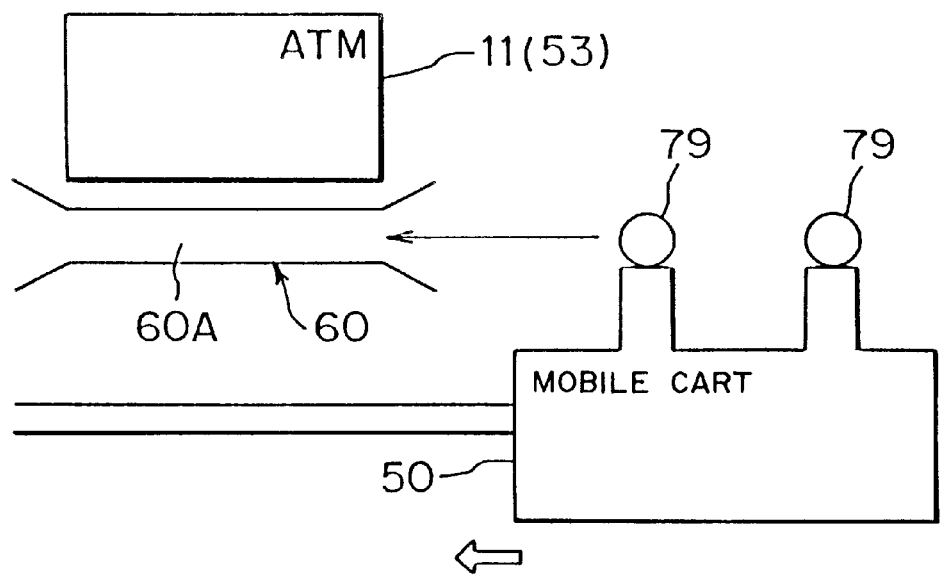
FIG. 9 is a schematic plan view for explaining a positioning mechanism according to the present embodiment.
Figure 10:
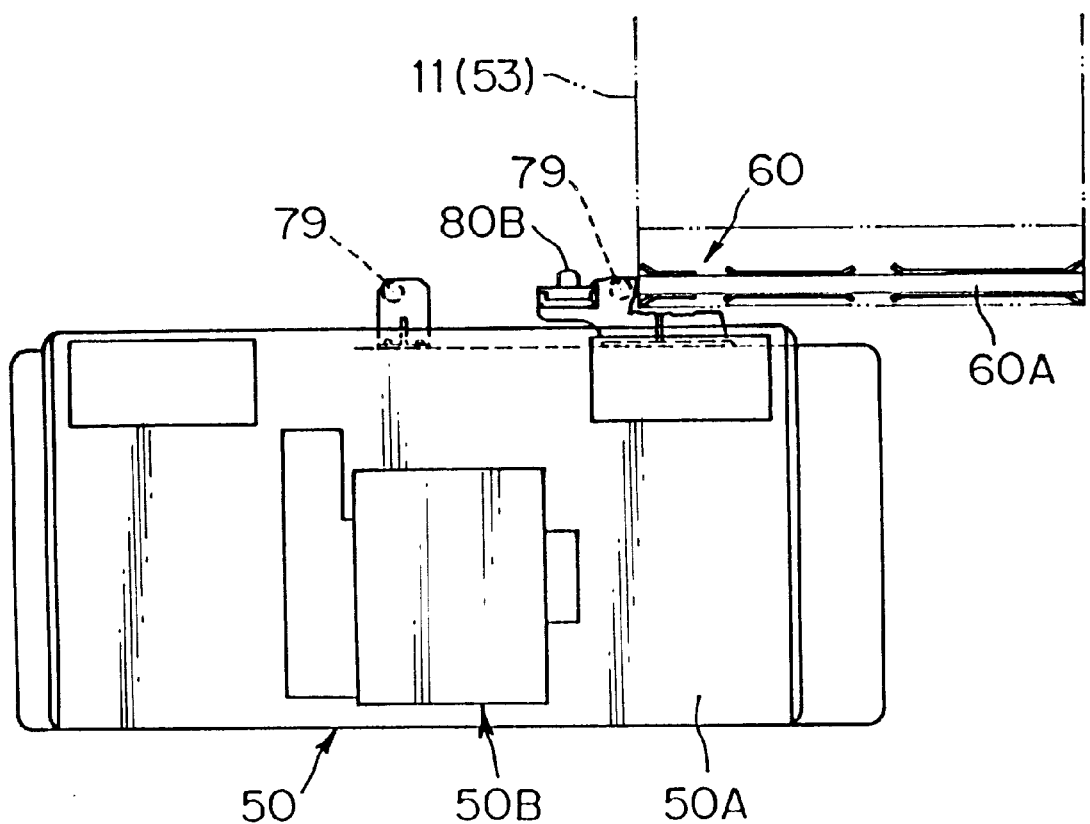
FIG. 10 is a plan view of the positioning mechanism according to the present embodiment.
Figure 11:
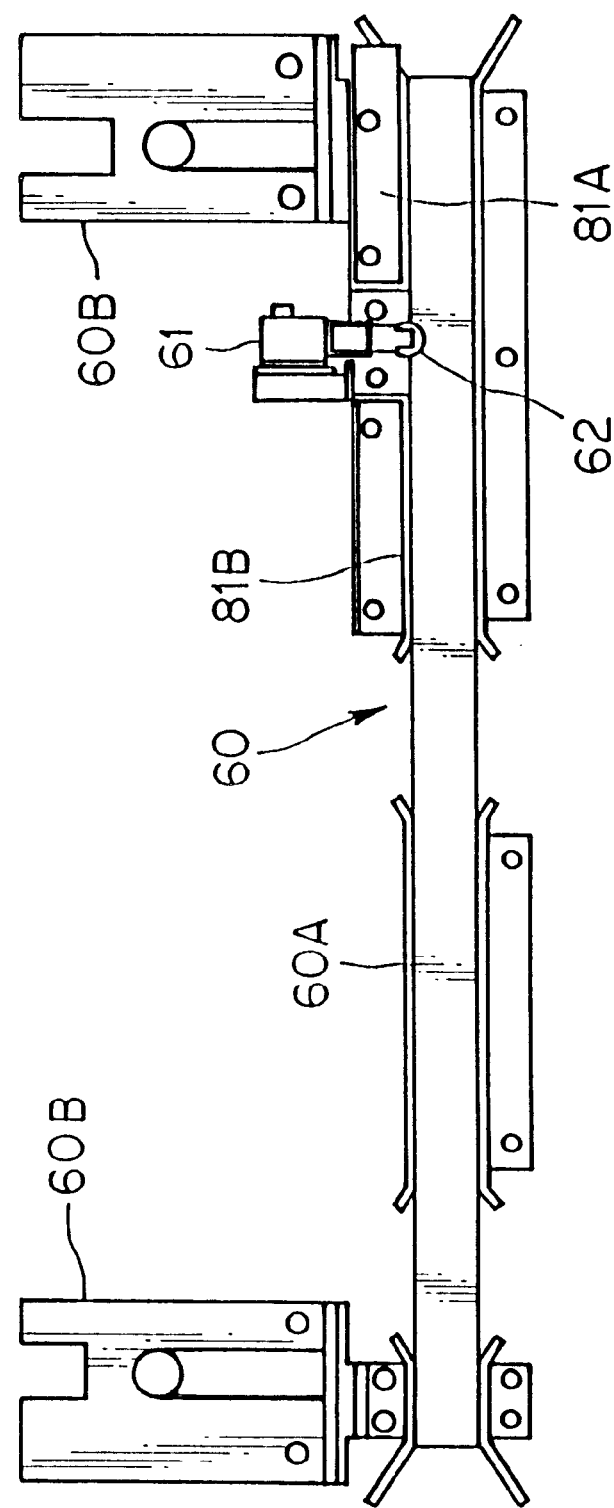
FIG. 11 is a plan view of a guide rail used as the positioning mechanism according to the present embodiment.

As shown in FIG. 3, a positioning mechanism 60, whose structure will be described in detail with reference to FIGS. 9 to 11, is disposed on the rear side of each ATM 11 and the cassette station 53. The positioning mechanism 60 is provided with an arrival sensor 61 for detecting that the mobile cart 50 has arrived and stopped at the ATM 11 or the cassette station 53 to carry out the bill replenishment/collection operation for it. The positioning mechanism 60 is further provided with electricity feed terminals 81A and 81B for feeding the electric power to the mobile cart 50 in a stopped state in order to operate the handling mechanism 50B.

The STC 54 further comprises a control section 54A and the power supply 54B, as shown in FIG. 3.

The control section 54A of the STC 54 of the present embodiment comprises a main CPU 54a, the cassette station (cassette ST) control section 54b, a communication line control section 54c, and the sensor monitoring section 54d.

The main CPU 54a is adapted to manage the STC 54 in a supervising manner. As will be described later with reference to FIG. 36, the CPU 54a further controls battery backup operations carried out in the event of a power failure (the event of the power being shut down).

The cassette ST control section 54b controls the cassette station 53, whereas the communication line control section 54c provides interface to the LAN 17.

The sensor monitoring section 54d collectively monitors the detecting states of the arrival sensors 61 of the ATMs 11 and the cassette station 53 by receiving detection signals from the arrival sensor 61 of the ATMs 11 and the cassette station 53. The sensor monitoring section 54d notifies the WS 18 of the detecting states of the arrival sensors 61, as an operating state of the mobile cart 50, through the communication line control section 54c and the LAN 17. As a result, it is possible for the WS 18 to constantly grasp the operating state of the mobile cart 50 (i.e., the stop position: information regarding which of the ATMs 11 and the cassette station 53 is currently subjected to the bill replenishment/collection operation).

The sensor monitoring section 54d also monitors the open and closed states of the automatic doors 11D of the ATMs 11 and the cassette station 53 which are opened when the mobile cart 50 carries out the replenishment/collection operation. The open and closed states of the automatic doors 11D of the ATMs 11 and the cassette station 53 are monitored by the sensor monitoring section 54d. Therefore, it is possible for the STC 54 to constantly grasp the open and closed states of the ATMs 11 and the cassette station 53 which are opened by the mobile cart 50 when it carries out the bill replenishment/collection operation.

The power supply 54B feeds electric power for the handling mechanism 50B (which is also used for recharging the batteries of the mobile cart 50) to the electricity feed terminals 81A, 81B of the positioning mechanism 60 of each ATM 11. The electric power is also used for opening and closing the automatic door 11D of each ATM 11. Specifically, the power supply system for feeding the electric power used for driving the handling mechanism 50B and the electric power used for opening or closing the automatic door 11D is provided independent of the power supply system (not shown) for feeding the electric power for the ATMs 11 (i.e., the electric power necessary for the ATMs 11 to carry out an ordinary transaction operation). The power supply 54B is provided with a power failure detecting circuit (not shown) and built-in batteries (not shown) for use in battery backup in the event of a power failure being detected by the power failure detecting circuit.

With reference to FIG. 6, the more detailed structure of the mobile cart 50 of the present embodiment will now be described. FIG. 6 is a partially cutaway view showing the mobile cart 50 in a state in which the bill cassette 22 is held by the handling mechanism 50B. For the mobile cart 50, the handling mechanism 50B is disposed on the automated guided vehicle (AGV) 50A which travels along the magnetic tape 51, as shown in FIG. 6.

The handling mechanism 50B is roughly composed of two parts: namely, an X-Y stage 71 directly disposed on the automated guided vehicle 50A, and a handler 72 disposed on the X-Y stage 71.

The X-Y stage 71 moves the entire handler 72 in the X direction (the longitudinal direction of the mobile cart 50) and the Y direction (the lateral direction of the mobile cart 50) within a two dimensional plane, whereby the handler 72 is positioned with respect to the ATM 11.

The handler 72 is further provided with a cassette withdrawing/inserting unit 73 which moves substantially vertically. The cassette withdrawing/inserting unit 73 is provided with a chuck unit 73A for holding a grip 22A attached to the upper portion of the bill cassette 22 (see FIGS. 5 and 6).

The chuck unit 73A moves in parallel with the direction in which the bill cassette 22 (the cassette holder 11F) shown in FIG. 5 is inclined. With this arrangement, when the cassette withdrawing/inserting unit 73 is raised while the chuck unit 73A is holding the grip 22A of the bill cassette 22, the bill cassette 22 can be withdrawn from the cassette holder 11F of the ATM 11. On the other hand, when the cassette withdrawing/inserting unit 73A is lowered, the bill cassette 22 can be inserted into the cassette holder 11F of the ATM 11.

The handler 72 is further provided with a cassette pushing unit 74, a key rotating unit 75, and a bill cassette insert guide unit 76.

The cassette pushing unit 74 travels in the X direction so as to press the bill cassette 22 and the cassette holder 11F inclined toward the outside into the ATM 11 after the bill cassette 22 has been inserted into the cassette holder 11F of the ATM 11.

When the automatic door 11D of the ATM 11 is opened, the key rotating unit 75 releases the automatic door 11D from a locked state by inserting the door key (not shown) into the door key slot 11c of the ATM 11 and rotating the thus inserted door key in the manner as previously described with reference to FIG. 4.

When the bill cassette 22 is removed from and inserted into the ATM 11, the bill cassette insert guide unit 76 guides both sides of the bill cassette 22 which is substantially vertically moved by the cassette withdrawing/inserting unit 73.

Storages 77 are disposed on the automated guided vehicle 50A so as to be movable in the Y direction. The storages 77 are temporarily hold the bill cassettes 22 to be transported by the mobile cart 50. Each of the storages 77 is moved in the Y direction so as to come in alignment with the handler 72. Then, the cassette withdrawing/inserting unit 73 is vertically moved. As in the case of installing the bill cassette 22 into and removing it from the ATM 11, the bill cassette 22 is installed into, or removed from, the storage 77. The two storages 77 are disposed on the automated guided vehicle 50A of the present embodiment, and hence the two bill cassettes 22 can be stored in the mobile cart 50.

The previously described X-Y stage 71, and the units 73–75, 77, 73A are driven and moved by a handling mechanism power unit 94 (see FIG. 13) which comprises several drive motors. This handling mechanism power unit 94 is operated by the electric power fed from the STC 54, as will be described later. The operation of the handling mechanism 50B is controlled by adjusting the operating state of the handling mechanism power unit 94 by means of a handling mechanism control section 78 (see FIGS. 6 and 13) which receives an instruction from the personal computer 50C.

Two guide rollers 79 which are engageable with a guide rail 60A of the positioning mechanism 60, which will be described later with reference to FIGS. 9–12, are provided at front and rear positions along the side surface of the mobile cart 50 (the automated guided vehicle 50A). Further, electricity collecting terminals 80A and 80B for receiving electricity from the outside are provided along the side of the mobile cart 50.

The detailed structure of the positioning mechanism 60 of the present embodiment will now be described with reference to FIGS. 9 to 12.

First, the basic structure of the positioning mechanism 60 will be described with reference to FIGS. 9 and 10. The guide rail 60A is disposed behind each ATM 11 and the cassette station 53 as the positioning mechanism 60. The guide rail 60A simultaneously guides the paired front and rear guide rollers (positioning member) 79, 79 installed into the mobile cart 50, so that the stop positions of the mobile cart 50 with respect to the ATMs 11 (or the cassette station 53) are regulated. As has been described, the cassette station 53 is provided with the two storages 53A, and each storage 53A has the automatic door 11D. Hence, the positioning mechanism 60 is also provided so as to correspond to each storage 53A.

The mobile cart 50 is guided to the area before the ATM 11 (or the cassette station 53) by the magnetic tape 51. Upon arrival at the rear front of the ATM 11 (or the cassette station 53), the mobile cart 50 is mechanically and forcibly regulated, while being guided by the magnetic tape 51, by means of the engagement between the guide rail 60A and the guide rollers 79, 79, so that the distance between the ATM 11 (or the cassette station 53) and the mobile cart 50 becomes constant. As a result, it becomes possible to reliably perform automatic replenishment/collection operation for the ATM 11 (or the cassette station 53) using the handling mechanism 50B.

The positioning mechanism 60 is fixed to the ATM 11 (or the cassette station 53) via a foot rest fixing portion 60B, as shown in FIG. 11. The positioning mechanism 60 is provided with the arrival sensor 61 for sensing that the mobile cart 50 has arrived and stopped at the ATM 11 (or the cassette station 53), as previously described with reference to FIG. 39.

A contact roller 62 is rotatively installed into the tip end of the arrival sensor 61, and the contract roller 62 is arranged so as to slightly project to the inside of the guide rail 60A of the positioning mechanism 60.

Figure 12:
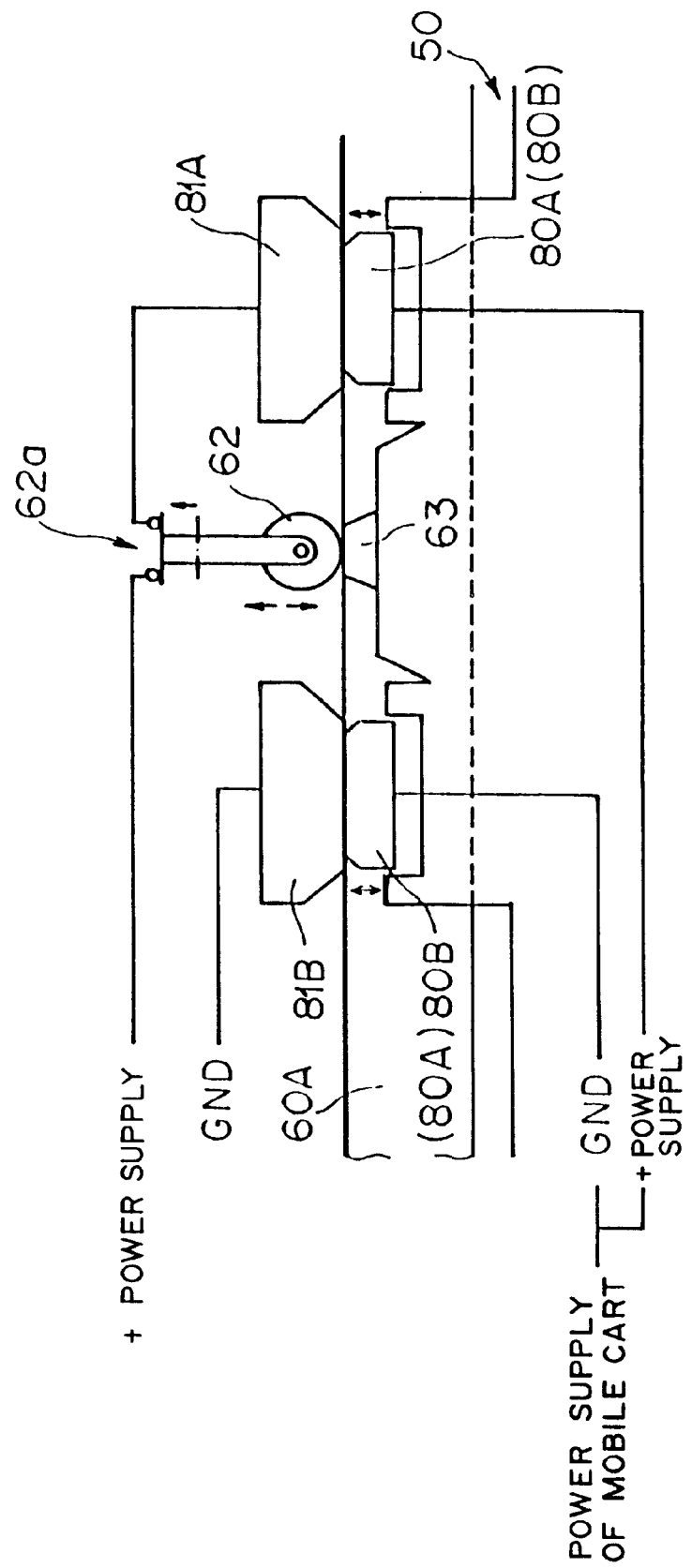
FIG. 12 is a schematic plan view for explaining a power supply mechanism for a handling mechanism (i.e., a charging mechanism for the mobile cart) according to the present embodiment.

As shown in FIG. 12, when the mobile cart 50 has arrived and stopped, an arrival switch pressing member 63 comes into contact with the contact roller 62. As a result of the contact roller 62 being pressed down toward the ATM 11 (or the cassette station 53), the arrival sensor 61 is turned on to detect the arrival of the mobile cart 50.

While the arrival sensor 61 is turned on as a result of the contact rollers 62 being pressed due to arrival of the mobile cart 50, a power feed switch 62a, which is provided in the power supply system so as to supply electric power to the handling mechanism 50B, is closed. Then, the electric power for the handling mechanism 50B is fed to the handling mechanism power unit 94 (see FIG. 13) of the mobile cart 50 in the manner as will be described later.

The electricity feed terminals (e.g, power supply shoes or a charging mechanism) 81A and 81B are provided along the side of the ATM 11 (or the cassette station 53) such that the front surfaces of these terminals are exposed on opposite sides of the arrival sensor 61, as shown in FIGS. 11 and 12.

The mobile cart 50 is also provided with the electricity collecting terminals (a recharging mechanism) 80A and 80B so as to face the power electricity feed terminal 81A and 81B, as shown in FIGS. 6 and 12. When the arrival sensor 61 and the power feed switch 62a are turned on as a result of the contact roller 62 being pressed by the arrival switch pressing member 63 [i.e., the mobile cart 50 stops at a normal stop position with respect to the ATM 11 (or the cassette station 53)], the electricity collecting terminals 80A and 80B come into contact with the electricity feed terminal 81A and 81B. The electricity collecting terminals 80A and 80B are elastically supported such that they are movable in the widthwise direction of the mobile cart 50. As a result, shocks produced upon contact with the electricity feed terminal 81A and 81B can be absorbed.

Hence, only when the mobile cart 50 has arrived at the ATM 11 (or the cassette station 53) and has stopped at the normal stop position and the arrival sensor 61 is turned on, the electric power for the handling mechanism 50B is fed to the mobile cart 50 from the power supply section 54B of the station controller 54 via the electricity feed terminal 81A and 81B and the electricity collecting terminals 80A and 80B.

The electric power is fed to the electricity feed terminal 81A and 81B only when the arrival sensor 61 is turned on. This is performed so as to ensure safety, taking into consideration the possibility of a shortcircuit being formed as a result of a drop of a metal piece on the guide rail 60A or the guide rollers (the positioning member) 79 of the mobile cart 50 coming into contact with the uncovered electricity feed terminal 81A and 81B.

In the mobile cart 50 which receives the electric power for the handling mechanism 50B, the electric power received through the electricity collecting terminals 80A and 80B is fed to the handling mechanism power unit 94. The handling mechanism power unit 94 is operated by that electric power, so that the handling mechanism 50B is driven.

The handling mechanism control section 78 and an AGV cart power unit 96 which drives the automated guided vehicle 50A of the mobile cart 50 operate upon receipt of the electric power from an AGV battery unit (an automated guided vehicle power supply) 95 previously provided in the mobile cart 50.

A switch (a switching circuit) 97 which is controlled by the handling mechanism control section 78 is disposed between the electricity collecting terminals 80A and 80B and the AGV battery unit 95. The handling mechanism control section 78 switches the operation mode of the mobile cart 50 between a battery chargeable mode and a battery nonchargeable mode by controlling a connected state of the switch 97, as will be described with reference to FIG. 35.

Figure 35:
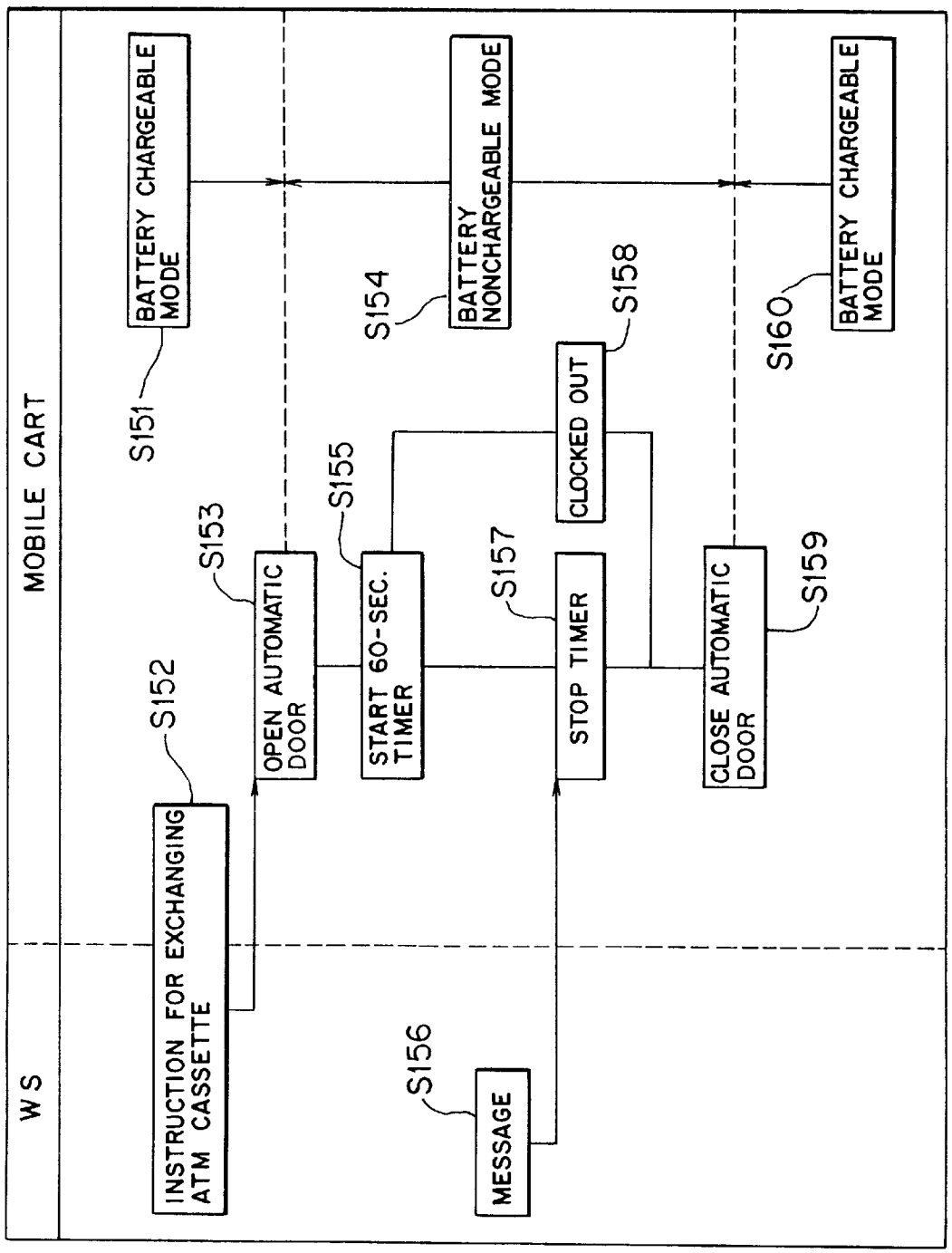
FIG. 35 is a flowchart for explaining the operation of the mobile cart according to the present embodiment.

When the mobile cart 50 is stopped at the normal stop position with respect to the ATM 11 (or the cassette station 53), the handling mechanism 50B of the mobile cart 50 is not carrying out any operations, and the automatic door 11D is closed; namely, only when the mobile cart 50 is brought into a standby state behind the ATM 11 (or the cassette station 53) having the automatic door 11D closed, the handling mechanism control section 78 switches the switch 97 to a connected state (i.e., the battery chargeable mode: see steps S151 and S160 in FIG. 35), and the AGV battery unit 95 is charged by the electric power fed to the electricity collecting terminals 80A and 80B.

The characteristic operations of the present invention which are carried out in the ATM operation supporting system of the present embodiment having the above-described structure will be described in detail with reference to FIGS. 14 to 42.

(b-2) Description of Collective Bill Replenishment/Collection Operation

By virtue of the collective bill replenishment/collection operation of the present embodiment, the WS 18 controls the bill replenishment/collection operation performed by the mobile cart 50 so as to balance the numbers of bills in the ATMs 11 at the time when a clerk in charge loads the bill cassettes 22 into the cassette station 53 or when a preset collective replenishment/collection time (usually, the time immediately before the ATMs 11 start to carry out transactions) has come.

Figure 14A:
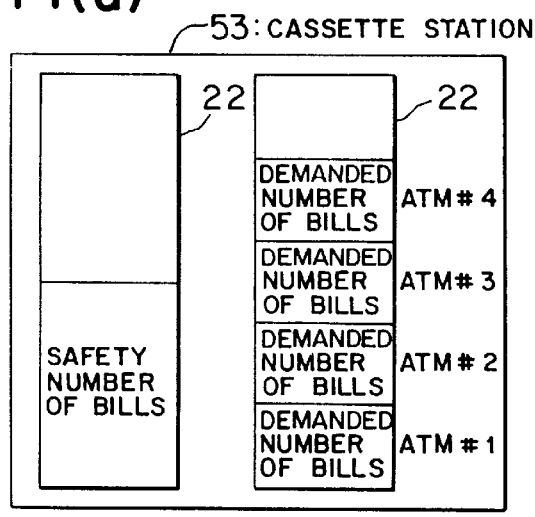
FIGS. 14(a), 14(b), and 14(c) are diagrams each for explaining the numbers of bills used for replenishing the ATMs according to the present embodiment.
Figure 14B:
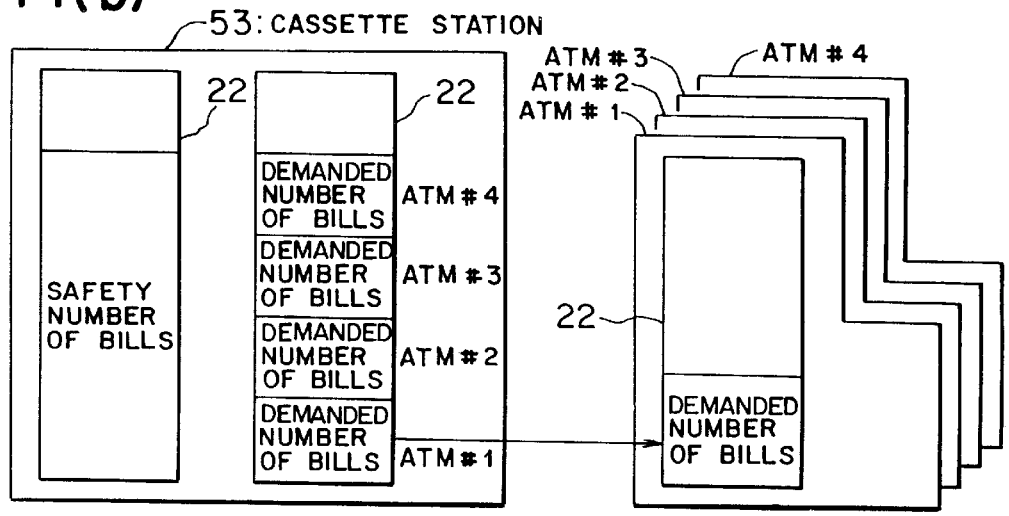
Figure 14C:
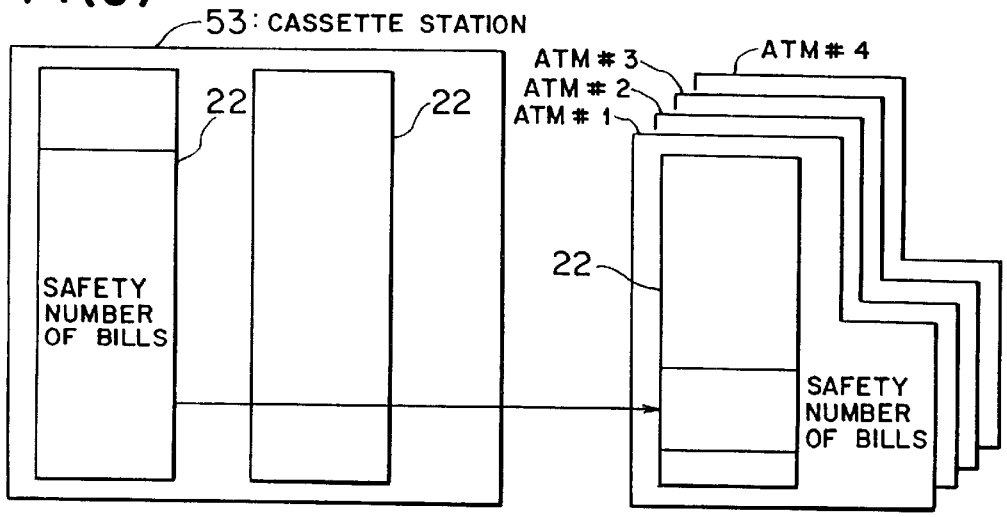

FIGS. 14(a) to 14(c) are illustrations for explaining bills with which the ATMs 11 are replenished in the present embodiment.

The WS 18 estimates the demanded number of bills of each of the ATMs 11 (assume that there are, e.g., four ATMs 11 respectively designated by #1 to #4). These four ATMs 11 are grouped into one group, and the WS 18 calculates a safety number of bills which are required by that group for safety. The clerk in charge loads the bill cassettes 22 with bills, the number of which is equal to the sum of the safety number of bills and the estimative demanded number of bills, both numbers estimated and calculated by the WS 18, as shown in FIG. 14(a). These bill cassettes 22 are loaded into the cassette station 53. FIG. 14(a) shows the details of the bills set in the bill cassettes 22 when the clerk in charge replenishes the cassette station 53 with the estimated number of bills.

In some cases, the bill cassette 22 to be loaded onto the mobile cart 50 will be hereinafter referred to as a mobile cart cassette, whilst the bill cassette 22 to be loaded into the ATM 11 will be hereinafter referred to as an ATM cassette. FIGS. 14(a) to 14(c) show the case where the estimative demanded number of bills for the ATMs #1 to #4 are set in one bill cassette 22 and the safety number of bills for the ATMs #1 to #4 are set in another bill cassette 22. However, the aggregate number of bills; that is, the sum of the numbers of these bills, may be set in one bill cassette 22.

Figure 17:
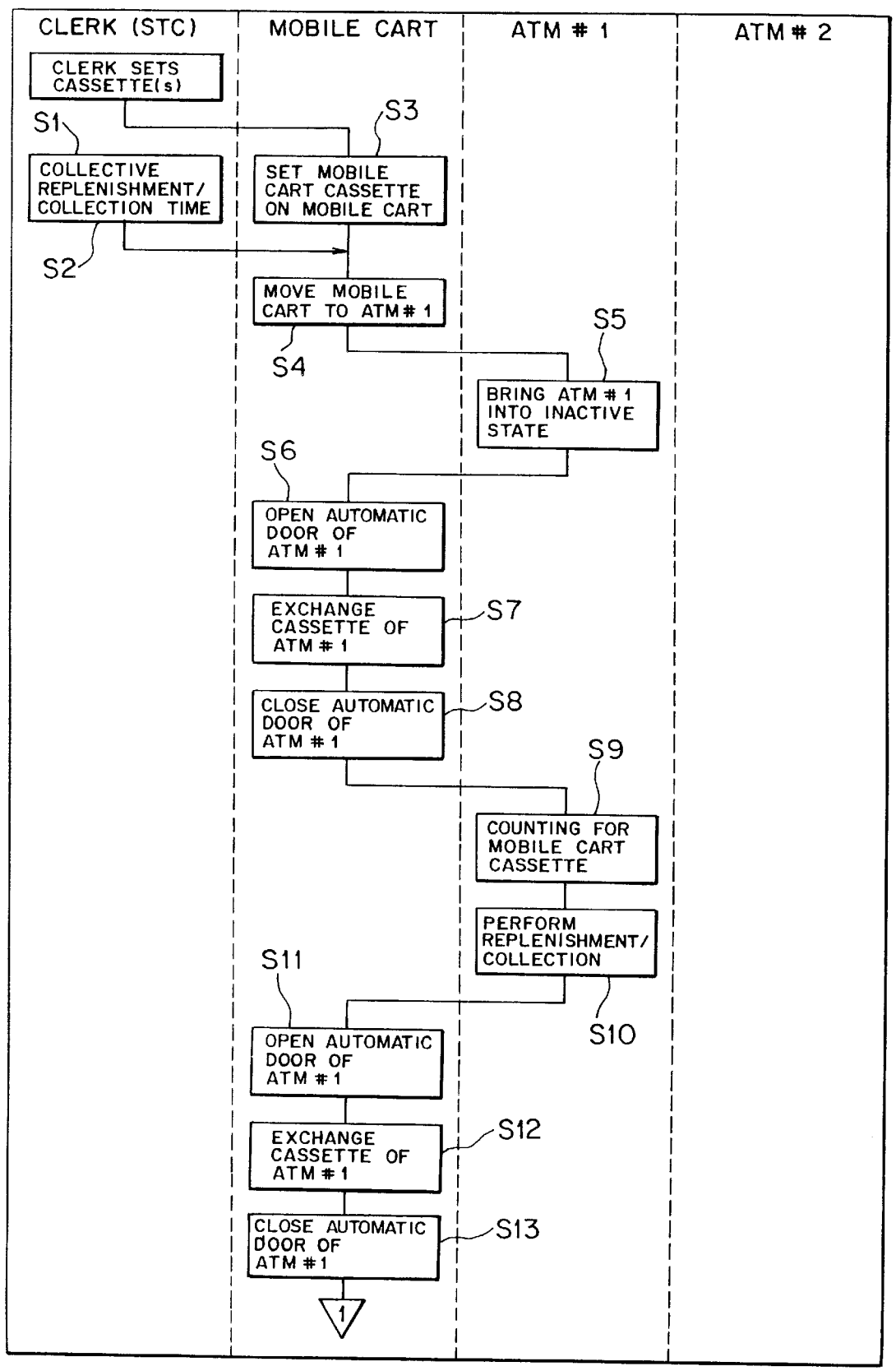
FIG. 17 is a flowchart for explaining the collective replenishment/collection operation according to the present embodiment.
Figure 18:
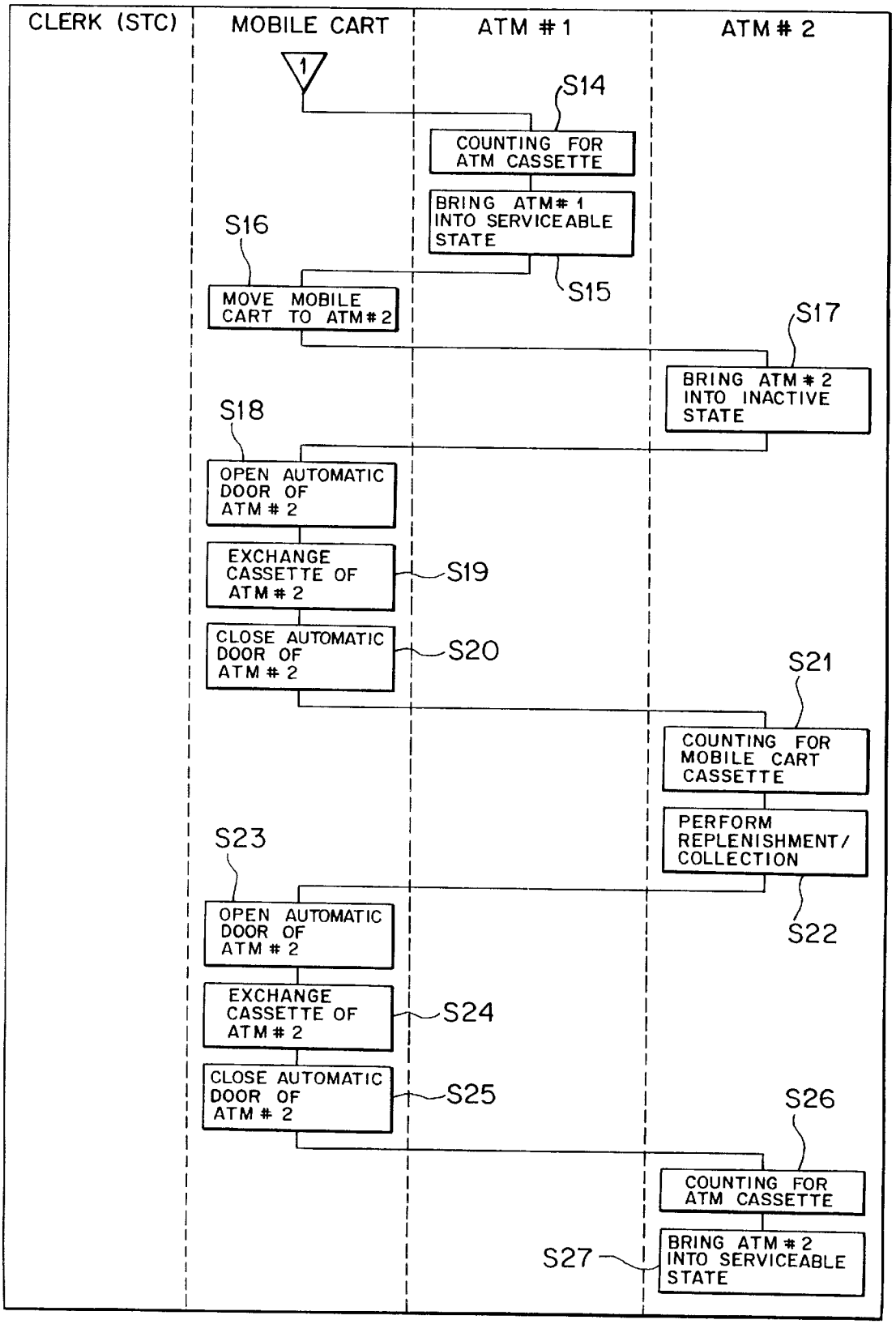
FIG. 18 is a flowchart for explaining the collective replenishment/collection operation according to the present embodiment.

At the time of the collective bill replenishment/collection operation, which will be described later with reference to FIGS. 17 and 18 (or FIGS. 29 and 30), each ATM 11 is replenished with only the demanded number of bills estimated for each ATM 11, as shown in FIG. 14(b). The safety number of bills are left in the mobile cart cassette 22.

Figure 21:
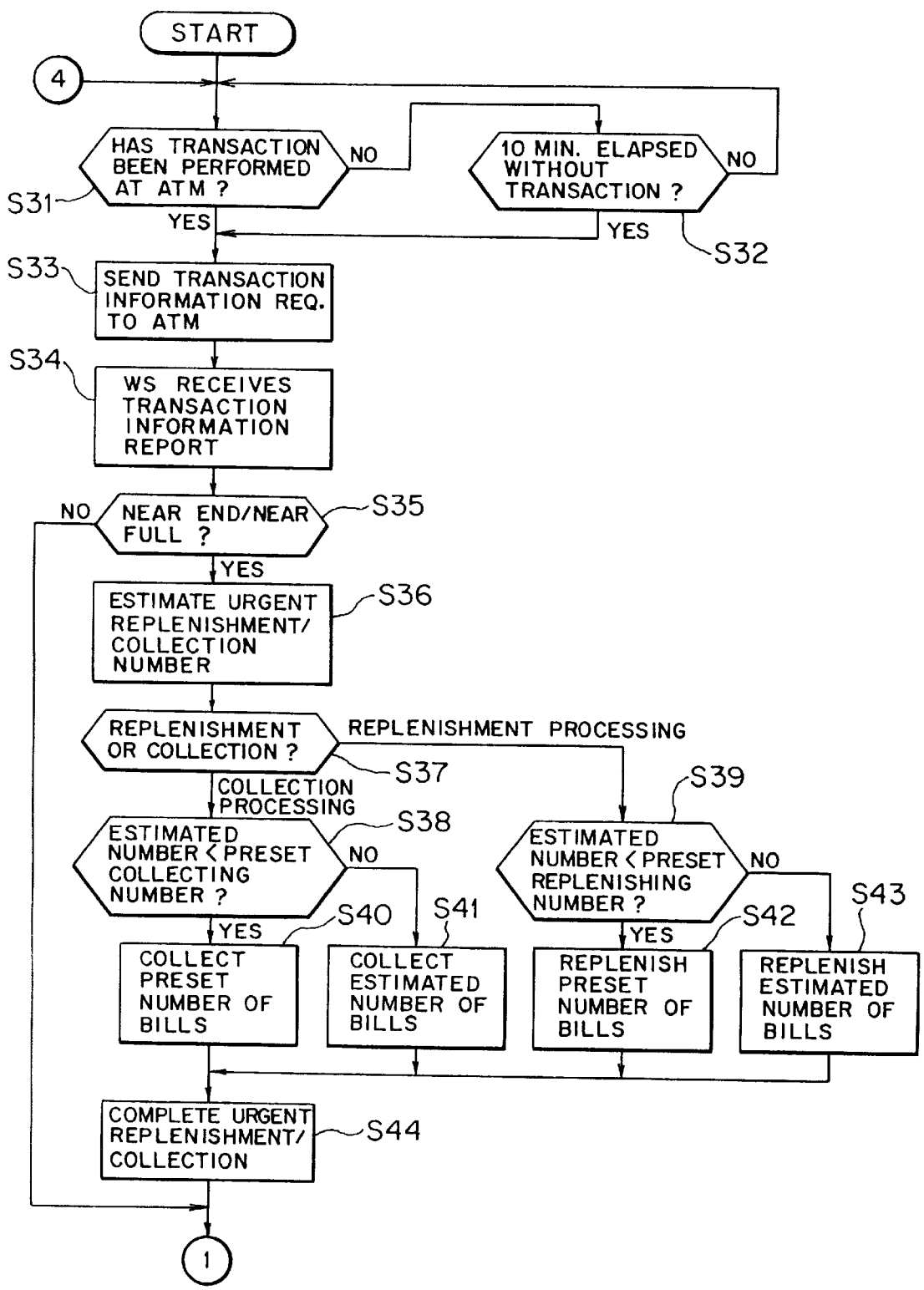
FIG. 21 is a flowchart for explaining a periodical replenishment/collection operation and an urgent replenishment/collection operation according to the present embodiment.
Figure 22:
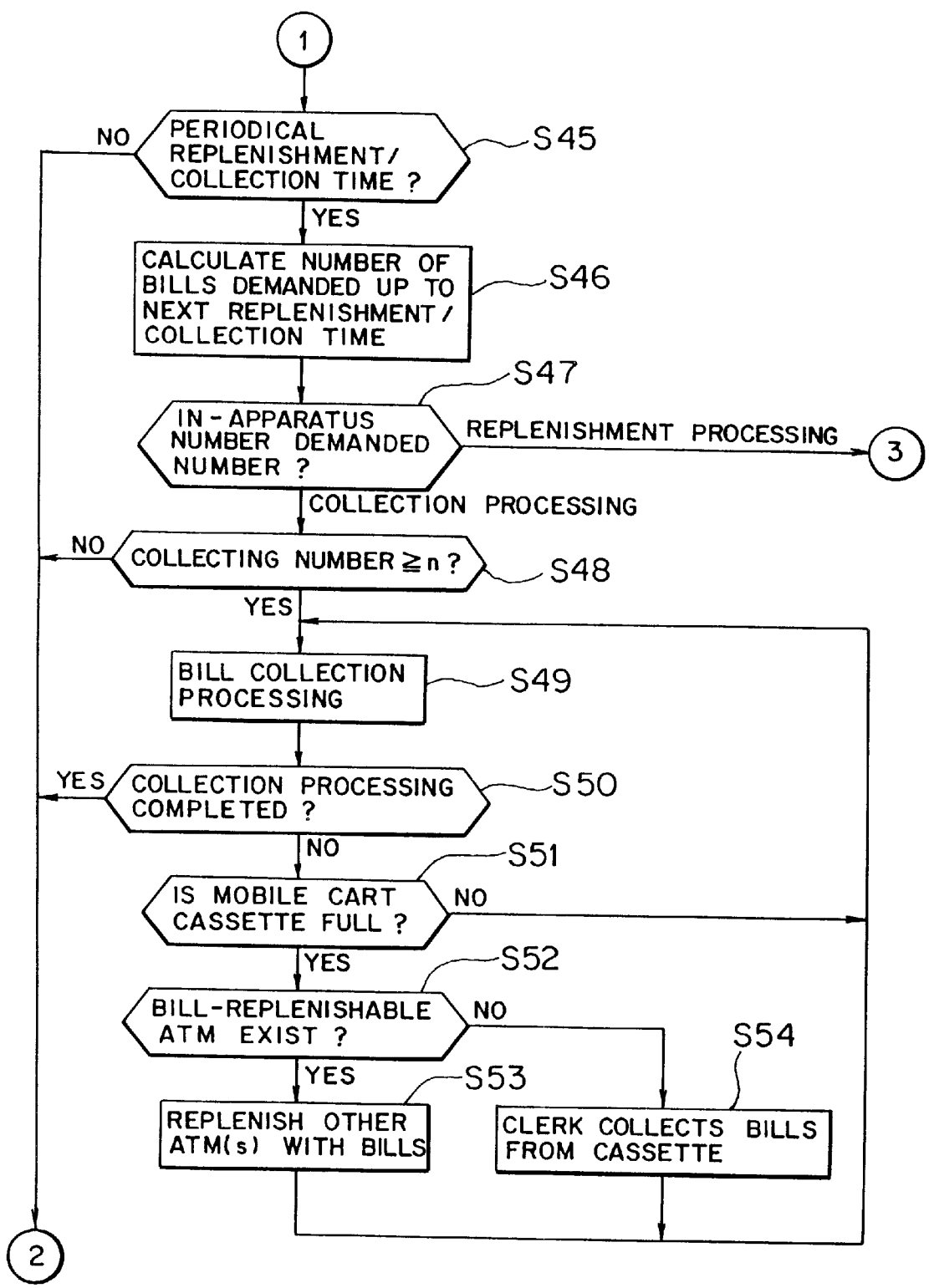
FIG. 22 is a flowchart for explaining the periodical replenishment/collection operation and the urgent replenishment/collection operation according to the present embodiment.
Figure 23:
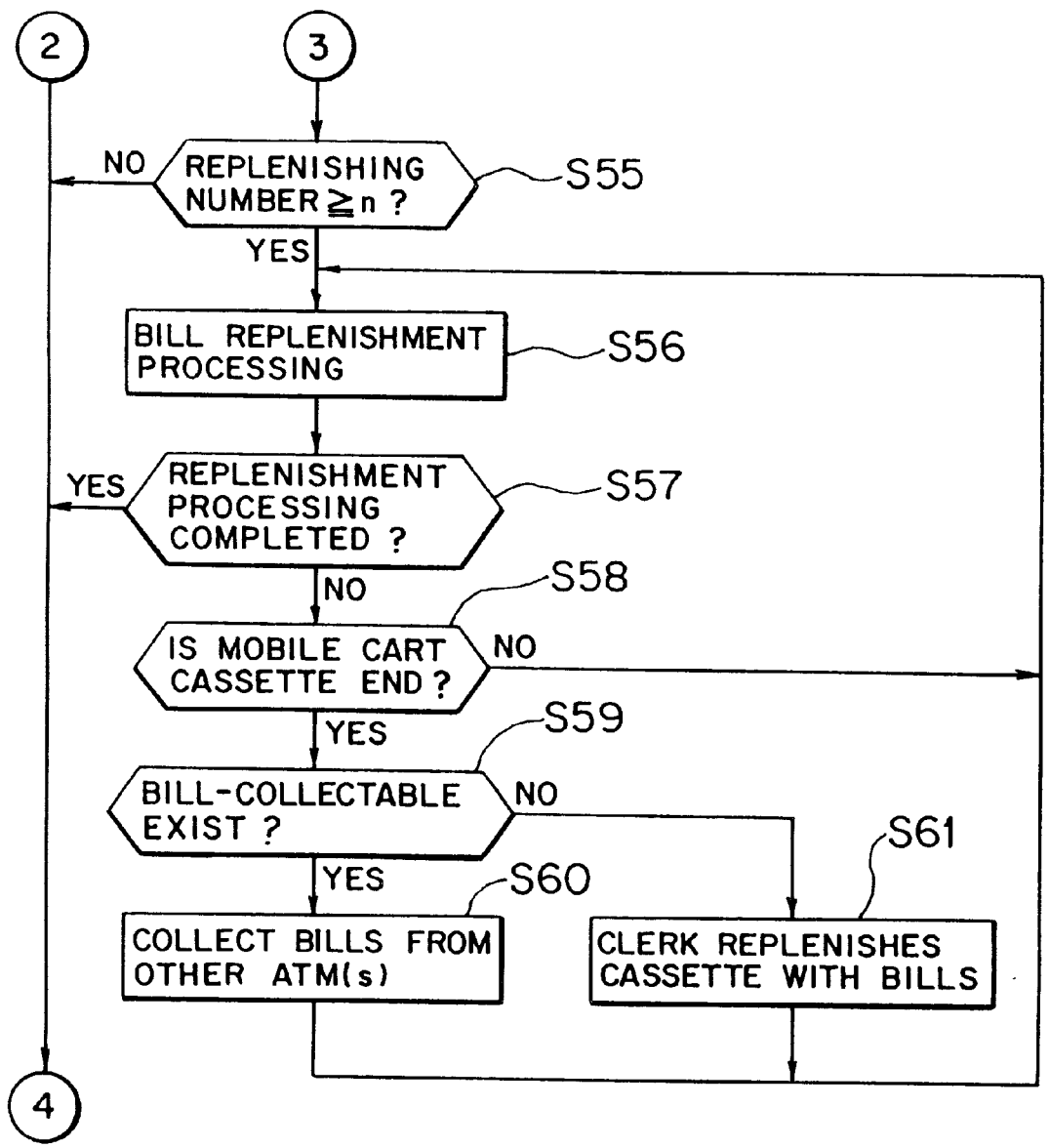
FIG. 23 is a flowchart for explaining the periodical replenishment/collection operation and the urgent replenishment/collection operation according to the present embodiment.

At the time of the periodical bill replenishment/collection operation or the urgent bill replenishment/collection operation which will be described later with reference to FIGS. 21 to 23, each ATM 11 is replenished with the suitable number of bills taken out of the safety number of bills, as shown in FIG. 14(c).

Japanese Patent Application No. 7-175283 (entitled "Remaining Money Management System") discloses details of the calculation of the estimative demanded number of bills for each ATM 11 and the safety number of bills required by the ATM group (the safety number of bills required when a group management is carried out). Hence, their explanations will be omitted here.

FIG. 15 is a table for explaining a method for determining a processing order (the priority levels of the ATMs 11) required to carry out the collective bill replenishment/collection operation for the plurality of ATMs 11. The order in which the collective bill replenishment/collection operation is executed for the ATMs 11 (i.e., the priority levels of the ATMs 11) depends on the following three criteria, as will be described later:

(1) the fact as to whether the instruction received from the WS 18 is for a replenishing operation or a collecting operation;

(2) the fact as to whether the number of bills to be used for replenishing the ATM or to be collected from the ATM is large or small; and (3) the fact as to whether the bills to be used for replenishing the ATM or to be collected from the ATM are ten-thousand-yen bills or thousand-yen bills.

In short, at the time of the collective bill replenishment/collection operation, the WS 18 estimates, in terms of both the ten-thousand-yen bills and the thousand-yen bills, the number of bills to used to replenish each ATM 11 and the number of bills to be collected from each ATM 11. The WS 18 issues a replenishment/collection instruction to the mobile cart 50 on the basis of the estimation. The order in which the ATMs 11 are subjected to the bill replenishment/collection operation will be determined in the following manner:

(1) A higher priority is assigned to an ATM to be replenished with bills than to an ATM from which bills are to be collected.

(2) A higher priority is assigned to an ATM to be replenished with a large number of ten-thousand-yen bills or an ATMs from which a large number of ten-thousand-yen bills are to be collected.

(3) When there are two ATMs to be replenished with the same number of ten-thousand-yen bills or two ATMs from which the same number of ten-thousand-yen bills are to be collected, a higher priority is assigned to the ATM to be filled with a larger number of thousand-yen bills or the ATM from which a larger number of thousand-yen bills are collected.

FIG. 15 shows a specific example in which the priority levels of the ATMs are determined on the basis of the above-described criteria. FIG. 15 shows priority levels (1st to 8th priority levels) assigned to the ATMs having automatic machine numbers #1 to #8, the type of instruction (a collecting instruction/a replenishing instruction) given to the ATMs #1 to #8, the number of ten-thousand-yen bills to be used for replenishing the ATMs #1 to #8 or to be collected therefrom, and the number of thousand-yen bills to be used for replenishing the ATMs #1 to #8 or to be collected therefrom.

In the example shown in FIG. 15, collection instructions are output for the ATMs #1 to #4, and replenishment instructions are output for the ATMs #5 to #8. The collecting operation for the ATMs #1 to #4 is preferentially carried out before the replenishing operation for the ATMs #5 to #8 is carried out.

Among the ATMs #1 to #4, the ATM #3 holds the largest number of ten-thousand-yen bills (e.g., 5,000 ten-thousand-yen bills), and hence the collection of bills from the ATM #3 is carried out first. The ATMs #1 and #2 hold the same number of ten-thousand-yen bills, i.e., 4,000 ten-thousand-yen bills. The collection of bills from the ATM #2 is carried out first, because it holds a larger number of thousand-yen bills (e.g., 3,000 thousand-yen bills) than does the ATM #1. Therefore, the collection of bills is carried out in the order of ATM #3, ATM #2, ATM #1, and ATM #4.

Similarly, the order in which the replenishment operation is carried out for the ATMs #5 to #8 is determined as ATM #5, ATM #7, ATM #6, and ATM #8. Eventually, the mobile cart carries out the replenishment/collection operation in the order of ATM #3, ATM #2, ATM #1, ATM #4, ATM #5, ATM #7, ATM #6, and ATM #8.

FIG. 16 is a table for explaining a method of selecting a bill cassette 22, which is to be set in the ATM subjected to the replenishment/collection operation by the mobile cart 50, from among a plurality of bill cassettes 22 usable in the collective bill replenishment/collection operation. As will be described later, the bill cassette 22 is determined on the basis of the following three criteria: (1) the fact as to whether or not the bills stored in the bill cassette 22 has already been counted; (2) the fact as to whether the bill cassettes 22 have been loaded onto the mobile cart 50 or set into the cassette station 53; and (3) the fact as to whether the number of bills stored in the bill cassette 22 is larger or small.

That is, when the collective bill replenishment/collection operation is carried out for each ATM 11, the selection of the bill cassette 22, which is to be set into the ATM 11 subjected to the bill replenishment/collection operation by the mobile cart 50, varies depending on the circumstances. For this reason, the bill cassette 22 is determined in the following manner:

(1) A higher priority is assigned to a bill cassette holding bills which have not yet been counted than to a bill cassette holding bills which have already been counted.

(2) A higher priority is assigned to a bill cassette loaded onto the mobile cart 50 than to a bill cassette set in the cassette station 53.

(3) A higher priority is assigned to a bill cassette holding a smaller number of bills (the total number of ten-thousand-yen bills and thousand-yen bills).

FIG. 16 shows a specific example in which the priority levels of the bill cassettes 22 are determined based on the above-described criteria. FIG. 16 shows priority levels (1st priority to 4th priority) assigned to the cassettes having numbers #1 to #4 (they will be hereinafter described as a cassette #1, . . . , and a cassette #4, respectively), counted/uncounted information regarding each of the cassettes #1 to #4, information as to whether or not the cassette is loaded onto the mobile cart 50 (when the cassette is not loaded onto the mobile cart, it is set in the cassette station 53), and the number of bills stored in each of the cassettes #1 to #4 (the total number of ten-thousand-yen bills and thousand-yen bills).

In the example shown in FIG. 16, only the bills stored in the cassette #3 among the four cassettes #1 to #4 have not yet been counted. Therefore, the cassette #3 is selected first. The cassette #2 among the four cassettes #1 to #4 has been loaded onto the mobile cart 50, and hence the cassette #2 is preferentially selected subsequent to the cassette #3. The bills stored in the cassettes #1 and #4 have already been counted, and these cassettes have been set in the cassette station 53. The cassette #1 holds a smaller number of bills (e.g., 1,000 bills) than does the cassette #4 (e.g., 1,200 bills). Hence, the cassette #1 is selected before the cassette #4.

The flow of the series of collective bill replenishment/collection operations executed by the ATM operation supporting system of the present embodiment, as based on the above-described criteria of judgement, will be described with reference to FIGS. 17, 18 (flowcharts: steps S1 to S27), and 19 (a time chart).

Assume that a priority has been determined so as to carry out the bill replenishment/collection operation for the automatic machines (ATMs) in the order of ATM #1, ATM #2, ATM #3, . . . , as shown in FIG. 19(b). Further assume that each ATM 11 used here is of the type which causes an ATM failure due to occurrence of an error if a bill cassette (ATM cassette) 22 is removed from the ATM 11. Therefore, the ATM 11 is inevitably put into an inactive state when the bill cassette 22 is removed from the ATM 11.

When the bill cassette 22, which contains the number of bills described with reference to FIG. 14(a), is set in the cassette station 53 by the clerk in charge (step S1), the mobile cart 50 takes therein the bill cassette 22 from the cassette station 53 in response to an instruction from the STC 54 (step S3). The bill cassette 22 now serves as a mobile cart cassette.

The STC 54 constantly monitors whether or not the current time has reached a collective replenishment/collection time previously input in the WS18. When the collective replenishment/collection time is reached (step S2), the mobile cart 50 is moved to the ATM #1 according to an instruction from the STC 54 (step S4), and the ATM #1 is brought into an in active state (step S5).

In this state, the mobile cart 50 opens the automatic door 11D of the ATM #1 (step S6), and the mobile cart cassette (the bill cassette taken into the mobile cart 50 in step 3) 22 and the ATM cassette 22 (the bill cassette already set in the ATM #1) are exchanged with each other (step S7). The automatic door 11D of the ATM #1 is then closed (step S8), and the ATM cassette 22 removed from the ATM #1 is stored in any one of the two storages 77 disposed on the mobile cart 50.

In the ATM #1 in which the mobile cart cassette 22 has been set, the bills in the mobile cart cassette 22 are counted (step S9). A stacker (not shown) in the ATM #1 is replenished with a predetermined number of bills supplied from the mobile cart cassette 22 (or bills are collected from the ATM #1) (step S10).

The mobile cart 50 again opens the automatic door 11D of the ATM #1 (step S11), and the ATM cassette 22 stored on the mobile cart 50 and the mobile cart cassette 22 loaded into the ATM #1 are exchanged with each other (step S12). The automatic door 11D of the ATM #1 is again closed (step S13). The ATM #1 counts the number of bills stored in the ATM cassette 22 returned from the mobile cart 50 (step S14). The ATM #1 is reset to start transactions (step S15).

Similarly, the bill replenishment/collection operation performed by the mobile cart 50 is carried out for ATMs #2, #3, etc. Steps S16 to S27 shown in FIG. 18 are provided to replenish the ATM #2 with bills or to collect bills therefrom, and they correspond to the previously described steps S4 to S15, respectively. The processing similar to the previously described processing is performed for the bill replenishment/collection operations for each of the ATM #3 and subsequent ATMs. Hence, its description will be omitted here.

For example, in the case where the ATM 11 is replenished with 100 bills supplied from the mobile cart cassette 22 which holds 400 bills, an operation A comprising a sequence of operations performed in steps S4 to S8 is executed in about four minutes, as shown in FIG. 19(a). An operation B, which comprises a sequence of operations performed in steps S9 and S10 to be executed by the ATM 11, is carried out in about six minutes. An operation C comprising a sequence of operations performed in steps S11 to S15 is executed in about five minutes. Therefore, one ATM 11 is replenished with bills in a total of about 15 minutes.

In the case where the bill replenishment/collection operation is continuously carried out for a plurality of ATMs 11, the above-described set of operations A, B, and C is repetitively executed for each of the ATMs 11, as shown in FIG. 19(b).

Recently, there has been developed an ATM 11 that does not cause any errors; that is, no ATM failures occur even when the bill cassette (ATM cassette) 22 is removed from the ATM 11 while a transaction is being performed. Procedures for carrying out the collective bill replenishment/collection operation for ATMs 11 of such a type will be described later with reference to FIGS. 29 to 31.

By virtue of the above-described collective replenishment/collection function, the bill replenishment/collection operation for the ATMs 11 is collectively carried out at an appropriate time using the mobile cart 50. As a result, the numbers of bills stored in the ATMs 11 are balanced, thus making it possible to reduce the total amount of money used in the ATM area (the automatic machine area) as well as to reduce the burden on the clerk in charge. By virtue of the above-described collective replenishing function, the ATM 11 is previously replenished with a required number of bills rather than being replenished with bills only when the number of bills in the ATM 11 has run short. As a result, it becomes possible to reduce the number of times the mobile cart 50 runs, which in turn results in a longer life of the mobile cart 50. Further, it is possible to prevent the mobile cart 50 from hindering the clerk in the performance of his/her duties.

The order in which the mobile cart 50 carries out the bill replenishment/collection operation for the ATMs 11 is determined on the basis of the criteria previously described with reference to FIG. 15. Moreover, when there are a plurality of bill cassettes 22, a bill cassette 22 to be used is determined on the basis of the predetermined criteria previously described with reference to FIG. 16. Hence, it becomes possible to efficiently carry out the bill replenishment/collection operation.

(b-3) Description of Periodical Bill Replenishment/Collection Operation and Urgent Bill Replenishment/Collection Operation The WS 18 of the present embodiment constantly manages and grasps the number of bills currently being stored in each ATM 11 in a real-time manner while the ATMs 11 are performed transactions.

By virtue of the periodical replenishment/collection function of the present embodiment, the WS 18 periodically estimates the demanded number of bills for each ATM 11 on the basis of changes in the number of bills stored in each ATM 11. The WS 18 controls the bill replenishment/collection operation performed by the mobile cart 50 according to the thus estimated desired number of bills such that the numbers of bills in the ATM 11 are balanced.

By virtue of the urgent replenishment/collection function, the WS 18 controls the mobile cart 50 so as to urgently carry out the bill replenishment/collection operation for an ATM 11 in which the number of bills currently being stored has reached the near-end number of bills/the near-full number of bills previously set for that ATM 11.

In this event, the WS 18 also constantly manages and grasps the number of bills stored in the mobile cart cassette 22. When the number of bills stored in the mobile cart cassette 22 has reached the near-end number of bills/the near-full number of bills previously set for the mobile cart 50, the WS 18 controls the bill replenishment/collection operation performed by the mobile cart 50 carried out between the mobile cart cassette 22 and the ATM 11 capable of being subjected to the bill replenishment/collection operation, such that the number of bills in the mobile cart cassette 22 falls in the range between the near-end number of bills/the near-full number of bills set for the mobile cart 50.

Figure 20:
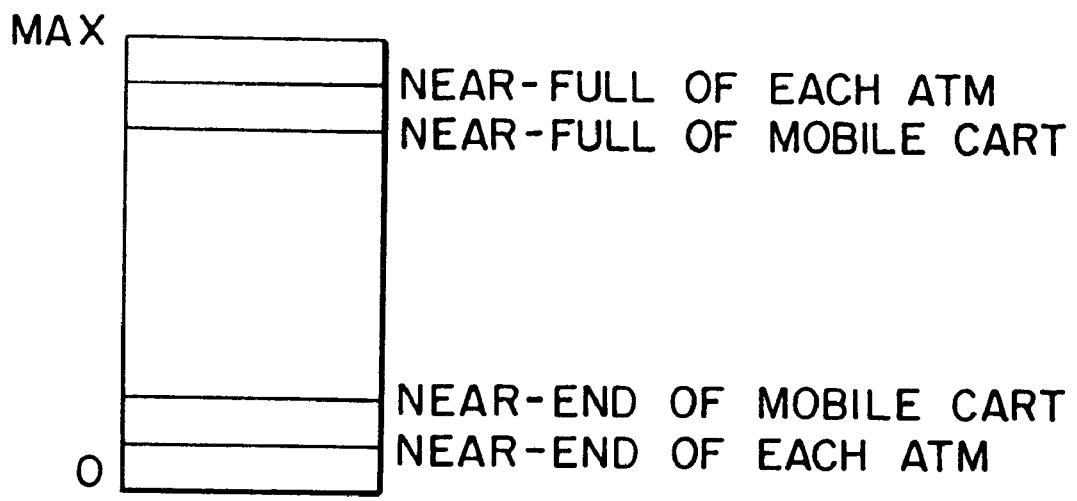
FIG. 20 is a diagram for explaining the setting of a near-full number of bills and a near-full number of bills according to the present embodiment.

That is, although the WS 18 constantly monitors the number of bills stored in each ATM 11 in the present embodiment, the WS 18 also constantly monitors whether or not the number of bills in the mobile cart cassette 22 has reached the near-end number of bills/the near-full number of bills set in the mobile cart, because the near-end number of bills/the near-full number of bills are set for the mobile cart cassette 22 in addition to the near-end number of bills/the near-full number of bills for each ATM 11. The near-end number of bills set for the mobile cart is set so as to become larger than the near-end number of bills set for each ATM 11, and the near-full number of bills for the mobile cart is set so as to be smaller than the near-full number of bills for each ATM 11, as shown in FIG. 20. As a result, the near-end/near-full state of the mobile cart cassette 22 is detected before the ATM 11 enters the near-end/near-full state. Upon detecting that the number of bills in the mobile cart cassette 22 has reached a present number, the WS 18 automatically executes the bill replenishment/collection operation between the mobile cart cassette 22 and the ATM 11.

The previously described periodical replenishment/collection function and urgent replenishment/collection functions will be described according to a flowchart shown in FIGS. 21 to 23 (steps S31 to S61).

Every time the ATM 11 carries out a transaction (a positive judgment is made in step S31), the WS 18 sends a transaction information request to each ATM 11 in order to know the number of bills stored therein (step S33). When no ATM 11 has carried out transactions (a negative judgment is made in step S31), the banking information request is sent from the WS 18 to each ATM 11, for example, once every ten minutes under the control of a timer (a positive judgment is made in step S32 so as to proceed to step S33).

Upon receipt of a report including transaction information from the ATM 11 in answer to the banking information request (step S34), it is checked whether or not the number of bills in the ATM 11 has reached the near-end number of bills/the near-full number of bills (step S35). When the number of bills in the ATM 11 has reached the near-end number of bills/the near-full number of bills (a positive judgment is made in step S35), the replenishment/collection operation is urgently carried out with respect to that ATM 11 (steps S36 to S44).

To carry out the urgent bill replenishment/collection processing, the WS 18 initially estimates the number of bills to be used for replenishing the ATM or to be collected therefrom (step S36). The WS 18 determines whether to replenish the ATM with bills or to collect bills therefrom depending on the fact that the number of bills in the ATM has reached either the near-end number of bills or the near-full number of bills (step S37).

When it has been determined that the number of bills in the ATM has reached the near-full number of bills, and that collecting processing is to be performed, the estimative collecting number of bills obtained in step S36 and the collecting number of bills preset in the WS 18 are compared to each other (step S38). When the estimative collecting number of bills has not reached the preset collecting number of bills (a positive judgment is made in step S38), bills the number of which corresponds to the preset collecting number are collected from the ATM 11 which requires the collecting operation (step S40). On the other hand, when the estimative collecting number of bills is larger than the preset collecting number (a negative judgment is made in step S38), bills the number of which corresponds to the estimative collecting number are collected from the ATM 11 (step S41).

When it has been determined that the number of bills in the ATM 11 has reached the near-end number of bills, and that the ATM 11 should be replenished with bills, the estimative replenishing number of bills obtained in step S36 and the replenishing number of bills preset in the WS 18 are compared with each other (step S39). When the estimative replenishing number of bills has not reached the preset replenishing number (a positive judgment is made in step S39), the ATM 11 which needs the replenishing operation is replenished with bills the number of which corresponds to the preset replenishing number (step S42). On the other hand, when the estimative replenishing number of bills is larger than the preset replenishing number of bills (a negative judgment is made in step S39), the ATM 11 is replenished with bills the number of which corresponds to the estimative replenishing number (step S43).

When the above-described urgent bill replenishment/collection operation has been completed (step S44), or when it has been determined in step S35 that the in-apparatus number of bills (the number of bills in the ATM) has reached neither the near-end number of bills nor the near-full number of bills (a negative judgment is made in step S35), it is determined whether or not the current time is the periodical replenishment/collection time (step S45).

When it has been determined that the current time is the periodical replenishment/collection time (a positive judgment is made in step S45), the WS 18 estimates changes in the number of bills in each ATM 11 at predetermined time intervals (every time when it is detected in step S32 shown in FIG. 21 that ten minutes have elapsed, in the present embodiment) under the control of the timer, whereby the number of bills demanded by the next periodical replenishment/collection operation (performed after ten minutes has elapsed) is calculated.

The difference ([the in-apparatus number of bills]–[the demanded number of bills]) between the preset in-apparatus number of bills (included in the transaction report) received in step S34 and the demanded number of bills calculated in step S46 is calculated. Subsequently, it is judged based on the polarity of the difference whether the bill collection processing or the bill replenishment processing is to be performed. When the difference is positive, namely, when the current in-apparatus number of bills is larger than the estimative demanded number of bills, the processing proceeds to the bill collection processing performed in steps S48 to S54. On the other hand, when the difference is negative, namely, when the in-apparatus number of bills is less than the estimative demand number of bills, the processing proceeds to the bill replenishment processing performed in steps S55 to S61.

When the processing proceeds to the bill collection processing, it is determined (in step S48) whether or not the collecting number of bills of each ATM 11 (=[the in-apparatus number of bills]–[the demanded number of bills]) is greater than a predetermined number "n". Only when the collecting number of bills is greater than "n" (a positive judgment is made in step S48), the bill collection processing is performed using the mobile cart 50 (step S49). The mobile cart 50 collects bills from the ATMs 11 one by one, and the bill collection processing in step S49 is repetitively performed until the collection of bills from all of the ATMs 11 which need the collecting operation is completed (until YES is obtained in step S50).

Before the bill collection processing for another ATM 11 is performed, it is judged whether or not the mobile cart cassettes 22 stored on the mobile cart 50 has not become full as a result of the bill collection, namely, whether or not the number of bills in the mobile cart cassette 22 has reached the near-full number of bills set for the mobile cart (step S51). When the mobile cart cassette 22 has not become full (a negative judgment is made in step S51), the processing moves to step S49 immediately.

When the mobile cart cassette 22 is full (a positive judgment is made in step S51), it is judged whether or not there is an ATM 11 which can be replenished with bills (step S52). When this is the case (a positive judgment is made in step S52), the bill replenishment operation is carried out for that ATM 11. As a result, the ATM 11 is replenished with bills held in the mobile cart cassette 22 so that the mobile cart cassette 22 is released from the full state (step S53). The processing then moves to step S49. On the other hand, when there is no ATM 11 which can be replenished with bills (a negative judgment is made in step S52), the clerk in charge collects bills from the mobile cart cassette 22 (step S54). The processing subsequently moves to step S49.

When the processing moves to the bill replenishment processing as a result of the judgment made in step S47, as in the bill collection processing, it is first determined whether or not the replenishing number of bills for each ATM 11 (=[the demanded number of bills]–[the in-apparatus number of bills]) is greater than the predetermined number of bills "n" (step S55). Only when the replenishing number of bills is greater than "n" (a positive judgment is made in step S55), the mobile cart carries out the bill replenishment operation (step S56). The bill replenishment processing for the ATMs 11 is performed one by one, and the bill replenishment operation in step S56 is repetitively executed until all of the ATMs 11, which need the replenishing operation, finish undergoing the bill replenishment operation (until YES is obtained in step S57).

Before the bill replenishment processing for another ATM 11 is performed, it is determined whether or not the mobile cart cassettes 22 stored in the mobile cart 50 has become nearly empty as a result of bill replenishment the ATMs with bills, namely, whether or not the number of bills in the mobile cart cassette 22 has reached the near-end number of bills set for the mobile cart (step S58). When the mobile cart cassette 22 has not become empty (a negative judgment is made in step S58), the processing moves to step S56 immediately.

When the mobile cart cassette 22 is nearly empty (a positive judgment is made in step S58), it is judged whether or not there is an ATM 11 from which bills can be collected (step S59). When this is the case (a positive judgment is made in step S59), the bill collection operation is carried out for that ATM 11. As a result, bills are collected from the ATM 11 to be stored in the mobile cart cassette 22, so that the mobile cart cassette 22 is released from the empty state (step S60). The processing then moves to step S56. On the other hand, when there is no ATM 11 from which bills can be collected (a negative judgment is made in step S59), the clerk in charge replenishes the mobile cart cassette 22 with bills (step S61), and the processing moves to step S56.

The processing returns to step S31 in any one of the following cases: namely, when it has been determined in step S45 that the current time is not the periodical replenishment/collection time (a negative judgment is made in step S45), when it has been determined in step S48 that the collecting number of bills is less than "n" (a negative judgment is made in step S48), when it has been determined in step S50 that the collecting operation has been completed (a positive judgment is made in step S50), when it has been determined in step S55 that the replenishing number of bills is less than "n" (a negative judgment is made in step S55), and when it has been determined in step S57 that the replenishing operation has been completed (a positive judgment is made in step S57).

In the case of the previously described urgent bill replenishment/collection operation or periodical bill replenishment/collection operation, when there are a plurality of ATMs 11 to be subjected to the bill replenishment/collection operation, or when there are a plurality of bill cassettes 22 usable for the bill replenishment/collection operation, the order in which processing is performed for the ATMs 11 and a bill cassette 22 to be used are determined on the basis of the criteria previously described with reference to FIGS. 15 and 16. The bill replenishment/collection processing is executed according to the procedures as previously described with reference to FIGS. 17, 18 and 19.

Figure 24:
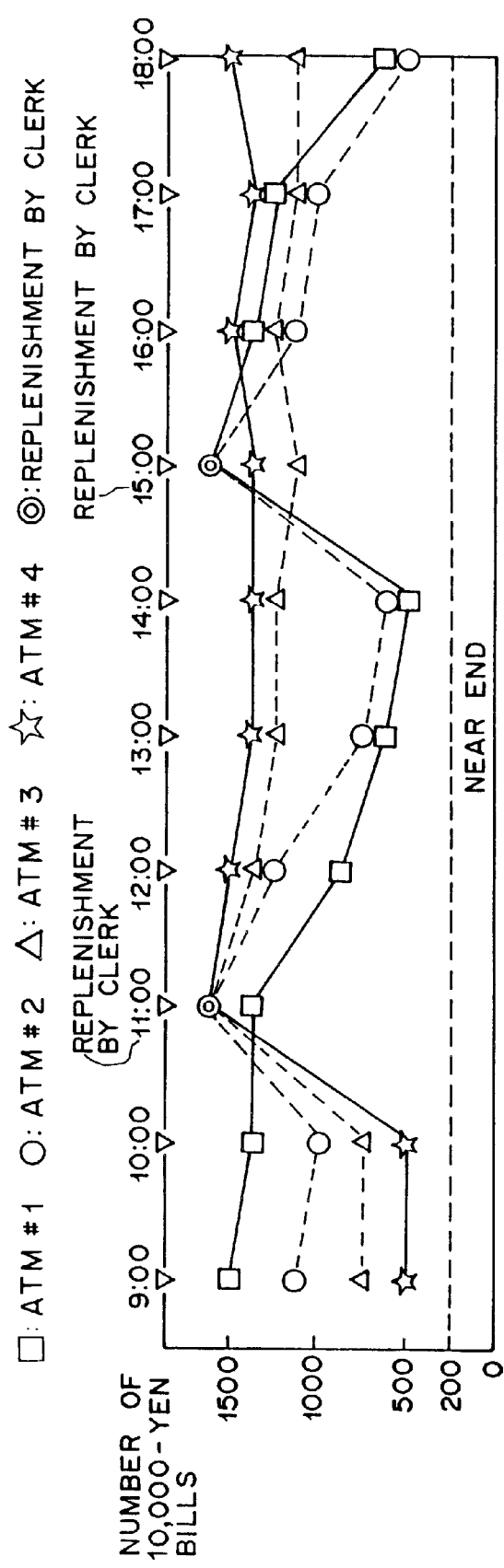
FIG. 24 is a timing chart showing changes in the number of bills in each ATM in the case where a clerk in charge replenishes the ATM with bills.
Figure 25:
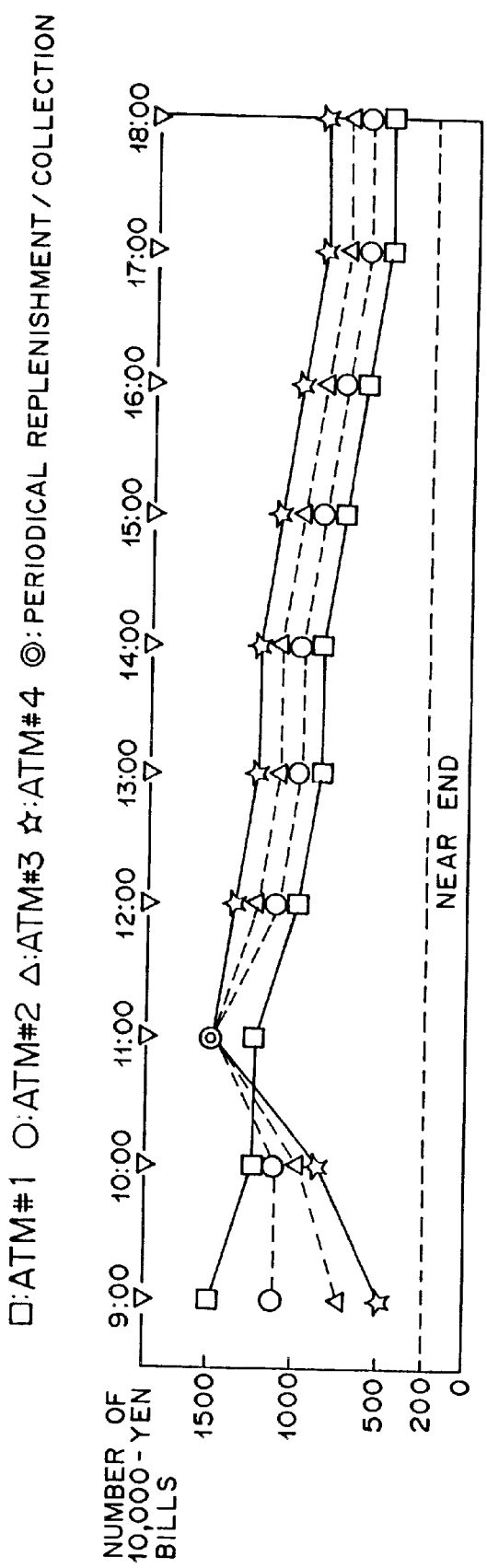
FIG. 25 is a timing chart showing changes in the number of bills in each ATM in the case where the periodical replenishment/collection operation according to the embodiment is carried out.

FIG. 24 is a time chart showing changes in the number of bills (the number of ten-thousand-yen bills) in each of the ATMs 11 when the ATMs 11 are subjected to the above-described bill replenishment processing performed by the clerk in charge in the manner as previously described with reference to FIG. 43. FIG. 25 is a time chart showing changes in the number of bills (the number of ten-thousand-yen bills) in each of the ATMs when the periodical bill replenishment/collection operation is performed by the mobile cart 50 as previously described with reference to FIGS. 21 to 23. FIGS. 24 and 25 show the changes in the numbers of bills in the four ATMs #1 to #4 from 9 a.m. to 6 p.m.

In the case where the ATM system is operated while bill replenishment is performed by the clerk in charge, the ATMs #1 to #4 are replenished with bills before they enter an out-of-service state due to near-end or near-full state, as shown in FIG. 24. In the example shown in FIG. 24, the ATMs are replenished twice between 9 a.m. to 6 p.m. by the clerk in charge. In short, the ATMs #2 to #4 are replenished by the clerk at 11 o'clock, and the ATMs #1 and #2 are replenished by the clerk at 15 o'clock.

Contrary to this, in the case where the ATM system is operated while performing the periodical bill replenishment/collection operation using the mobile cart 50 as in the present embodiment, the mobile cart 50 automatically perform transfer (collection–>replenishment) of bills from ATMs 11 from which a smaller amount of money is withdrawn (ATMs having a large number of bills stored therein) to ATMs 11 from which a larger amount of money is withdrawn (ATMs having a smaller number of bills stored therein).

As a result, after a lapse of one hour since the ATMs #1 to #4 started transactions at 9 a.m., the numbers of bills in the ATMs #1 to #4 at 10 a.m. are balanced to a greater extent, as shown in FIG. 25, compared with the numbers of bills in the ATMs #1 to #4 at 10 a.m. shown in FIG. 24. After the ATMs #2 to #4 have been replenished by the clerk at 11 a.m., the numbers of bills in the ATMs #1 to #4 are constantly balanced. Hence, it becomes unnecessary for the clerk to carry out the second replenishing operation for the ATMs. Therefore, the amount of money is reduced to the minimum, and the out-of-service rate of each of the ATMs #1 to #4 is also decreased.

By virtue of the periodical replenishment/collection function, ATMs 11 from which a larger amount of money is withdrawn are periodically replenished, whereas bills are periodically collected from ATMs which receive a larger amount of money, as a result of which the numbers of bills in the ATM 11 are balanced.

As mentioned above, the number of bills in each ATM 11 is constantly optimized, and it is possible to transfer bills among the plurality of ATMs 11 without taking bills in and out of a cashier's safe (not shown). For these reasons, the amount of money withdrawn from the cashier's safe can be reduced to the minimum, and no bills remain unused in the ATMs 11. Consequently, it is possible to automatically optimize the amount of money used in financial institutions such as a bank.

Conventionally, a clerk in charge replenishes each of the ATMs 11 with the appropriate number of bills. However, as a result of the introduction of the periodical bill replenishment/collection operation carried out by the mobile cart 50, the number of bills is managed on the basis of the estimation which is made by the WS 18 at predetermined time intervals. As a result, it becomes possible to operate the ATMs 11 while the number of bills in each ATM 11 is maintained to be optimum, which in turn results in the burden on the clerk being considerably reduced.

Further, the clerk in charge conventionally checks the number of bills in each ATM 11 by opening the door on the rear side of each ATM 11 and viewing an operator's control screen. However, when a large amount of money is suddenly withdrawn from some ATM 11, it becomes impossible for the clerk to cope with that situation, which often brings the ATM 11 into an out-of-service state. By virtue of the previously described urgent replenishment/collection function, the near-end number of bills/the near-full number of bills is set for each ATM 11, and the WS 18 monitors the number of bills in each ATM 11. As a result, it becomes possible to urgently carry out the bill replenishment/collection operation for the ATM 11 using the mobile cart 50 before the ATM 11 enters the near-end/near-full state.

It is also possible to constantly store the appropriate number of bills in the mobile cart cassette 22. Hence, when the number of bills in each ATM 11 suddenly reaches the near-end number of bills/the near-full number of bills, the ATM 11 is replenished with bills supplied from the mobile cart cassette 22, or bills are collected from the ATM 11 by the mobile cart cassette 22. Thus, it is possible to reliably prevent the ATM 11 from going out of service as a result of entering a near-end/near-full state. The out-of-service rate of the ATM 11 can be significantly reduced.

As described above, according to the ATM operation supporting system, the management of cash in the ATM 11 and the replenishment/collection operation for the ATM 11 can be fully automatically executed. The work which must be performed by the clerk in charge is only to replenish the mobile cart cassette 22 with bills, which results in the burden on the clerk being considerably reduced.

(b-4) Description of Forced Bill Replenishment/Collection Operation

By virtue of the forced replenishment/collection function of the present embodiment, when the number of bills in the mobile cart cassette 22 is set from the outside (from a keyboard 18N or the like), the WS 18 controls the bill replenishment/collection operation performed by the mobile cart 50 between the mobile cart cassette 22 and the ATM 11 capable of being subjected to the bill replenishment/collection operation, such that the number of bills in the mobile cassette 22 becomes equal to the preset number.

In the ATM operation supporting system of the present embodiment, the forced replenishment/collection function is to change the number of bills in the mobile cart cassette 22. The ATMs 11 in operation are replenished with bills supplied from the mobile cart cassette 22, or bills are collected from them by the mobile cart cassette 22. As a result, the number of bills in the mobile cart cassette 22 is forcibly changed so as to be equal to the number of bills set and entered by the clerk from the WS 18. This forced replenishment/collection function is usually used when the number of bills for one day is checked.

The forced bill replenishment/collection operation of the present embodiment will be described with reference to a flowchart shown in FIG. 26 (steps S71 to S75). The number of bills in the mobile cart cassette is adjusted and changed. The way of adjusting and changing the number of bills in the mobile cart cassette has already been described in the above.

Figure 26:
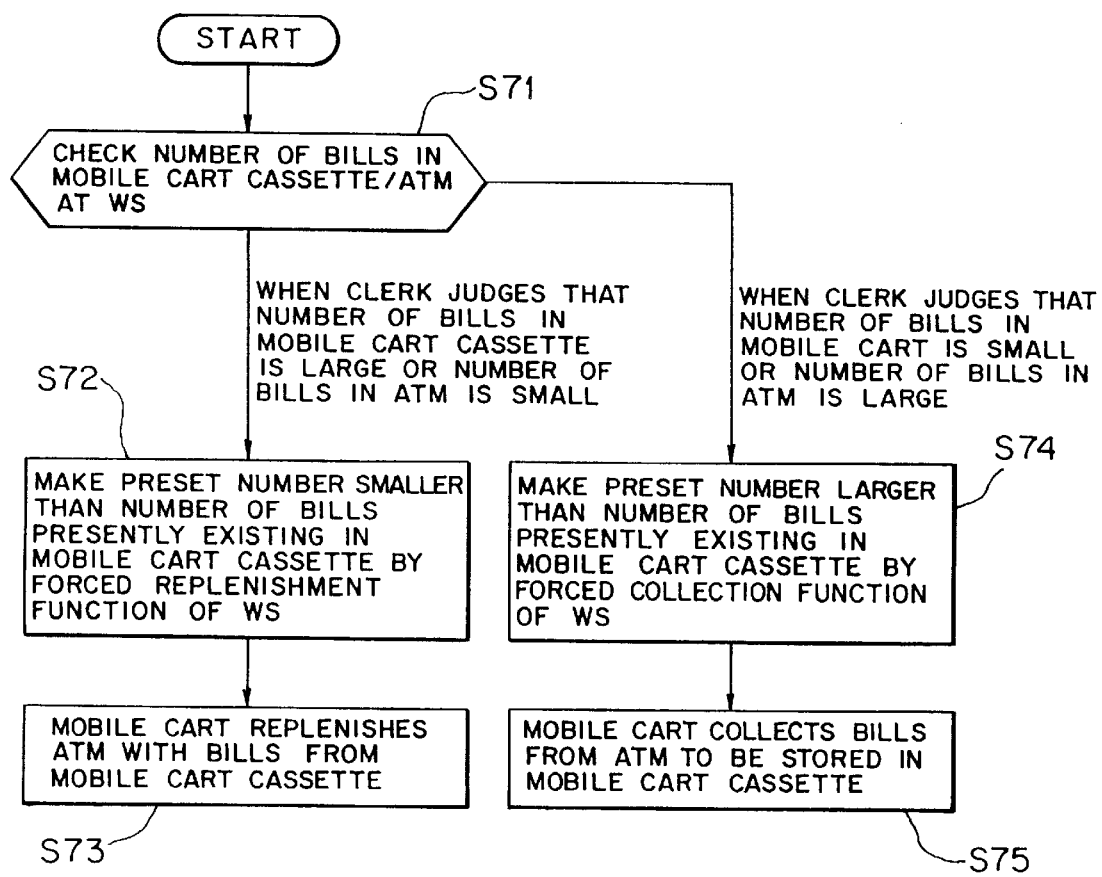
FIG. 26 is a flowchart for explaining a forced replenishment/collection operation according to the present embodiment.
Figure 27:
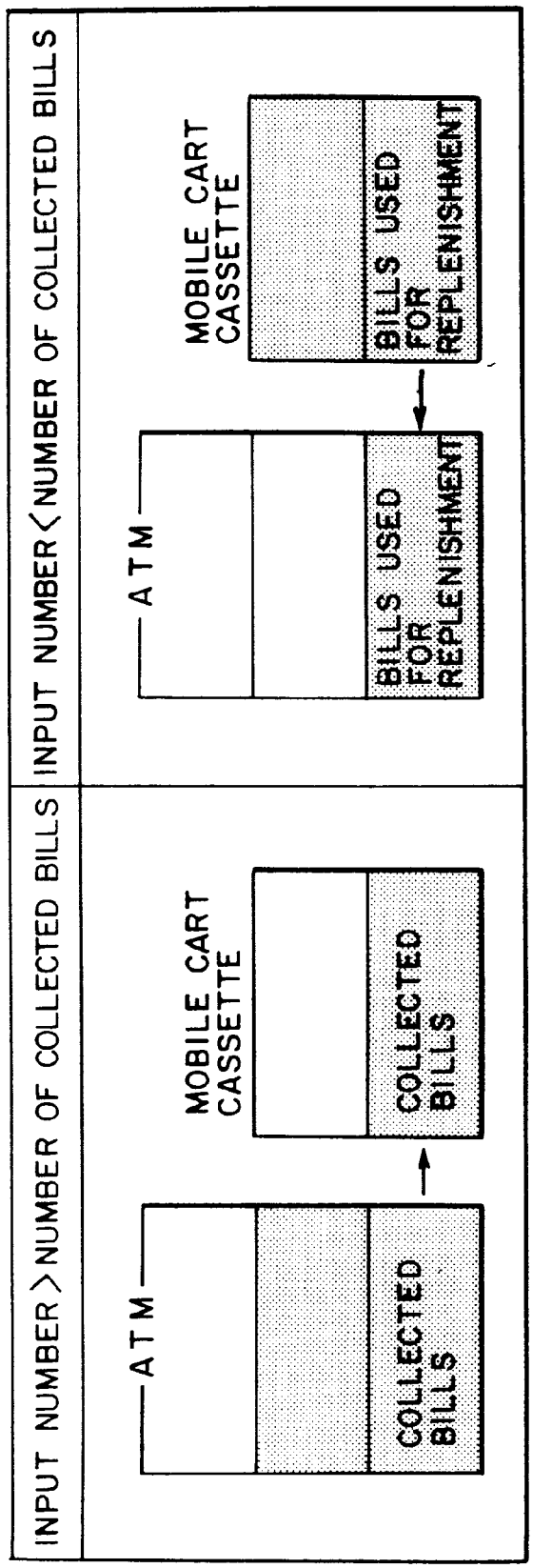
FIGS. 27(a) and 27(b) are diagrams for explaining the forced replenishment/collection operation according to the present embodiment.

As shown in the flowchart in FIG. 26, the number of bills in the mobile cart cassette 22 and the number of bills in the ATM 11 first are fist checked using the WS 18 (step S71).

When the clerk refers to the number of bills in the mobile cart cassette 22 and the number of bills in the ATM 11 which were checked in step S71, and judges that the number of bills in the mobile cart cassette 22 is large (nearly full) or the number of bills in the ATM 11 is small (nearly empty), the clerk sets and inputs a value which is smaller than the number of bills currently stored in the mobile cart cassette 22 so as to activate the forced replenishing function (step S72). As a result, the mobile cart 50 forcibly replenishes the ATM 11 with the bills which are supplied from the mobile cart cassette 22 and the number of which corresponds to the preset value (step S73).

When the clerk refers to the number of bills in the mobile cart cassette 22 and the number of bills in the ATM 11 which were checked in step S71, and judges that the number of bills in the mobile cart cassette 22 is small (nearly empty) or the number of bills in the ATM 11 is large (nearly full), the clerk sets and enters a value which is larger than the number of bills currently stored in the mobile cart cassette 22 is entered to activate the forced collecting function (step S74). As a result, the mobile cart 50 forcibly collects bills, the number of which corresponds to the preset value, from the ATM 11 to be stored in the mobile cart cassette 22 (step S75).

When there exist a plurality of ATMs 11 to be subjected to the forced bill replenishment/collection operation in steps S73 and S75, the ATM 11 having the largest difference between the estimated data regarding the ATM 11 and the current stock amount (the in-apparatus number of bills) is first subjected to the bill replenishment/collection operation. When the bills have been forcibly collected from the ATM 11, that ATM 11 may enter the out-of-service state as a result of the shortage of the bills stored therein because it is not protected against the near-end state and the like.

For instance, when the number of bills (the input number of bills) entered by the clerk from the WS 18 is greater than the number of bills stored in the mobile cart cassette 22 (i.e., the number of collected bills), the mobile cart 50 collects bills the number of which corresponds to the difference between [the input number of bills] and [the number of collected bills] from the ATM 11 to be stored in the mobile cart cassette 22, as shown in FIG. 27(a).

Conversely, when the number of bills (the input number of bills) entered by the clerk from the WS 18 is smaller than the number of bills stored in the mobile cart cassette 22 (i.e., the number of bills collected from the ATM), the mobile cart 50 replenishes the ATM 11 with bills the number of which corresponds to the difference between [the input number of bills] and [the number of collected bills] supplied from the mobile cart cassette 22, as shown in FIG. 27(b). In this way, the number of bills stored in the mobile cart cassette 22 is adjusted.

Figure 28:
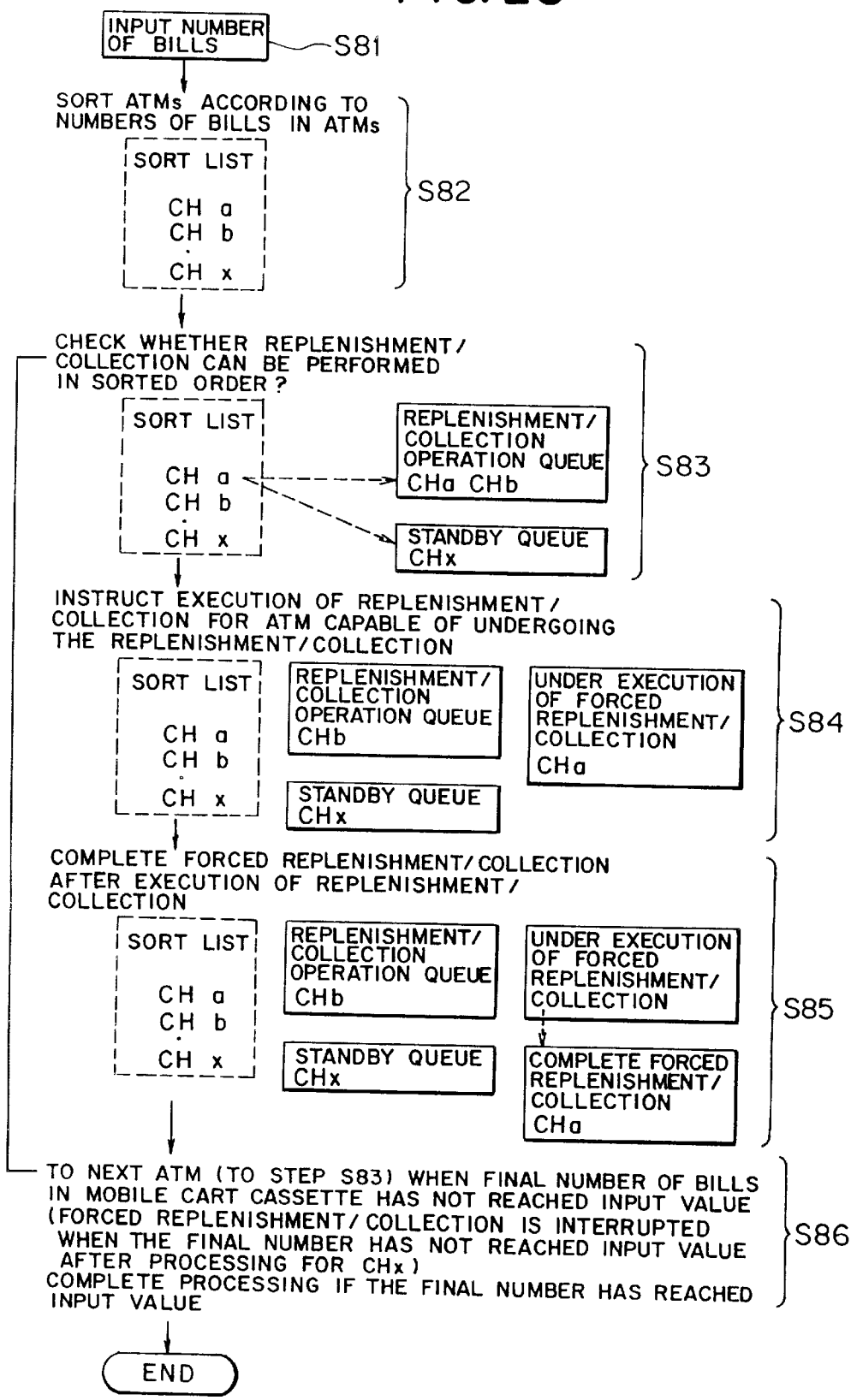
FIG. 28 is a flowchart for explaining the forced replenishment/collection operation according to the present embodiment more specifically.

In the present embodiment, when the number of bills in the mobile cart cassette 22 is entered from the WS 18 by the clerk, and the forced bill replenishment/collection operation is carried out, the control is performed on the right to carry out the replenishment/collection operation for each ATM 11, as shown in, for example, FIG. 28, in order to prevent the forced replenishment/collection operation from competing with the urgent bill replenishment/collection operation, the periodical bill replenishment/collection operation, and the collective bill replenishment/collection operation which are carried out in the normal operation.

As shown in FIG. 28, when the clerk in charge enters the number of bills in the mobile cart cassette 22 (step S81), the WS 18 first sorts all of the ATMs 11 according to the numbers of bills in the ATMs and prepares a sort list (step S82). Then, the WS 18 checks whether or not the forced bill replenishment/collection operation can be actually carried out for the ATMs 11 in the order sorted (step S83).

As a result of this, when there is an ATM 11 which is not to be subjected to any of the urgent bill replenishment/collection operation, the periodical bill replenishment/collection operation, and the collective replenishment/collective operation but is capable of undergoing the forced bill replenishment/collection operation, the information on that ATM 11 (e.g., CHa or CHb) is written into a bill replenishment/collection operation queue. On the other hand, when there is an ATM 11 which is to be subjected to any one of the urgent bill replenishment/collection operation, the periodical bill replenishment/collection operation, and the collective replenishment/collective operation and is not capable of undergoing the forced bill replenishment/collection operation, the information on that ATM 11 (e.g., CHx) is written into a standby queue.

The WS 18 sequentially reads the ATM information written into the bill replenishment/collection operation queue. Then, it instructs the mobile cart 50 to forcibly carry out the replenishing or collecting operation for the ATM corresponding to the ATM information (CHa) (i.e., the ATM capable or undergoing the forced bill replenishment/collection operation) (step S84).

After the forced bill replenishment/collection operation for one ATM (CHa) 11 has been completed (step S85) in the above-described manner, it is determined that the number of bills in the mobile cart cassette 22 reaches the value set and input using the WS 18 as the result of execution of the forced bill replenishment/collection operation is examined; namely, (step S86). When the number of bills in the mobile cart cassette 22 has reached that value, the forced bill replenishment/collection operation is completed. On the other hand, when this is not the case, the processing returns to step S83, and the same processing is repetitively executed. The mobile cart 50 forcibly executes the replenishment/collection operation for another ATM 11 capable of undergoing the forced bill replenishment/collection operation.

The WS 18 sequentially reads the ATM information written into a replenishment/collection queue until the number of bills in the mobile cart cassette 22 reaches the value set and input using the WS 18. The forced bill replenishment/collection operation is carried out for the ATM 11 corresponding to the thus read ATM information. Moreover, the forced bill replenishment/collection operation is carried out for the ATM 11 corresponding to the ATM information (CHx) written into the standby queue, after the completion of the urgent bill replenishment/collection operation, the periodical bill replenishment/collection operation, or the collective bill replenishment/collection operation. When the number of bills in the mobile cart cassette 22 still fails to reach the value set and input using the WS 18, the forced bill replenishment/collection operation is terminated.

By virtue of the previously described forced replenishment/collection function, it is possible for the clerk in charge to forcibly carry out the bill replenishment/collection operation between the mobile cart 50 and each ATM 11 in operation. Therefore, it becomes possible to significantly reduce the burden on the clerk, and to contribute to the considerably reduced amount of money used in the ATM area 10.

(b-5) Description of Modified Example of Bill Replenishment/Collection Operation In the ATM operation supporting system of the above-described embodiment, the next operation is executed after one operation has been completed in the manner as previously described with reference to FIGS. 17 to 19, because importance is placed on the reliable completion of each operation.

Only one mobile cart cassette 22 is placed on the mobile cart 50 in the previously described ATM operation supporting system. Therefore, when the bill replenishment/collection operation is carried out for a plurality of ATMs 11, it is necessary to exchange the mobile cart cassette 22 with another bill cassette as already described with reference to FIGS. 17 to 19. The next operation can be executed for the next ATM 11 only after the processing for the current ATM 11 has been completed.

As has been already described with reference to FIGS. 17 and 18, the bill replenishment/collection operation of the present embodiment has a lot of operation patterns, which in turn makes it possible to process the plurality of ATMs 11. When it takes about 15 minutes to carry out the bill replenishment/collection operation for one ATM 11, and when the bill replenishment/collection operation is carried out for a plurality of ATMs 11, as shown in FIG. 19(*a*), it will take a period of time which is obtained by multiplying 15 minutes by the number of ATMs 11, as shown in FIG. 19(*b*).

As described above, when emphasis is placed on the completion of the operation rather than a reduction in the operating time, the operating time inevitably becomes longer. For this reason, in the case where the plurality of ATMs 11 are apt to enter a near-end/near-full state and the bill replenishment/collection operation is carried out for these ATMs 11, there is a possibility that the ATM operation supporting system has a problem in terms of time and performance, because it becomes impossible to cope with time requirements.

To prevent this problem, during the course of the bill replenishment/collection operation comprising the plurality of operations as previously described with reference to FIGS. 17 and 18, the mobile cart 50 loads a bill cassette 22 into an ATM 11 to be subjected to the bill replenishment/collection operation. Thereafter, the mobile cart 50 closes the automatic door 11D of that ATM 11 at the same time that ATM 11 counts the number of bills in the bill cassette 22.

At this time, two bill cassettes 22 are loaded in the mobile cart 50, and the mobile cart 50 travels to the second ATM 11 for carrying out the bill replenishment/collection operation while carrying out the bill replenishment/collection operation for the first ATM 11. As a result, the bill replenishment/collection operation is carried out for the two ATMs 11 at the same time. In short, the WS 18 controls the mobile cart 50 such that the counting action within the ATM 11 and the bill replenishment/collection operation for that ATM 11 are performed simultaneously with the bill replenishment/collection operation for another ATM 11.

The modified example of the bill replenishment/collection operation will be described hereinbelow with reference to FIGS. 29 and 30 (a flowchart: steps S91 to S109 and S111 to S114), and FIG. 31 (a time chart).

In this case as well, the bill replenishment/collection operation is carried out on the basis of the criteria as previously described with reference to FIGS. 15 and 16. In FIGS. 29 and 30, the ATMs #1 and #2 are to be subjected to the bill replenishment/collection operation, and a processing priority is determined in such a way that the processing for the ATM #1 is preferentially carried out before the processing for the ATM #2.

FIG. 31(*b*) shows the timing of execution of work in the case where the bill replenishment/collection operation is carried out for six ATMs #1 to #6 according to the procedures as described with reference to FIGS. 29 and 30. In the example shown in FIG. 31(*b*), priorities are determined such that the collective bill replenishment/collection operation is carried out for the ATMs in the order of #1, #2, . . . , #6.

The ATM 11 used in this example is different from the ATM 11 used in the embodiment which has been described with reference to FIGS. 17 to 19. Specifically, the ATM 11 of this type does not causes an error, that is, an ATM failure, even when the bill cassette (the ATM cassette) 22 is removed from the ATM during the course of the banking operation.

For the ATM 11 of this type, when the cassette 22 is removed from the ATM 11 while it is waiting for a customer, the number of bills stored in the cassette 22 is counted, or counting of the number of bills in the cassette 22 and automatic replenishing of the stacker with bills are carried out when the number of bills in the stacker is smaller than the preset number of bills. Further, when the cassette 22 is removed from the ATM 11 while the customer is operating it, no special processing is carried out in the ATM 11 (i.e., the ATM 11 does not cause any errors). Accordingly, even when the ATM 11 is performing in the course of the banking operation, it becomes possible to remove the bill cassette 22 without changing the ATM 11 into an inactive state. For this reason, the step for rendering the ATM 11 inactive is omitted from the flow of procedures which will be described with reference to FIGS. 29 and 30.

Figure 29:
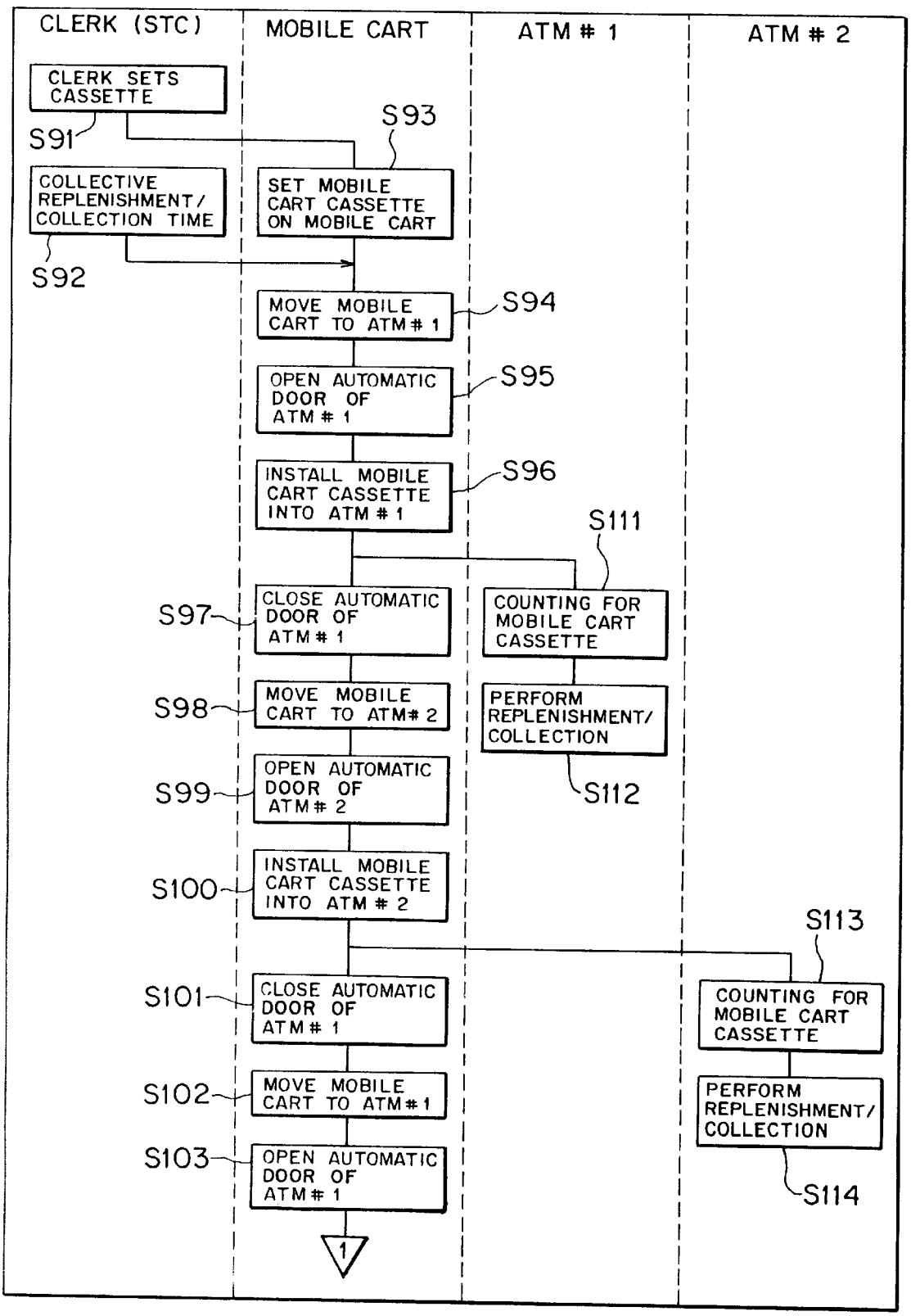
FIG. 29 is a flowchart for explaining a modification of the replenishment/collection operation according to the present embodiment.
Figure 30:
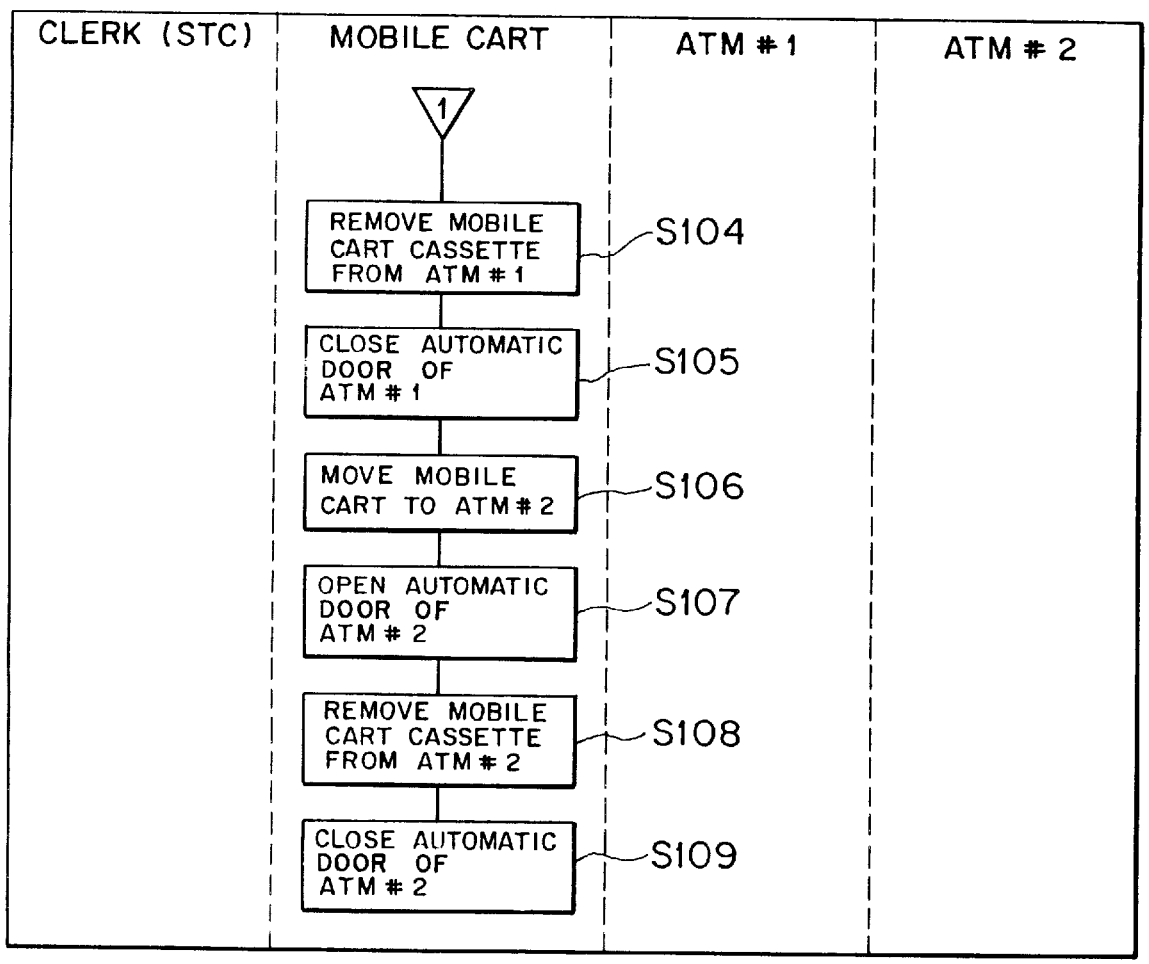
FIG. 30 is a flowchart for explaining the modification of the replenishment/collection operation according to the present embodiment.

In the modification of the bill replenishment/collection operation, the clerk in charge loads two bill cassettes 22 holding the predetermined number of bills, which have already been described with reference to FIG. 14(*a*), into the cassette station 53, as shown in FIGS. 29 and 30 (step S91). In response to an instruction from the STC 54, the mobile cart 50 takes therein the two bill cassettes 22 from the cassette station 53 as the mobile cart cassettes, and the thus acquired mobile cart cassettes are set on the mobile cart 50 (step S93).

The STC 54 is constantly monitoring whether or not the current time has reached the collective replenishment/collection time previously input in the WS18. When the current time has reached the collective replenishment/collection time (step S92), the mobile cart 50 is moved to the ATM #1 according to the instruction from the STC 54 (step S94).

When the mobile cart 50 arrives at the rear side of the ATM #1, the mobile cart 50 opens the automatic door 11D of the ATM #1 without changing the ATM #1 into an inactive state (step S95). A first mobile cart cassette (one of the two bill cassettes loaded onto the mobile cart in step S93) is loaded into the ATM #1 (step S96).

The mobile cart 50 is provided with the two storages 77 for retaining the bill cassettes 22, as shown in FIG. 6. However, when the two bill cassettes 22 are set on the mobile cart 50 in step S93, it is impossible to set another ATM cassette 22 in the storage 77, which further makes it impossible to exchange the cassettes with each other in the manner as shown in FIGS. 17 and 18. For these reasons, the ATM cassette 22 is not loaded into the ATM 11 in the ATM operation supporting system which is described with FIGS. 29 and 30.

Subsequently, the mobile cart 50 closes the automatic door 11D of the ATM #1 (step S97), and in the ATM #1, the number of bills in the mobile cart cassette 22 loaded therein is counted simultaneously with the door closing operation (step S111). Further, the stacker in the ATM #1 is replenished with a predetermined number of bills supplied from the mobile cart cassette 22 (or bills are collected from the ATM #1 to be stored the mobile cart cassette 22) (step S112).

After having closed the automatic door 11D of the ATM #1, the mobile cart 50 travels to the rear side of the ATM #2 (step S98). As in the previously described steps S95 and S96, the mobile cart 50 opens the automatic door 11D of the ATM #2 without stopping the ATM #2 (step S99). The second mobile cart cassette 22 (i.e., the remaining one of the two bill cassettes loaded onto the mobile cart 50 in step S93) is then loaded into the ATM #2 (step S100).

As in the previously described steps S97 and S111, the mobile cart 50 closes the automatic door 11D of the ATM #2 (step S101), and in the ATM #2 the number of bills in the mobile cart cassette 22 loaded therein is counted simultaneously with the door closing operation (step S113). Further, the stacker in the ATM #2 is replenished with a predetermined number of bills supplied from the mobile cart cassette 22 (or bills are collected from the ATM #2 to be stored in the mobile cart cassette 22) (step S114).

After having closed the automatic door 11D of the ATM #2, the mobile cart 50 travels to the rear side of the ATM #1 again (step S102). The mobile cart 50 opens the automatic door 11D of the ATM #1 without stopping the ATM #1 (step S103). The mobile cart cassette 22 loaded into the ATM #1 is removed and stored on the mobile cart 50 (step S104), and the mobile cart 50 closes the door 11D of the ATM #1 (step S105).

Further, the mobile cart 50 travels to the rear side of the ATM #2 (step S106). The mobile cart 50 opens the automatic door 11D of the ATM #2 without stopping the ATM #2 (step S107). The mobile cart cassette 22 loaded into the ATM #2 is removed and stored on the mobile cart 50 (step S108), and the mobile cart 50 closes the door 11D of the ATM #2 (step S109). As a result, the bill replenishment/collection operations for the two ATMs #1 and #2 are now completed.

As mentioned above, according to the modification of the bill replenishment/collection operation of the embodiment, the closing of the automatic doors 11D of the ATMs 11 by the mobile cart 50 (steps S97 and S101) and the counting of the number of bills stored in the mobile cart cassettes 22 loaded in the ATMs 11 (steps S111 and S113) are simultaneously carried out. In addition, the bill replenishment/collection operation is carried out for two ATMs 11 in a parallel manner using two mobile cart cassettes 22.

FIGS. 29 and 30 show the case where the bill replenishment/collection operation is carried out for two ATMs #1 and #2. However, it is possible to carry out the bill replenishment/collection operation for the plurality of ATMs 11 (six ATMs shown in the drawing) by repeatedly performing the same processing, as shown in, e.g., FIG. 31(b).

For example, in the case where the ATM 11 is replenished with 100 bills supplied from the mobile cart cassette 22 which holds 400 bills, the operation A comprising a sequence of operations performed in steps S94 to S97 (S98–S101) is executed in about four minutes, as shown in FIG. 31(a). The operation B, which comprises a sequence of operations performed in steps S111 and S112 (S113 and S114) executed by the ATM 11, is carried out in about six minutes. The operation C comprising a sequence of operations performed in steps S103 to S105 (S107 to S109) is executed in about five minutes. Therefore, one ATM 11 is replenished with bills in a total of about 15 minutes. This example is identical with that shown in FIG. 19(a).

However, as previously described with reference to FIGS. 29 and 30, the automatic door 11D of that ATM 11 is closed at the same time that the number of bills in the bill cassette 22 is counted. Further, the bill replenishment/collection operation for the two ATMs 11 are carried out in a parallel manner. As a result, the operations B and C for the ATM #1 and the operations A and B for the ATM #2 can be carried out in a parallel manner. For the ATMs 11 subsequent to the ATM #2, the operation C for the ATM #n–1 and the operation B for the ATM #n can be executed in a parallel manner.

As is evident from the comparison between the examples shown in FIGS. 31(b) and 19(b), a total amount of time is considerably reduced in the case where the bill replenishment/collection operations are continuously carried out for the plurality of ATMs 11, which results in the system performance being significantly improved.

The collective bill replenishment/collection operation has been described with reference to FIGS. 29 to 31. The above-described idea of reducing the processing time is also applied to the periodical bill replenishment/collection operation and the urgent bill replenishment/collection operation in the same manner as previously described. In consequence, the same effects and advantageous results can be obtained in the same way as previously described.

(b-6) Description of Determination of Number of Bills in Bill Cassette

Where the clerk in charge replenishes the ATM operation supporting system of the present embodiment with bills, a bill cassette 22 is filled with bills, and that bill cassette 22 is loaded into the cassette station 53. The mobile cart 50 takes therein the bill cassette 22 from the cassette station 53 and retains it as the mobile cart cassette. The mobile cart 50 then transfers the mobile cart cassette to the ATM 11 and replenishes that ATM 11 with bills.

The number of bills in the cassette 22 loaded into the ATM 11 is counted by use of a bill discriminating section (not shown) disposed in the ATM 11. As a result, the number of bills (the amount of bills, and stock amount) stored in the cassette 22 by the clerk is recognized (determined) by the ATM operation supporting system.

The number of bills in the cassette 22 is in an undetermined state until it is recognized (determined). Therefore, it is necessary to determine the number of bills as soon as possible and to replenish the ATM 11 with the bills stored in that cassette 22 using the mobile cart 50.

To this end, the mobile cart 50 and the cassette station 53 of the present embodiment are respectively provided with a function for sensing the presence or absence of the bill cassette 22. The WS 18 has functions of receiving the following signals through the LAN 17; namely, a signal for notifying that the mobile cart 50 has loaded a cassette 22, which holds a predetermined number of bills, into the cassette station 53, a signal for notifying that the clerk in charge has loaded a cassette 22 into the cassette station 53 or the mobile cart 50, and a signal for notifying that the ATM 11 has finishing counting the number of bills in the cassette 22 using the bill discriminating section.

In the present embodiment, the WS 18 is further provided with a cassette station memory section, a mobile cart memory section, and an ATM memory section, all of which are not shown. The cassette station memory section can hold information as to whether the number of bills in each of the cassettes 22 loaded in the cassette station 53 is determined or undetermined. The mobile cart memory section can hold information as to whether the number of bills stored in each of the cassettes 22 loaded in the mobile cart 50 is determined or undetermined. The ATM memory section can hold information as to whether the number of bills stored in the cassette 22 loaded in the ATM 11 is determined or undetermined. The above-described memory sections are formed in a memory such as a RAM or the like generally provided in the WS 18.

The information as to whether the number of bills in each cassette 22 is determined or undetermined is maintained in these memory sections as a determined/undetermined state. A determined/undetermined state bit is provided for each of the cassettes 22 (i.e., bits as many as the cassettes 22). For instance, where the number of bills stored in the bill cassette 22 has been already determined, the WS 18 sets the determined/undetermined state bit of that cassette 22 to "1". On the other hand, when the number of bills stored in the bill cassette 22 has not been determined yet, the WS 18 sets the determined/undetermined state bit of the cassette 22 to "0".

The undetermined state is the state of the cassette 22 immediately after it has been loaded into the cassette station 53 or the mobile cart 50 of the ATM operation supporting system by the clerk in charge. In this state, the stock amount (i.e., the number of bills remaining) in the cassette 22 are unidentified (undetermined) because they have not been counted yet. Contrary to this, the determined state is the state in which only the bills counted by the bill discriminating section are stored in the cassette 22. When all the bill cassettes 22 are in the determined state, it is possible for the ATM operation supporting system to know the stock amounts in the cassettes 22.

The WS 18 of the present embodiment grasps the determined/undetermined state of the number of bills stored in each bill cassette 22 in the ATM operation supporting system by examining the previously described memory section. When some bill cassette 22 is in the undetermined state, the WS 18 controls the mobile cart 50 so as to load that cassette 22 in the ATM 11, so that the number of bills stored in that bill cassette 22 is determined by means of the counting function of the ATM 11.

When the ATM 11 determines the number of bills stored in the bill cassette 22 by counting them, the WS 18 controls the mobile cart 50 such that the bill replenishment/collection operation is carried for that ATM 11 simultaneously with the counting operation.

Assuming that the mobile cart 50 handles a bill cassette 22 of determined state (i.e., the number of bills held therein has been determined). When the clerk in charge removes the cassette 22 from the ATM operation supporting system (i.e., the cassette station 53, the mobile cart 50, or the like), the cassette 22 enters an undetermined condition (in which the number of bills held therein becomes undetermined).

The previously described memory section is in the undetermined state when the power of the ATM operation supporting system is turned on or the ATM operation supporting system is reset. Further, when something (e.g., the clerk in charge) other than the mobile cart 50 loads the bill cassettes 22 into the cassette station 53, the memory section enters the undetermined state irrespective of its state before that happened. When the mobile cart 50 or the clerk in charge loads the bill cassette 22 into the ATM 11 and causes the ATM 11 to count the number of bills stored in the cassette 22, that cassette 22 changes from the undetermined state to the determined state.

As previously described, the cassette 22 does not enter the undetermined state in the case where the cassette 22 is handled by the mobile cart 50. Accordingly, the memory section related to the bill cassette 22 which is loaded into the cassette station 53 changes into the determined state only when the mobile cart 50 loads the determined cassette 22 into the cassette station 53.

Figure 32:
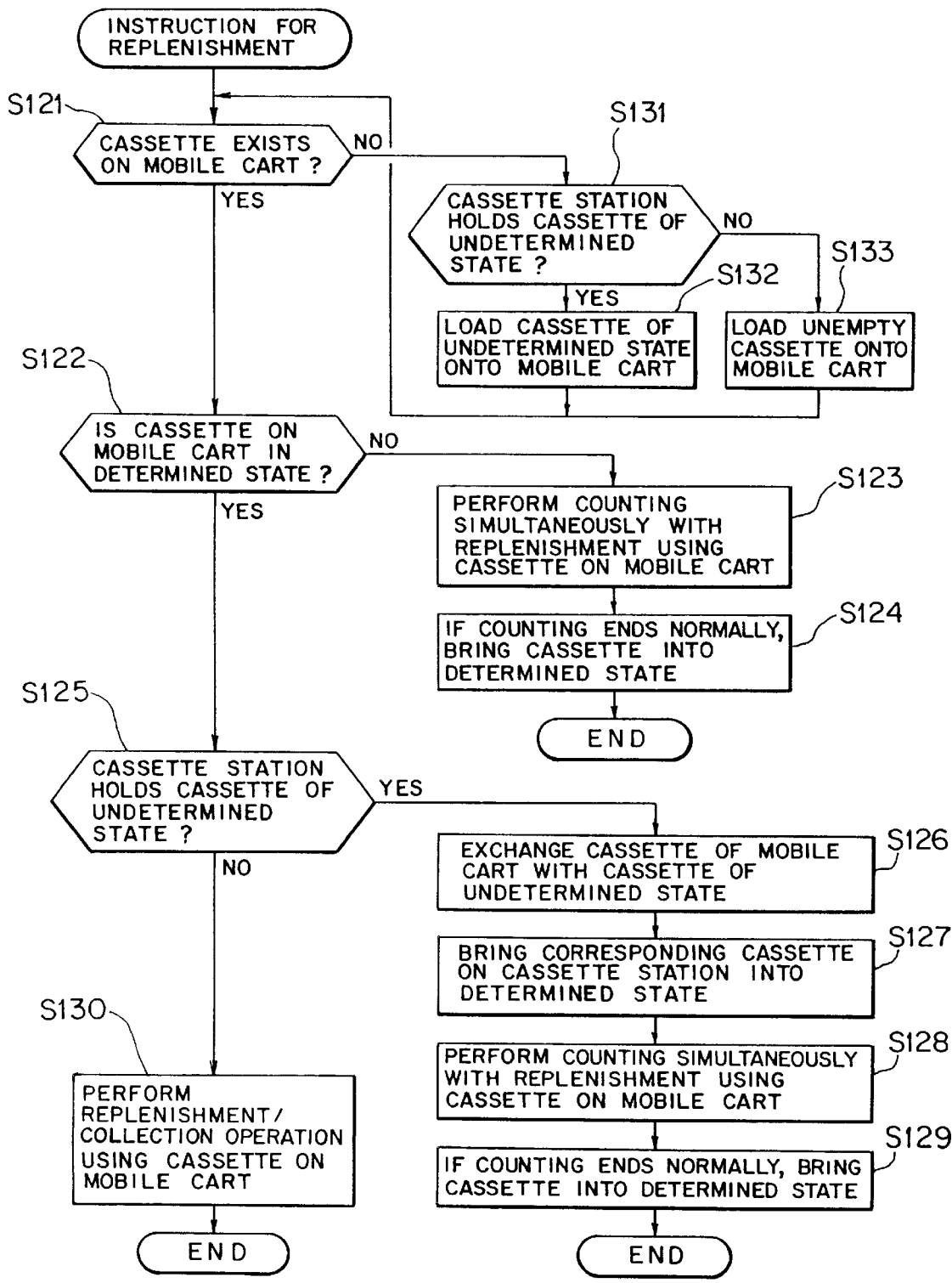
FIG. 32 is a flowchart for explaining the determination of the number of bills in a bill cassette according to the present embodiment.

Referring to a flowchart (steps S121 to S133) shown in FIG. 32, an explanation will be given of the operation of the ATM operation supporting system of the present embodiment for changing the bill cassette 22 from the undetermined state to the determined state.

When a replenishing instruction is issued from the WS 18, whether or not the bill cassette 22 is loaded onto the mobile cart 50 is checked first (step S121). When the cassette 22 is not loaded onto the mobile cart 50, the processing moves to step S131, which will be described later. On the other hand, when the bill cassette 22 is loaded onto the mobile cart 50, the processing moves to step S122. Upon reference to the memory section for setting the determined/undetermined state, it is checked whether the cassette 22 loaded onto the mobile cart 50 is in the determined state or the undetermined state. When the cassette is in the undetermined state, the processing proceeds to step S123. On the other hand, when the cassette is in the determined state, the processing proceeds to step S125.

The bill cassette 22 loaded onto the mobile cart 50 is installed into any suitable ATM 11 in step S123. The replenishing operation and the counting operation are simultaneously executed. When the counting operation is normally completed, the determined state regarding that bill cassette 22 is set in the memory section. Further, the cassette 22 is returned to the mobile cart 50, whereby the processing is completed (step S124).

Upon reference to the memory section for setting the determined/undetermined state, it is checked in step S125 whether the cassettes loaded in the cassette station 53 are in the determined state or the undetermined state. When there is a cassette which is in the undetermined state, the processing moves to step S126. On the other hand, when all of the cassettes are in the determined state, the processing moves to step S130.

The cassette 22 of the undetermined state loaded into the cassette station 53 and the cassette 22 of the determined state loaded onto the mobile cart 50 are exchanged with each other in step S126. The determined state is set in the memory section for the cassette 22 which was loaded into the cassette station 53 after the exchange of the cassettes (step S127). At this time, the cassette 22 loaded onto the mobile cart 50 enters the undetermined state as a result of the exchange of the bill cassettes 22, and hence that bill cassette 22 is loaded into any suitable ATM 11. Then, the replenishing operation and the counting operation are simultaneously executed in that ATM 11 (step S128). When the counting operation is normally completed, the determined state regarding that cassette is set in the memory section, and the cassette 22 is returned to the mobile cart 50. The processing is now completed (step S129).

When it has been judged in step S125 that all of the cassettes 22 loaded in the cassette station 53 are in the determined state and processing has moved to step S130, all of the cassettes 22 in the ATM operation supporting system are eventually in the determined state. Therefore, the bill replenishment/collection operation is carried out for the ATMs 11 using the cassette 22 loaded onto the mobile cart 50 until the cassette 22 becomes empty.

When it has been judged in step S121 that the cassette 22 is not loaded onto the mobile cart 50 and the processing has moved to step S131, it is checked whether the cassettes 22 loaded into the cassette station 53 are in the determined state or the undetermined state referring to the memory section for setting the determined/undetermined state, because the cassette 22 is not loaded onto the mobile cart 50. When there is a cassette 22 which is in the undetermined state, then undetermined cassette 22 is loaded onto the mobile cart 50 (step S132), and the processing moves to step S121. On the other hand, when all of the cassettes 22 are in the determined state, an unempty cassette 22 is loaded onto the mobile cart 50 (step S133), and the processing returns to step S121. When all of the cassettes 22 are empty, a warning is sounded to notify the clerk of the empty cassettes.

In this way, when the number of bills of any one of the bill cassettes 22 loaded in the mobile cart 50 and the cassette station 53 has not been determined yet, it can be determined immediately. Therefore, it is possible to very quickly know the number of bills stored in the ATM operation supporting system and to reflect that information in the bill replenishment/collection operation.

(b-7) Description of Double-checking Operation of Mobile Cart Position

As previously described with reference to FIGS. 3, 7, and 8, the ATM operation supporting system of the present embodiment is provided with the magnetic marking tapes 51A and the magnetic marking sensor 83 as means for enabling the mobile cart 50 to detect that it has moved according to the travel instruction from the WS 16 and has arrived at the target ATM 11. Further, each ATM 11 is provided with the arrival sensor 61 for detecting that the mobile cart 50 has arrived at the rear side of the ATM, as previously described with reference to FIGS. 11 and 12.

The WS 18 of the present embodiment carries out double-check on the basis of the result of detection of the magnetic marking tapes 51A by the magnetic marking sensor 83 and the result of detection of the arrival sensor 61 of the target ATM 11. As a result, it is possible to reliably recognize whether or not the mobile cart 50 has arrived at the target ATM 11, which in turn makes it possible to ensure the bill replenishment/collection operation between the target ATM 11 and the mobile cart 50.

Figure 33:
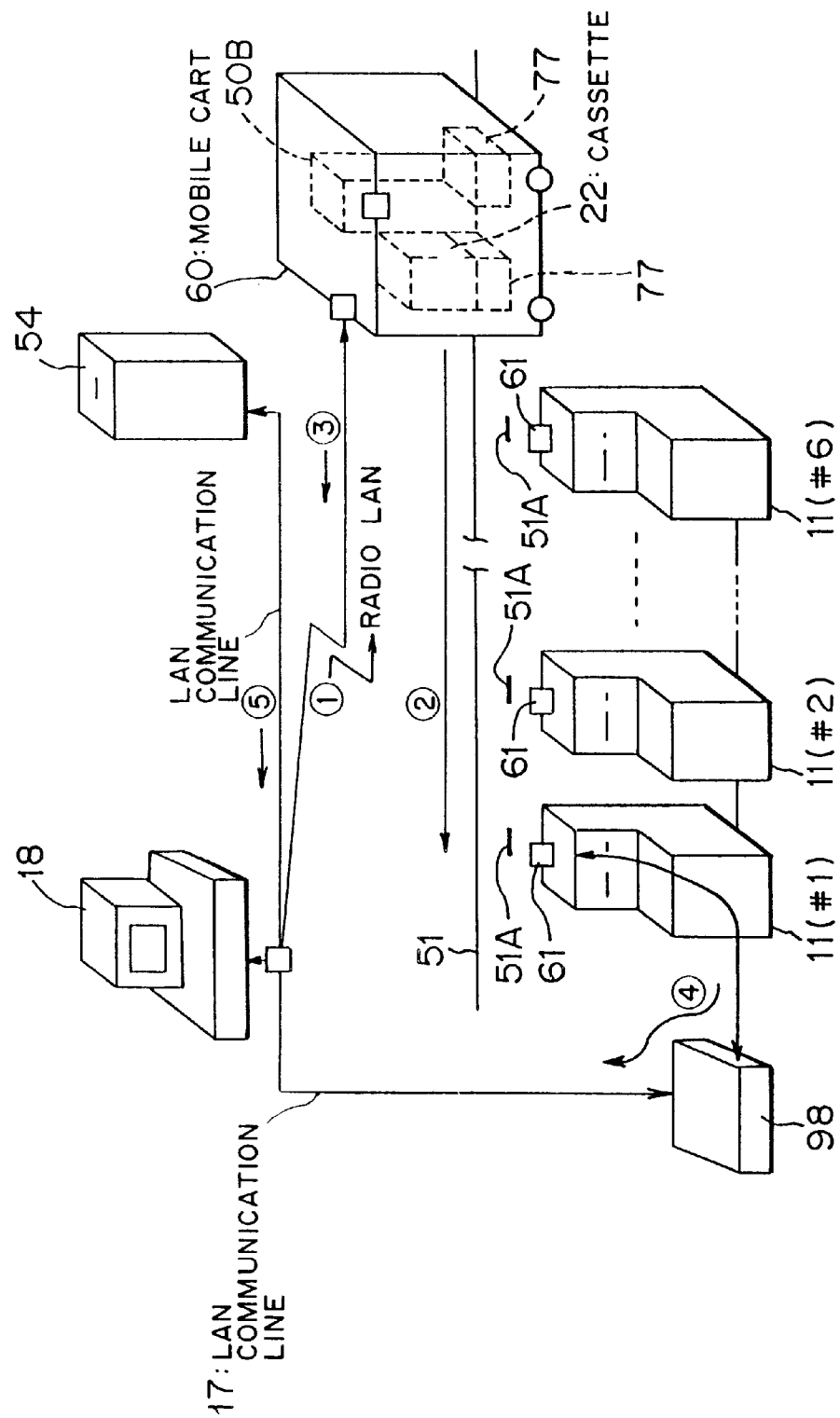
FIG. 33 is a schematic representation for explaining the principle of double-checking of the position of the mobile cart according to the present embodiment.

FIG. 33 is a schematic representation for explaining the principle of the double-check of the mobile cart position described above. In FIG. 33, the same reference numerals are used to designate same portions as those previously described, and their detailed explanations will be omitted here. In FIG. 33, reference numeral 98 denotes an adaptor interposed between the LAN 17 and the ATMs 11 for effecting communication of instructions/responses between the WS 18 and the ATMs 11. FIG. 33 also shows the case in which the six ATMs 11 (automatic machine number #1 to #6) are provided.

As shown in FIG. 33, when the bill replenishment/ collection operation is carried out for the ATMs 11, the WS 18 issues an instruction ① to the mobile cart 50 so as to travel to a target ATM of the six ATMs 11 (the ATM which is to be subjected to the bill replenishment/collection operation: for example, ATM #1). Upon receipt of that instruction ①, the mobile cart 50 travels to the instructed target ATM #1 [designated by arrow ②]. Then, the mobile cart 50 detects arrival at the ATM #1 with the help of the magnetic marking tapes 51A and sends a travel result response ③ back to the WS 18.

When the mobile cart 50 arrives at the target ATM #1, the arrival sensor 61 of that ATM #1 is operated. Then, information on the arrival of the mobile cart 50 [i.e., a mobile cart position recognition information ④] is sent to the STC 54 via the adaptor 98 and the LAN 17.

In the present embodiment, to detect and confirm the arrival of the mobile cart 50 at the target ATM #1, the WS 18 makes a first check based on the travel result response ③ received from the mobile cart 50 in the present embodiment. When the travel has been normally completed (i.e., the travel of the mobile cart 50 has been normally completed), the WS 18 requests the STC 54 to make a check based on the information ④ on the arrival of the mobile cart 50 received from the arrival sensor 61 of the target ATM #1. The WS 18 receives the result of that check as a mobile cart position recognition result response ⑤. Based on this response ⑤, the WS 18 conducts a second check. As a result of these checks (i.e., the double-check), it is possible to reliably confirm that the mobile cart 50 has traveled to and arrived at the target ATM #1.

Figure 34:
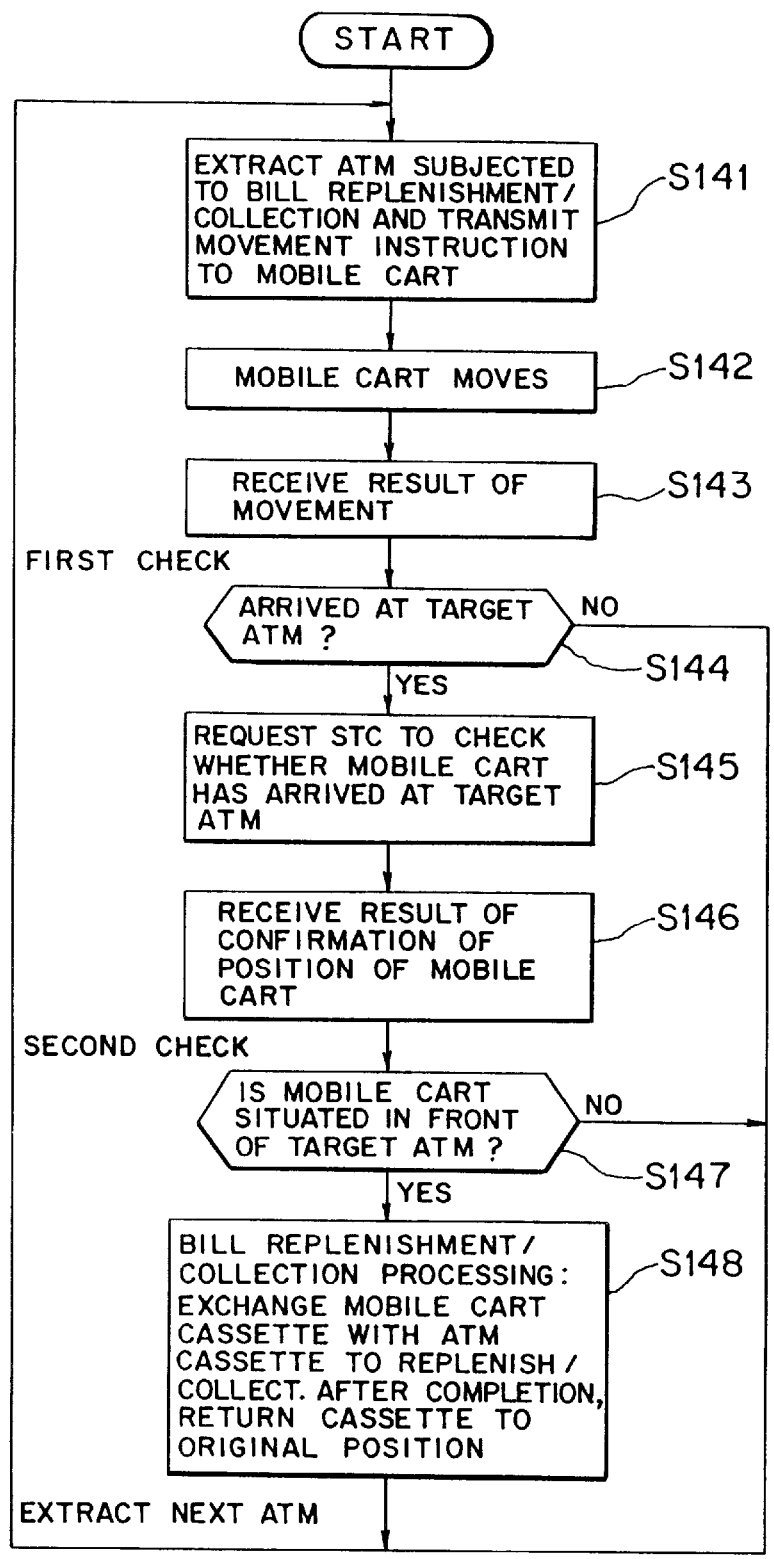
FIG. 34 is a flowchart for explaining the double-checking of the position of the mobile cart according to the present embodiment.

The operation of the WS 18 of the present embodiment having the double-check function as described with reference to FIG. 33 will now be described referring to a flowchart (i.e., steps S141 to S148) shown in FIG. 34.

The WS 18 first takes the target ATM 11 (the ATM 11 with automatic machine number #1 in this embodiment, and this ATM will be hereinafter described as ATM #1) from the ATMs 11 when carrying out the bill replenishment/ collection operation. The WS 18 sends the instruction ① to the mobile cart 50 via the radio LAN so as to travel to that ATM #1 (step S141).

After having traveled upon receipt of the instruction and stopped at the ATM #1 [see ② in FIG. 33; step S142], the mobile cart 50 detects the magnetic marking tapes 51A for the ATM #1 using the magnetic marking sensor 83. The result of that detection is sent to the WS 18 as the travel result response ③.

Upon receipt of the travel result response ③ from the mobile cart 50 (step S143), the WS 18 checks, referring to the travel result response ③, whether or not the mobile cart 50 could have arrived at the target ATM #1 (the first check: step S144).

When it has been judged that the mobile cart 50 has arrived at the target ATM #1 as a result of the first check, the WS 18 requests the STC 54 to check whether or not the mobile cart 50 has arrived at the target ATM #1 (step S145).

Upon reference to the information on the arrival of the mobile cart 50 [i.e., the mobile cart position recognition information ④] received from the target ATM #1, the STC 54 which received the request sends the fact as to whether or not the mobile cart 50 has arrived at the target ATM #1 (i.e., whether or not the arrival sensor 61 of the ATM #1 is operating) to the WS 18 as the mobile cart position recognition result response ⑤.

Upon receipt of the mobile cart position recognition result response ⑤ from the STC 54 (step S146), the WS 18 checks whether or not the mobile cart 50 stops in front of the target ATM #1 referring to the mobile cart position recognition result response ⑤ (the second check: step S147).

When it has been judged that the mobile cart 50 stops in front of the target ATM #1 as a result of the second check, the bill replenishment/collection operation is carried out (step S148). In short, the mobile cart 50 exchanges the mobile cart cassette 22 and the ATM cassette 22 with each other in the same manner as previously described, whereby the bill replenishment/collection operation for the ATM #1 is carried out. After the completion of the operation, the cassettes are exchanged with each other again.

When it has been judged that the mobile cart 50 has not arrived at the target ATM #1 yet as a result of the first or second check, the processing returns to step S141. Then, the WS 18 resends the travel instruction to the mobile cart 50.

The ATM operation supporting system efficiently uses the cash during the course of handling of a large amount of cash. Therefore, it is necessary to accurately carry out the bill replenishment/collection operation for the target ATM 11.

In the previously described embodiment, as a result of the double-check as to whether or not the mobile cart 50 could have arrived at the target ATM 11, whether or not the mobile cart 50 definitely stops at a predetermined position (i.e., the position at which the opening and closing of the automatic door 11D and the installation/removal of the cassette 22 can be carried out) with respect to the target ATM 11 is recognized. Therefore, the reliability of controlling the movement of the mobile cart 50 is considerably improved, which makes it possible to ensure the bill replenishment/collection operation of a large amount of cash (i.e., bills) between the target ATM 11 and the mobile cart 50.

(b-8) Description of Operation in the Event of Power Failure Arising During the Course of Bill Replenishment/Collection Operation During the course of the operation of the ATM operation supporting system of the present embodiment, the mobile cart 50 opens the automatic door 11D of the ATM and replaces the ATM cassette with the mobile cart cassette. At this time, when the processing for counting the number of bills stored in the mobile cart cassette 22 is performed, it takes about several minutes to tens of minutes [see, for example, FIG. 19(*a*)]. When power supply problems, such as a power failure, arise while the door 11D of the ATM is open, the power supply section 54B of the STC 54 which feeds electric power to the mobile cart 50 is switched to battery backup. When the battery is fully discharged, the door 11D of the ATM remains open.

To solve the above-described problem, the mobile cart 50 of the present embodiment has two modes, i.e., a battery chargeable mode and a battery nonchargeable mode. The mobile cart 50 is brought into one of these modes when the electricity collecting terminals 80A and 80B of the mobile cart 50 (see FIGS. 6 and 10 to 12) are in contact with the electricity feed terminal 81A and 81B (the power supply shoes; see FIGS. 3, 11, and 12) installed into the lower part of the door 11D of the ATM. In the battery nonchargeable mode, electric power is prevented from being supplied from the built-in battery of the STC 54 to the mobile cart 50 in an uncontrolled manner even in the event of a power failure. As a result, the battery of the STC 54 are prevented from becoming discharged.

Figure 13:
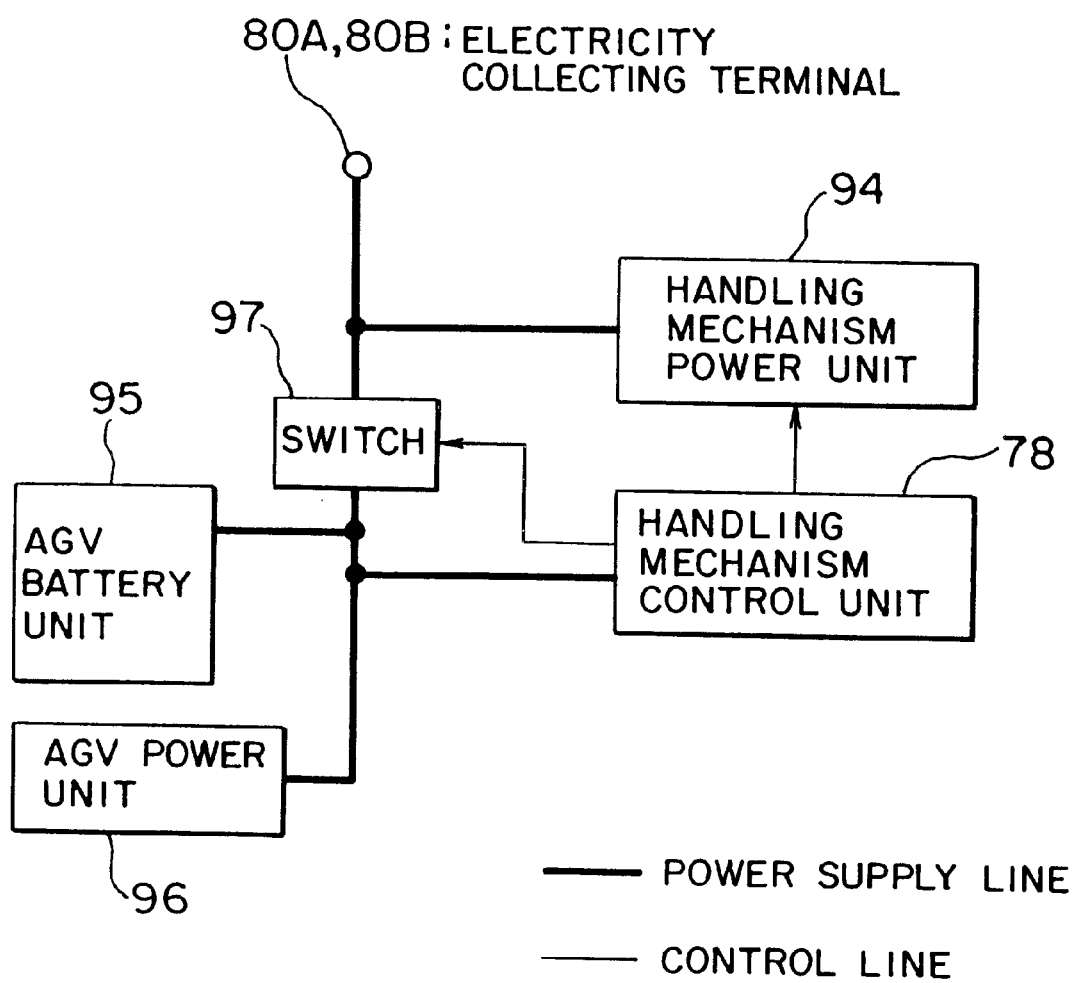
FIG. 13 is a block diagram showing a configuration for switching the mode of power supply for the handling mechanism according to the present embodiment.

That is, when the electricity collecting terminals 80A and 80B of the mobile cart 50 come into contact with the electricity feed terminal 81A and 81B of the ATM 11, the switch 97 is switched by the handling mechanism control section 78 (see FIG. 13). Then, the mobile cart 50 is brought into the battery chargeable mode in which the mobile cart 50 can be charged by the battery unit 95 of the automated guided vehicle. Subsequently, the WS 18 issues an instruction to the mobile cart 50 so as to replace the ATM cassette with the mobile cart cassette. Upon receipt of this instruction, the mobile cart 50 opens the door 11D of the ATM. At this time, the switch 97 is switched, whereby the mobile cart 50 is brought into the battery nonchargeable mode in which the mobile cart 50 is prevented from being charged by the battery unit 95 of the automated guided vehicle. Incidentally, the 60-second timer is activated. When the mobile cart 50 receives any message from the WS 18, or when the 60-second timer has clocked out, the mobile cart 50 closes the automatic door 11D of the ATM. The mobile cart 50 then returns to the battery chargeable mode.

The operation of the mobile cart 50 of the present embodiment having the above-described battery chargeable/ nonchargeable mode will be described with reference to a flowchart shown in FIG. 35 (steps S151 to S160).

For example, when the number of bills in some ATM 11 suddenly drops sharply in the ATM operation supporting system of the present embodiment, the mobile cart 50 stops at the rear side of that ATM 11 according to the instruction from the WS 18 in order to replenish that ATM 11 with bills. When the electricity collecting terminals 80A and 80B of the mobile cart 50 come into contact with the electricity feed terminal 81A and 81B of the ATM 11, whereby the mobile cart 50 is brought into the battery chargeable mode (step S151).

Subsequently, when the mobile cart 50 receives an instruction for opening the door of the ATM from the WS 18 via the radio LAN (step S152), the mobile cart 50 opens the automatic door 11D of the ATM (step S153).

The mobile cart 50 is provided with the previously described battery nonchargeable mode. Hence, when the mobile cart 50 opens the automatic door 11D of the ATM, it is switched from the battery chargeable mode to the battery nonchargeable mode as a result of the operation of the switch 97 and the handling mechanism control section 78 (step S154). The 60-second timer is then activated (step S155).

The instruction for opening the door of the ATM in step S152 is usually sent from the WS 18 to the mobile cart 50 in the form of one message together with the cassette replacement instruction and an instruction for closing the door of the ATM. The mobile cart 50, therefore, closes the automatic door 11D of the ATM after having replaced the cassettes with each other.

From the receipt of the message from the WS 18 by the mobile cart 50, it can be determined that the WS 18 is not in the power off state due to the power failure or the like. Even when the mobile cart 50 receives an abnormal message which is different from the above-described message, it can also be determined that the WS 18 is not in the power off state.

Accordingly, in the present embodiment, when the mobile cart 50 receives any message (in step S156) from the WS 18, the mobile cart 50 judges that the WS 18 is still in a power on state. The mobile cart 50 then stops the operation of the 60-second timer (step S157) and closes the automatic door 11D of the ATM (step S159).

On the other hand, when the power supply of the WS is turned off as a result of the occurrence of a power supply malfunction such as a power failure, the 60-second timer starts to operate, and clocked out after the lapse of 60 seconds (step S158). Upon the clocking out of the 60-second timer, the mobile cart 50 also closes the automatic door 11D of the ATM (step S159).

In this way, even when a power failure arises while the automatic door 11D of the ATM is open, the automatic door 11D of the ATM is automatically closed after the lapse of a maximum of 60 seconds since it was opened.

When the automatic door 11D of the ATM is closed, the mobile cart 50 is switched to the chargeable mode (step S160). The battery unit 95 of the mobile cart 50 can be charged by the power fed from the built-in battery of the STC 54 without any substantial influence on the amount of electric power necessary for the mobile cart 50 to travel.

Figure 36:
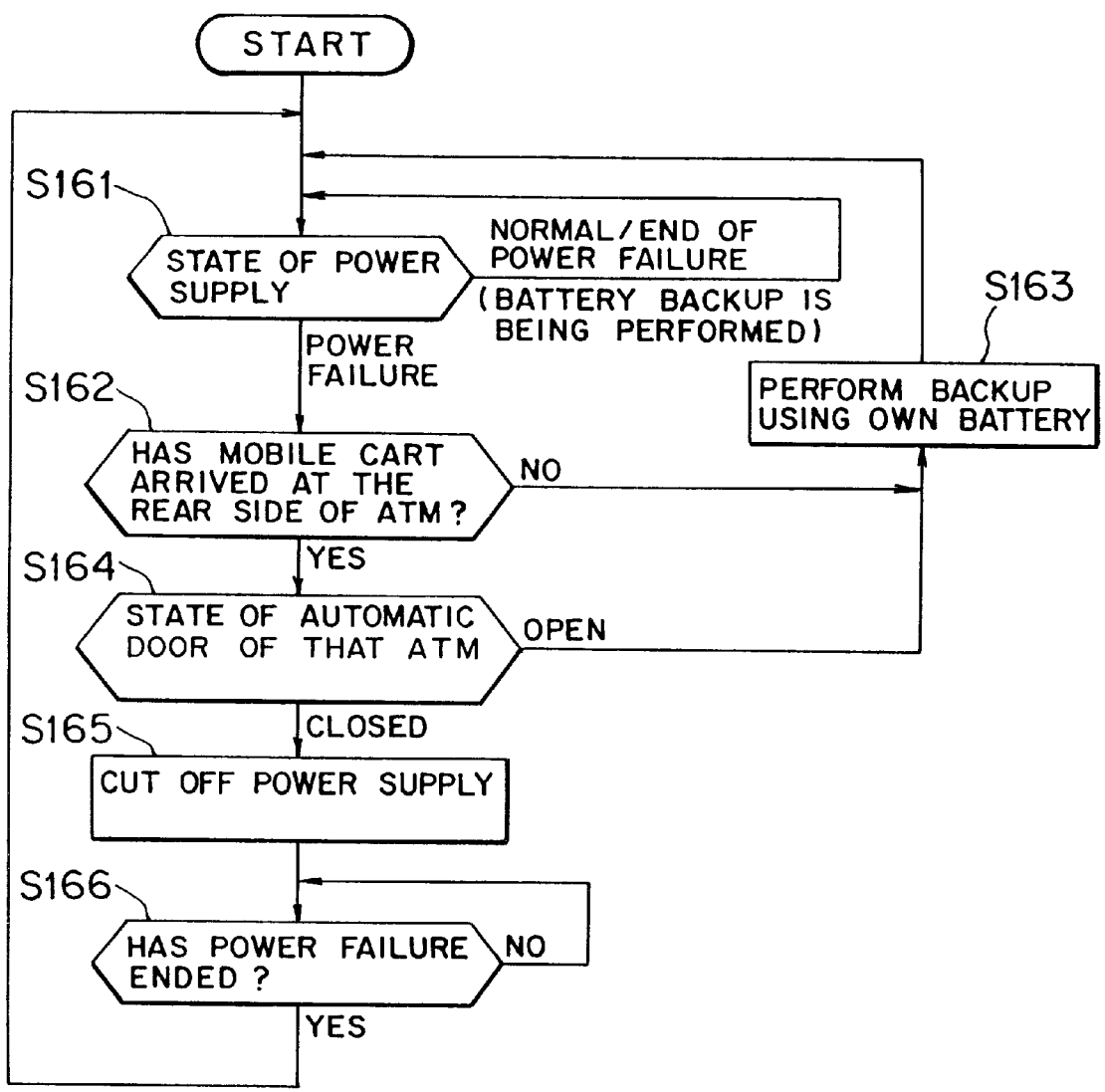
FIG. 36 is a flowchart for explaining the operation of a station controller according to the present embodiment.

The operation of the STC 54, which feeds electric power (i.e., the battery backup) to the mobile cart 50 and the ATM 11, will now be described with reference to a flowchart shown in FIG. 36 (steps S161 to S166).

The STC 54 feeds electric power to the electricity feed terminal 81A and 81B of the ATM 11 and the open-and-close drive system of the door 11D of the ATM. Further, the STC 54 is connected to the arrival sensor 51 and the door open/close detecting sensor 11b via a sensor cable, and it monitors the arrival of the mobile cart 50 at each ATM 11 and the opened and closed states of the automatic door 11D of the ATM depending on the information received from the sensors 61 and 11b.

The STC 54 monitors the state of the power supply every 50 milliseconds, for example (step S161). Upon detection of a power failure in step S161, the STC 54 checks whether or not battery backup operation is performed using the built-in batteries, that is, whether or not the mobile cart 50 is in the battery chargeable mode.

To carry out that check, the STC 54 initially checks whether or not the mobile cart 50 has arrived at the rear side of the ATM 11 (step S162). Even in the case of the ATM operation supporting system comprising the plurality of ATMs 11, the system is usually provided with only one mobile cart 50. Hence, when a response is output from the arrival sensor 61 of one of the ATMs 11, the STC 54 checks whether the automatic door 11D of that ATM 11 is closed or opened (step S164).

When the automatic door 11D is open, battery backup operation is started using the built-in batteries (step S163), and the processing returns to step S161. Even when none of the arrival sensors 61 respond at all (when it has been judged in step S162 that the mobile cart 50 had not arrived at the rear side of any of the ATMs 11), or when a plurality of sensors 61 respond (in the event of abnormality), the battery backup operation is unconditionally started using the built-in batteries (step S163), and the processing returns to step S161.

When the automatic door 11D of the ATM whose arrival sensor 61 has responded is closed, the STC 54 cuts off its power supply (in a command off state: step S165).

When the power is restored during the course of the backup operation in step S163 (when it has been judged in step S161 that the power has been restored), the backup operation is canceled. Then, the normal operation is resumed using the power supply section 54B. Even when the power is restored after the power source of itself has been cut off in step S165 (i.e., in the case of a positive judgment being made in step S166), the normal operation is resumed using the power supply section 54B.

When a power failure arises while the automatic door 11D is open, the power source of the WS 18 is cut off, and the STC 54 undergoes the battery backup operation by means of the built-in batteries. When the power failure continues still further, the WS 18 and the STC 54 remain in this state. However, the 60-second timer of the mobile cart 50 clocked out in the present embodiment. Therefore, the mobile cart 50 considers the WS 18 to be inactive and closes the automatic door 11D of the ATM. At this time, the electric power is fed to the open-and-close drive system of the automatic door 11D of the ATM from the STC 54 which undergoes the battery backup. Therefore, it is possible to close the automatic door 11D of the ATM.

As a result of the above-described operations, it is possible to prevent the automatic door 11D from remaining open by automatically closing it when the 60-second timer clocked out, even when a power failure occurs while the automatic door 11D of the ATM 11 is open. Consequently, the system security can be ensured.

So long as the automatic door 11D of the ATM is closed, the mobile cart 50 returns to the battery chargeable mode. However, when the power failure continues, the STC 54 cancels the battery backup and cuts off the power at the moment when the door 11D of the ATM is closed (see steps S164 and S165 in FIG. 36). Accordingly, the battery is not charged by means of the battery backup operation, which prevents the STC 54 from wasting power in the battery in an uncontrolled manner.

(b-9) Description of Accumulation/Output Function of Close Examination Information To manage the cash of the ATMs 11 installed in a bank, it is conventionally necessary to check the number of stored bills and the number of rejected bills (the information necessary for close examination) for each ATM 11, which imposes a great burden on the clerk in charge. In contrast, in the present embodiment, each ATM 11 is replenished with bills, or bills are collected from the ATM 11 through the bill cassette (the mobile cart cassette) 22 loaded onto the mobile cart 50 in the present embodiment. As a result of the ATM operation supporting system being provided with the functions which will be described later, it becomes unnecessary to perform works such as the counting of the number of bills stored in each ATM 11, which have conventionally been performed by the clerk to obtain the information necessary for close examination. Therefore, the burden on the clerk is significantly reduced.

Figure 37:
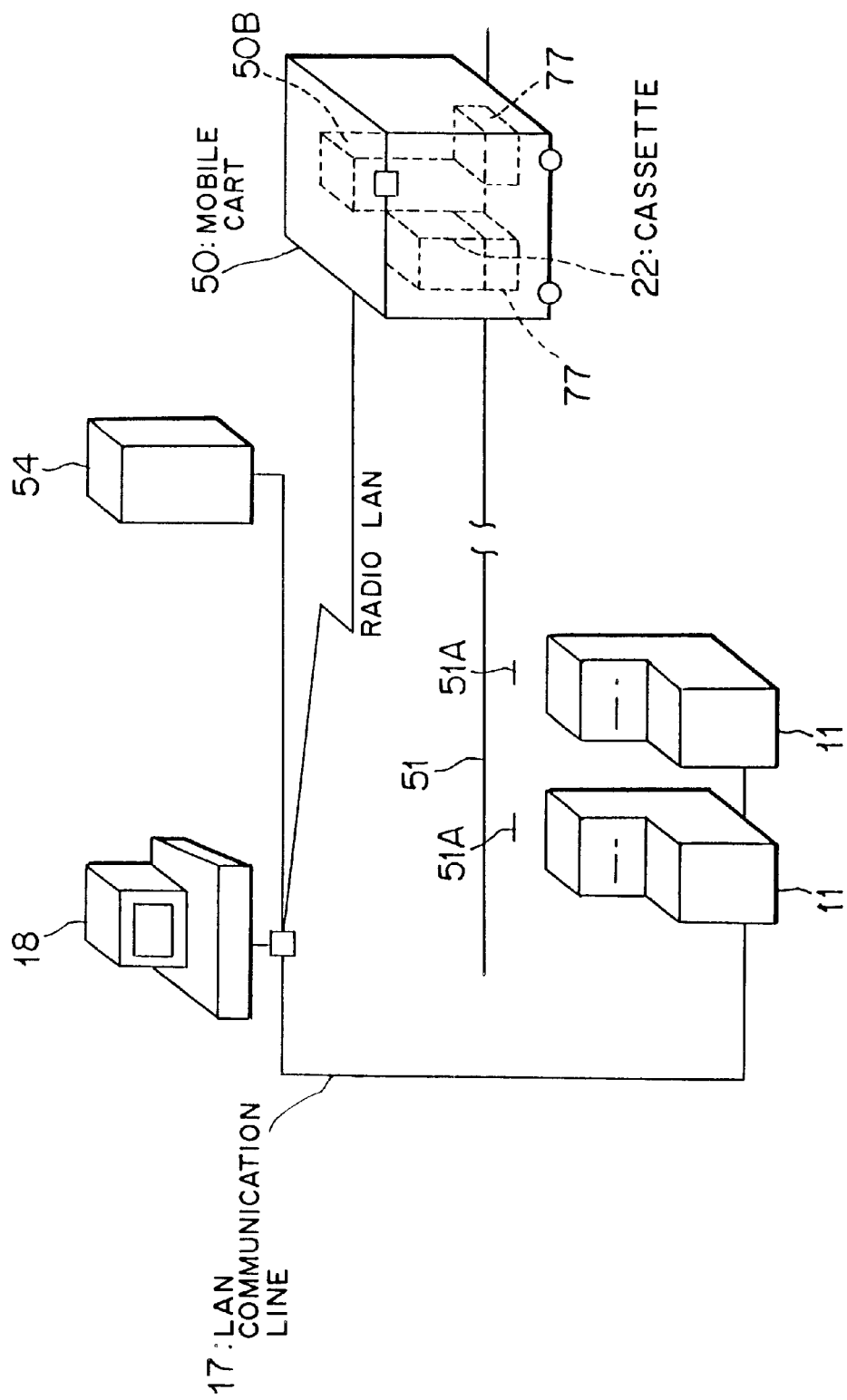
FIG. 37 is a diagram showing the schematic configuration of the ATM operation supporting system according to the present embodiment.

FIG. 37 is a schematic representation showing the schematic configuration of the ATM operation supporting system of the present embodiment. As shown in FIG. 37, the cassettes 22 which are loaded in the ATM 11 and the mobile cart 50 for transfer of bills, and the cassettes 22 which are loaded into the cassette station 53 (not shown in FIG. 37) in order to load bills onto the mobile cart 50 are subjected to close examination.

As previously described, the cable LAN (the LAN communication line) 17 is used as means which permits the WS 18 to receive information from the ATMs 11. Similarly, a wireless LAN is used as means which permits the WS 18 to receive the information from the mobile cart 50. Further, FIG. 37 shows the ATM operation supporting system comprising the two ATMs 11.

Figure 38:
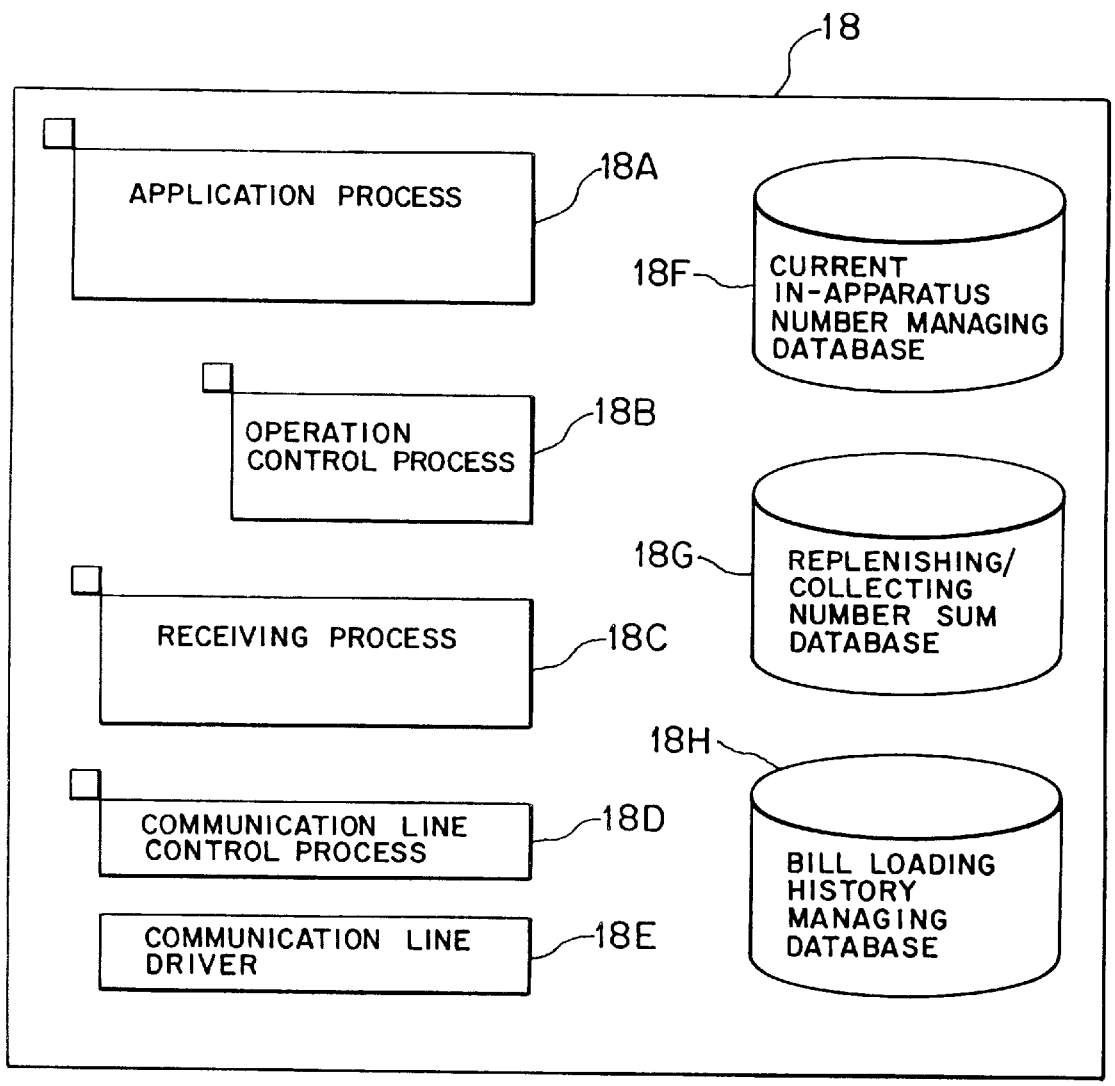
FIG. 38 is a block diagram showing an exemplary configuration of software loaded in a group control workstation according to the present embodiment.

FIG. 38 is a block diagram showing the illustrative configuration of software of the WS 18 which controls the movement of the bills and the history of the movement in the ATM operation supporting system of the present invention. As shown in FIG. 38, the WS 18 of the present embodiment comprises, as software, an application process 18A, an operation control process 18B, a receiving process 18C, a communication line control process 18D, a communication line driver 18E, a current in-apparatus number managing database 18F, a replenishing/collecting number sum database 18G, and a bill loading history managing database 18H.

The application process 18A monitors the replenishing operation using the mobile cart 50, and monitors the states of the ATMs 11. The operation control process 18B processes messages such as the operation instructions issued to the mobile cart 50 and the ATMs 11. The receiving process 18C analyzes the data obtained from the units (e.g., the ATMs 11, the mobile cart 50, the STC 54, etc.) and distributes the thus analyzed data to each of the precesses 18A, 18B, 18E, and 18D. The communication line control process 18D and the communication line driver 18E control the LAN 17 connected to the WS 18. The current in-apparatus number managing database 18F, the replenishing/collecting number sum database 18G, and the bill loading history managing database 18H hold various types of information necessary for the close examination in the present embodiment.

The WS 18 of the present embodiment comprises the following four functions: (1) a function for grasping the number of bills currently stored in each ATM 11 and the number of bills stored in the bill cassette 22 held on the mobile cart 50 and for displaying or printing out the grasped numbers; (2) a function for grasping, ATM by ATM, the total number of bills used for replenishing a plurality of ATMs 11 using the mobile cart 2 and the total number of bills collected from the plurality of ATMs 11 using the mobile cart 50, and for displaying or printing out the grasped numbers; (3) a function for grasping the history of variations in the number of bills used for replenishing a plurality of ATMs 11 using the mobile cart 50 and in the number of bills collected from the plurality of ATMs 11 using the mobile cart 50, and for displaying or printing out the history; and (4) a function for grasping the history of variations in the number of bills loaded onto the mobile cart 50 through the bill cassettes 22 and for displaying or printing out the history.

The above-described displayed output is produced by, e.g., the display 18L of the WS 18 (see FIGS. 2 and 3), whereas the above-described printed output is produced by the centralized journal output section 57 (see FIG. 2).

In the ATM operation supporting system of the present embodiment, when the WS 18 receives the messages related to the close examination from any one of various apparatuses (e.g., the mobile cart 50, the ATMs 11, the STC 54, etc.), the application process 18A or the operation control process 18B analyzes the message information, and the thus analyzed information is written into each of the databases 18F–18H.

Operations, that is, from the receipt of the messages to the construction of information in the current in-apparatus number managing database 18F, will be described with reference to a flowchart shown in FIG. 39 (steps S171 to S176).

Figure 39:
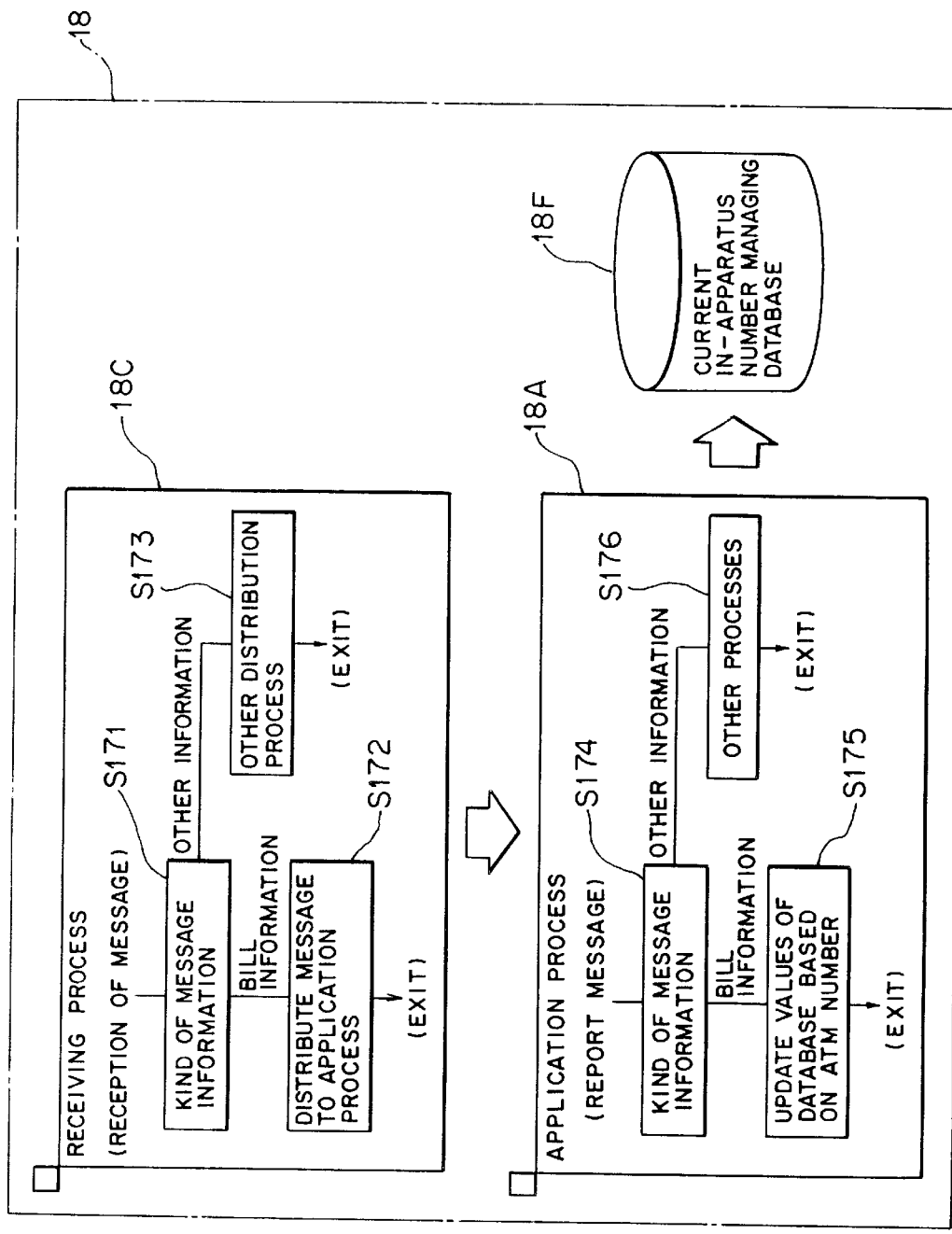
FIG. 39 is a flowchart for explaining operations required to construct information in a database for managing the number of bills currently remaining in the ATM according to the present embodiment.

As shown in FIG. 39, when the WS receives the messages from the units, the receiving process 18C analyzes the received data and identifies the type of message (step S171). When the result of the identification is relevant to the bill information, that information is sent to the application process 18A (step S172). However, when the information is relevant to information items other than the bill information, that information is sent to a corresponding process (step S173). The message is received in step S171 with the same timing at which the WS 18 sends the information collection request to the ATM 11 at predetermined periods.

The application process 18A which received the message from the receiving process 18C identifies the type of message information (step S174). When the message information is relevant to the bill information, an ATM number included in that message information is referred, and a value in the database 18F for managing the number of currently stored bills, which corresponds to the ATM number, is updated by use of the most current information included in the message information (step S175). When the message information received from the receiving process 18C is relevant to information items other than the bill information, the information is accordingly processed (step S176).

In the present embodiment, it is necessary to construct information not only in the current in-apparatus number managing database 18F, but also in the replenishing/collecting number sum database 18G and the bill loading history managing database 18H. For these databases 18G and 18H, the information is constructed in the same manner as for the database 18F. Hence, its detailed description will be omitted here.

Further, as previously described, the WS 18 also comprises the close examination function for producing an output of the information stored in the thus constructed databases 18F to 18H on the screen (the display) 18L or printing the information using a printer (the concentrated journal output section 57). The close examination function of the ATM operation supporting system of the present embodiment comprises the functions as shown in table 1.

TABLE 1

| TYPE OF CLOSE EXAMINATION FUNCTION | CONTENTS OF DISPLAY (PRINT) | DATABASE TO BE USED |
| --- | --- | --- |
| Stock amount information printing function | •Number of bills currently stored in each ATM<br>•Number of bills stored in bill cassettes loaded onto a mobile cart | Current in-apparatus number managing DB 18F |
| System subtotal display/printing function | •Number of bills currently stored in each ATM<br>•Number of bills stored in the bill cassette loaded in the mobile cart<br>•Sum of the number of bills used in a bill replenishment/collection operation performed by the mobile cart (the sum data regarding the number of bills used in the bill replenishment/collection operation are retained as they are) | Current in-apparatus number managing DB 18F<br>Replenishing/collecting number sum DB 18G |
| System subtotal counting/printing function | Count the number of bills stored in the cassette load onto the mobile cart using an ATM<br>•Number of bills currently stored in each ATM<br>•Number of bills stored in the bill cassette loaded in the mobile cart<br>•Sum of the number of bills used in a bill replenishment/collection operation performed by the mobile cart (the sum data regarding the number of bills used in the bill replenishment/collection operation are retained as they are) | Current in-apparatus number managing DB 18F<br>Replenishing/collecting number sum DB 18G |
| System total counting/printing | Count the number of bills stored in the cassette load onto the mobile cart using an ATM | Current in-apparatus number managing DB 18F |

TABLE 1-continued

| TYPE OF CLOSE EXAMINATION FUNCTION | CONTENTS OF DISPLAY (PRINT) | DATABASE TO BE USED |
|---|---|---|
| function | •Number of bills currently stored in each ATM<br>•Number of bills stored in the bill cassette loaded in the mobile cart<br>•Sum of the number of bills used in a bill replenishment/collection operation performed by the mobile cart (the sum data regarding the number of bills used in the bill replenishment/collection operation are cleared) | Replenishing/collecting number sum DB 18G |
| System bill loading history display/printing function | •Number of bills loaded in the mobile cart | Bill loading history managing DB 18H |

As a result, various kinds of information necessary for close examination are accumulated in the system, which allows the clerk to grasp the various kinds of information as a display on the display screen or as a result of printing out. Hence, the clerk can easily know various kinds of information necessary for close examination, which results in the burden on the clerk being considerably reduced.

(b-10) Description of Selection of Controllable ATM at the time of ATM Maintenance When the clerks perform maintenance of the ATM 11, units are taken out of the ATM 11, which makes it difficult for the mobile cart 50 to travel behind the ATMs 11. To prevent this problem, the processing shown in FIG. 40 has conventionally been carried out.

Figure 40:
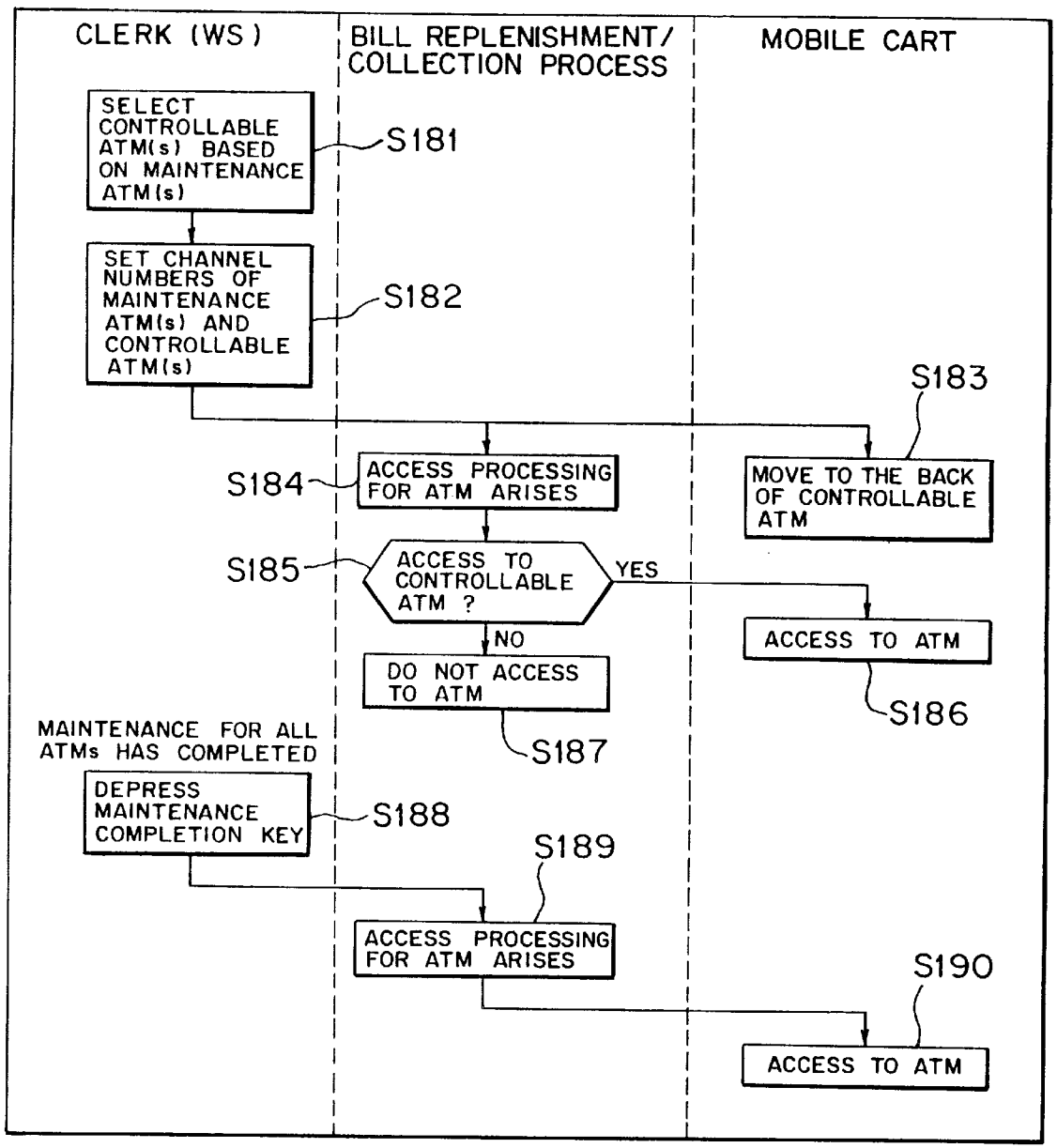
FIG. 40 is a flowchart for explaining the selection of a controllable ATM at the time of general maintenance of the ATM.

FIG. 40 is a flowchart for describing the conventional processing procedures (steps S181 to S190). As shown in FIG. 40, a clerk in charge selects the ATM which is controllable during the course of maintenance of the ATM 11 which needs maintenance (hereinafter referred to as a maintenance ATM), that is, the ATM 11 capable of undergoing the bill replenishment/collection operation performed by the mobile cart (hereinafter referred to as a controllable ATM), based on the position of the maintenance ATM 11 (step S181). The channel number of the maintenance ATM 11 (an ATM number) and the channel number of the controllable ATM 11 are set in the WS 18 (step S182).

Subsequently, the mobile cart 50 travels to the rear side of the controllable ATM (or one of the controllable ATMs 11) set in step S182 (step S183).

When access processing (the bill replenishment/collection operation) for the ATM 11 arises (step S184), the replenishment/collection process of the WS 18 determines whether or not that access processing is intended for the controllable ATM 11 (step S185). When the current access processing is intended for the controllable ATM 11, that processing for the ATM 11 is performed (step S186). However, the current access processing is not intended for the controllable ATM 11, that access processing is not executed (step S187).

When the maintenance of all the maintenance ATMs 11 is completed, the clerk presses a maintenance completion key provided on the WS 18 (provided on the keyboard 18N) (step S188). The selection/setting of controllable ATMs 11 (i.e., the setting of uncontrollable ATMs 11) is canceled, whereby all of the ATMs 11 are simultaneously returned to the normal state in which they are controllable.

When the access processing (i.e., the bill replenishment/collection operation) for the ATM 11 arises (step S189), the mobile cart 50 becomes possible to travel to the ATM 11 to be accessed and carry out the bill replenishment/collection operation as usual (step S190).

However, the processing as shown in FIG. 40 requires the clerk to select the ATMs 11 which can be accessed by the mobile cart 50 and set the thus selected ATMs 11 in the WS 18. Thus, the conventional processing imposes very large burden on the clerk. The setting/canceling operation can be executed only when the maintenance of all the maintenance ATMs 11 has been completed. For this reason, even when there exists a maintenance ATM 11 which has become controllable as a result of completion of maintenance, that ATM 11 cannot be added to the controllable ATMs 11, which results in the efficiency of the bill replenishment/collection operation performed by the mobile cart 50 being deteriorated.

To prevent this problem, in the present invention, the WS 18 has a function of automatically selecting the controllable ATMs 11 based on the position of the maintenance ATMs 11. That is, when the maintenance of each of the ATMs 11 is carried out, the WS 18 of the present embodiment selects the controllable ATMs 11 from the ATMs 11 not to be subjected to maintenance, on the basis of the positions of the maintenance ATMs 11. The WS 18 controls the mobile cart 50 so as to carry out the bill replenishment/collection operation for the thus selected ATMs 11.

When there are a plurality of ATMs 11 to be subjected to maintenance, the WS 18 selects the controllable ATM 11 from the ATMs 11 having finished undergoing maintenance and the original maintenance ATMs 11 to be subjected to maintenance, on the basis of the positions of the maintenance ATMs 11 from which the maintenance-completed ATMs 11 are excluded, every time the maintenance of one maintenance ATM 11 is completed. The WS 18 controls the mobile cart 50 so as to carry out the bill replenishment/collection operation for the thus selected ATMs 11.

Figure 41:
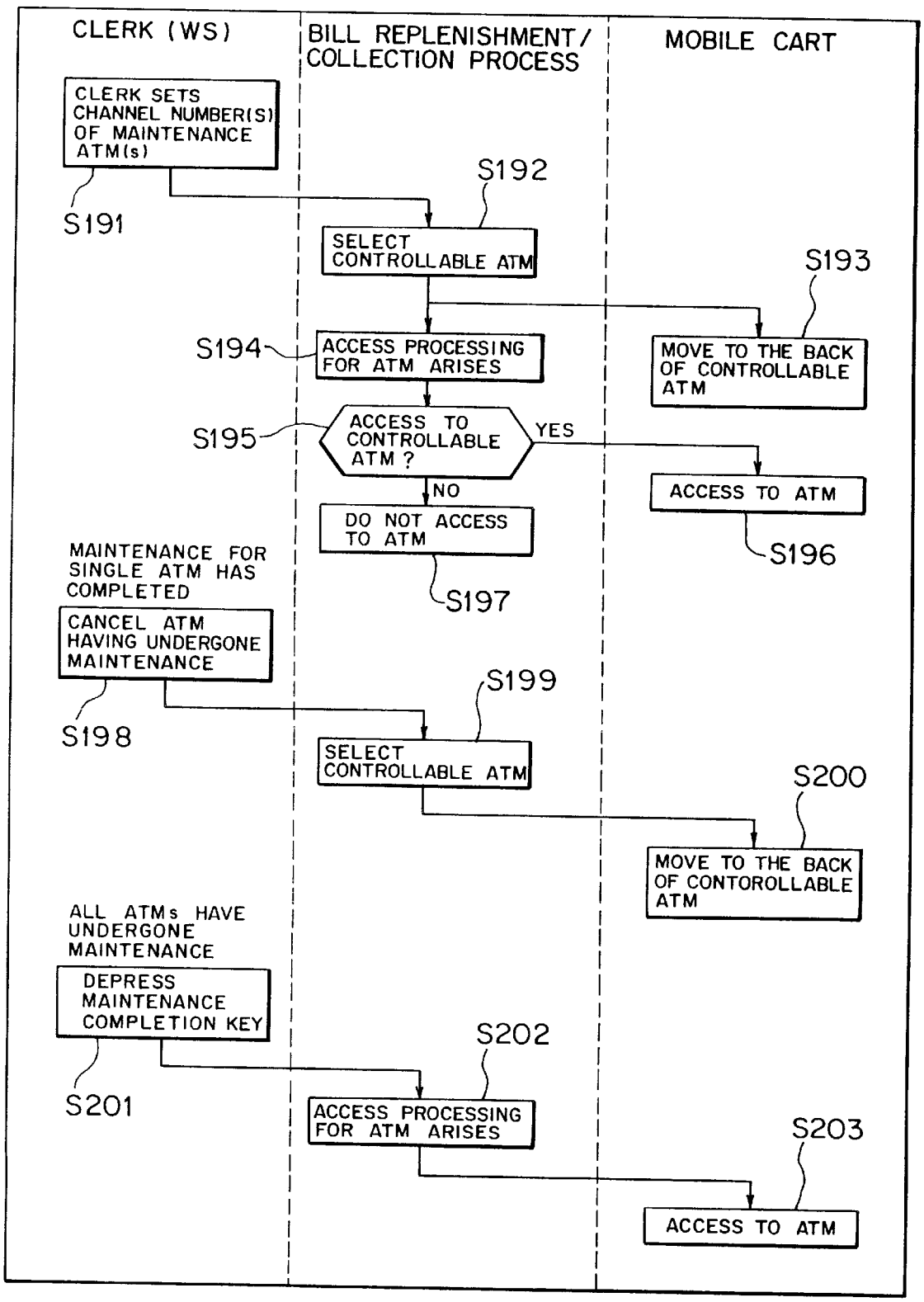
FIG. 41 is a flowchart for explaining the selection of the controllable ATM at the time of the maintenance of the ATM according to the present embodiment.

As a result of the use of the above-described function, access is made to each of the ATMs 11 according to the procedures as shown in, e.g., FIG. 41, in the present embodiment.

FIG. 41 is a flowchart for explaining the processing procedures of the present embodiment (steps S191 to S203). As shown in FIG. 41, the clerk in charge enters the channel number (the ATM number) of the maintenance ATM 11 to the WS 18 so as to specify the maintenance ATM 11 (step S191). When the maintenance ATM 11 is specified, the replenishment/collection process of the WS 18 automatically selects the controllable ATM 11 on the basis of the position of the specified maintenance ATM 11 (step S192).

After the controllable ATM 11 has been selected in step S192, the mobile cart 50 travels to the rear side of the controllable ATM 11 (or the rear side of one of the controllable ATMs 11) selected in step S192 according to the same procedures as those shown in FIG. 40 (step S193).

When the access processing (the bill replenishment/collection operation) for the ATM 11 arises (step S194), the replenishment/collection process of the WS 18 determines whether or not that access processing is intended for the controllable ATM 11 (step S195). When the current access processing is intended for the controllable ATM 11, that processing for the ATM 11 is executed (step S196). However, the current access processing is not intended for the controllable ATM 11, that access processing is not executed (step S197).

So long as the maintenance of at least one ATM 11 is completed, the clerk enters the cancel instruction for that ATM 11, for which maintenance has been completed, together with the channel number of that ATM 11 from the WS 18 (step S198). The replenishment/collection process of the WS 18, which received the cancel instruction, automatically selects the controllable ATM 11 again on the basis of the positions of the maintenance ATMs 11 from which the ATM specified in step S198 is excluded (step S199). The WS 18 causes the mobile cart 50 to move to the rear side of the controllable ATM 11 (or the rear side of one of a plurality of controllable ATMs 11) selected in step S199 (step S200). The processing (not shown in FIG. 40) which is similar to that performed in steps S194 to S197 is carried out.

When the maintenance of all the maintenance ATMs 11 is completed, the clerk presses the maintenance completion key disposed on the WS 18 (provided on the keyboard 18N or the like) in the same manner as the steps S188 to S190 shown in FIG. 40 (step S201). Thus, the selection/setting of the controllable ATM 11 (i.e., the setting of the uncontrollable ATM 11) is canceled, whereby all of the ATMs 11 can be simultaneously returned to the normal state in which they are controllable.

When the access processing (the bill replenishment/collection operation) for the ATM 11 arises (step S202), the mobile cart 50 becomes possible to travel to the ATM 11 to be accessed, and carry out the processing as usual (step S203).

As shown in FIG. 41, in the present embodiment, the selection of the controllable ATM 11 is automatically carried out in the WS 18, which results in the burden on the clerk being considerably reduced. Further, since the ATMs for which maintenance has been completed can be sequentially added to the controllable ATMs 11, the efficiency of the bill replenishment/collection operation performed by the mobile cart 50 can be improved. When the maintenance of all the maintenance ATMs 11 is completed, it becomes possible to simultaneously return all the ATMs 11 to the normal state, in which they are controllable, as in the conventional manner.

FIGS. 42(a) to 42(c) show specific examples of the selection of the controllable ATM by the WS 18 (the replenishment/collection process) of the present embodiment.

In the example shown in FIG. 42(a), six ATMs #1 to #6 are provided. The mobile cart 50 travels along one free track (a magnetic tape) 51 laid behind the ATMs #1 to #6. Only the ATM #3 is specified as the maintenance ATM 11. In this case, the WS 18 refers to the number of ATMs on either side of the ATM #3 and selects the set of a larger number of ATMs as the controllable ATM 11. In other words, three ATMs #4 to #6 are subjected to control in the example shown in FIG. 42(a).

In the example shown in FIG. 42(b), twelve ATMs #1 to #12 are provided. The mobile cart 50 travels along one free track (a magnetic tape) 51 laid behind the ATMs #1 to #12. The four ATMs #1, #3, #4, and #9 are specified as the maintenance ATMs 11. In this case, the WS 18 refers to the number of ATMs between the specified maintenance ATMs 11 and selects the set of largest number of ATMs as the controllable ATM 11. In other words, the five ATMs #5 to #9 are subjected to control in the example shown in FIG. 42(b).

When the maintenance ATM 11 is specified as shown in FIG. 42(b) and the ATM #9 is released from the maintenance state as a result of completion of the maintenance, the WS 18 selects the controllable ATM 11 again. As a result, the eight ATMs #5 to #12 become subjected to control this time as shown in FIG. 42(c).

In this way, it becomes unnecessary for the clerk to set and enter the ATMs 11 capable of undergoing the bill replenishment/collection operation one by one at the time of maintenance of the ATMs. Consequently, the clerk's operations are simplified, and errors arising when the clerk enters the ATM 11 capable of undergoing the bill replenishment/collection operation into the WS can be eliminated. Therefore, the operational support can be carried out extremely efficiently.

As has been described above, the ATM operation supporting system of the present embodiment makes it possible to manage the number of bills stored in the ATM 11 and to replenish each ATM 11 with bills, or collect bills therefrom, using the mobile cart 50. As a result, it becomes unnecessary for the clerk in charge to perform the bill replenishment/collection operation, which makes it possible to realize centralized management of cash in the ATMs and to appropriately manage the cash with a reduced amount of know-how. Consequently, the operational burden on the clerk in charge is significantly eased. Further, it becomes possible to optimize the amount of cash set in the ATM and the time to replenish the ATM with bills or collect bills therefrom. Consequently, it becomes possible to considerably reduce the total amount of money set in the ATM.

The use of the counting mechanism of the ATM 11 enables the counting of the number of bills stored in the bill cassette 22 without additionally providing a special counting mechanism. Therefore, the ATM operation supporting system can be simplified.

Although the present invention has been described with reference to the embodiment in which two bill cassettes 22 are held in the cassette station 53 and two bill cassettes 22 are held on the mobile cart 50, the present invention is not limited to these numbers. Similarly, although cases in which the number of ATMs is set to 2, 4, 6, and 12, respectively are explained in the above-described embodiment, the present invention is not limited to these numbers.

What is claimed is:

1. An ATM operation supporting system for managing the number of bills in a plurality of ATMs, said system comprising:
   a mobile cart movable to each ATM and having a handling mechanism installing a bill cassette into each ATM in a bill replenishment operation and removing said bill cassette from each ATM in a bill collection operation;
   a counting section generating a count of the number of bills stored in said bill cassette; and
   a control section generating a control signal to said mobile cart, based on the number of bills in each ATM and the count of the number of bills stored in said bill cassette generated by said counting section, the control signal causing said mobile cart to perform at least one of the bill replenishment and collection operations so that the number of bills in said ATMs are balanced.

2. The ATM operation supporting system according to claim 1, wherein said counting section is disposed within each of said plurality of ATMs.

3. The ATM operation supporting system according to claim 1, wherein said control section generates the control signal to said mobile cart to perform at least one of the bill replenishment and collection operations so that the numbers of bills in said ATMs are collectively balanced, when said bill cassette is set on said mobile cart and when at least one of a preset collective replenishment time and a collection time is reached.

4. The ATM operation supporting system according to claim 1, wherein said control section periodically estimates the demanded number of bills of each ATM based on variations in the number of bills in each ATM, and generates the control signal to said mobile cart to perform at least one of the bill replenishment and collection operations in accordance with the demanded number of bills so that the number of bills in ATMs are balanced.

5. The ATM operation supporting system according to claim 1, wherein said control section generates the control signal to said mobile cart to perform at least one of the bill replenishment and collection operations for an ATM in which the number of bills currently being stored has reached at least one of a near-end number of bills and a near-full number of bills.

6. The ATM operation supporting system according to claim 5, wherein when the number of bills in said bill cassette has reached at least one of the near-end number of bills and the near-full number of bills, said control section generates the control signal to said mobile cart to perform at least one of the bill replenishment and collection operations so that the number of bills in said bill cassette falls within a range between the near-end number of bills and the near-full number of bills.

7. The ATM operation supporting system according to claim 1, wherein the number of bills in said bill cassette loaded onto said mobile cart is a preset number and said control section generates the control signal to said mobile cart to perform at least one of the bill replenishment and collection operations so that the number of bills in said bill cassette becomes equal to the preset number.

8. The ATM operation supporting system according to claim 1, wherein said control section, in generating the control signal, determines the order in which said mobile cart carries out at least one of the bill replenishment and collection operations for said ATMs, based on a determination of whether to execute the bill replenishment operation or the bill collection operation, the number of bills to be used in the bill replenishment operation or collected in the bill collection operation, and the type of bills to be used in the bill replenishment operation or collected in the bill collection operation.

9. The ATM operation supporting system according to claim 1, further comprising a plurality of bill cassettes, and wherein said control section, in generating the control signal, identifies one of the plurality of bill cassette to be used for the bill replenishment and collection operations for each ATM, based on a determination of whether the number of bills in each bill cassette has already been counted, a determination of whether said one of the plurality of bill cassettes has already been loaded onto said mobile cart, and the number of bills in each of the plurality of bill cassettes.

10. The ATM operation supporting system according to claim 1,
wherein each of said plurality of ATMs includes a door on a rear side, and
wherein after said bill cassette has been installed into one of the plurality of ATMs subjected to at least one of the bill replenishment and collection operations, the door on the rear side of said one ATM is closed by said mobile cart simultaneously with said counting section generating the count.

11. The ATM operation supporting system according to claim 10, wherein said control section simultaneously generates the control signal to said mobile cart to perform at least one of the bill replenishment and collection operations for another one of said plurality of ATMs.

12. The ATM operation supporting system according to claim 2,
further comprising a cassette station having a plurality of bill cassettes,
wherein said handling mechanism transfers said bill cassettes between said mobile cart and said cassette station when said mobile cart is positioned with said cassette station, and
wherein said control section determines whether the number of bills in each bill cassette retained in said cassette station has been determined, as well as, whether the number of bills in each bill cassette loaded onto said mobile cart has been determined, and when there exists a bill cassette holding bills the number of which has not been determined yet, said control section generates the control signal to said mobile cart to load that bill cassette into one of said plurality of ATMs and to cause said counting section of the one ATM to determine the count of the number of bills in said bill cassette.

13. The ATM operation supporting system according to claim 12, wherein when the count of the number of bills in said bill cassette is being determined by said counting section, said control section control generates the signal to said mobile cart to perform the bill replenishment and collection operations for said ATM simultaneously.

14. The ATM operation supporting system according to claim 1,
wherein said control signal includes a movement instruction,
wherein said mobile cart includes position detecting means for detecting an arrival of said mobile cart at a target ATM according to the movement instruction,
wherein each of the plurality of ATMs includes an arrival sensor which detects the arrival of said mobile cart at the rear side of said ATM, and
wherein said control section, in generating the control signal, determines whether said mobile cart has arrived at said target ATM based on said position detecting means detecting the arrival of said mobile cart and said arrival sensor of said target ATM detecting the arrival of said mobile cart.

15. The ATM operation supporting system according to claim 1,
wherein each of said plurality of ATMs includes a door on a rear side,
wherein said mobile cart includes a timer clocking a predetermined time, said timer being activated when said mobile cart opens the door on the rear side of one of said plurality of ATMs which is subject to at least one of the bill replenishment and collection operations, and
wherein said mobile cart closes the door when said timer has clocked out the predetermined time.

16. The ATM operation supporting system according to claim 15, wherein each of said plurality of ATMs includes a charging mechanism which charges said mobile cart when said door of said one of said plurality of ATMs which is subject to at least one of the bill replenishment and collection operations by said mobile cart is closed and which does not charge said mobile cart when said door is open.

17. The ATM operation supporting system according to claim 1, wherein said control section manages the number of bills currently stored in each ATM and the number of bills stored in said bill cassette held on said mobile cart and outputs the numbers.

18. The ATM operation supporting system according to claim 1, wherein said control section manages, for each ATM, the total number of bills used for replenishing said plurality of ATMs using said mobile cart and the total number of bills collected from said plurality of ATMs using said mobile cart, and outputs the total numbers.

19. The ATM operation supporting system according to claim 1, wherein said control section manages a history of variations in the number of bills used for replenishing said plurality of ATMs using said mobile cart and in the number of bills collected from said plurality of ATMs using said mobile cart, and outputs the history.

20. The ATM operation supporting system according to claim 1, wherein said control section manages a history of variations in the number of bills loaded into said mobile cart through said bill cassettes and outputs the history.

21. The ATM operation supporting system according to claim 1, wherein said control section generates the control signal to said mobile cart to perform at least one of the bill replenishment and collection operations on a subset of said plurality of ATMs which are not being subjected to maintenance.

22. The ATM operation supporting system according to claim 21, wherein said subset of ATMs includes ATMs for which maintenance has been completed.

* * * * *

UNITED STATES PATENT AND TRADEMARK OFFICE
CERTIFICATE OF CORRECTION

PATENT NO. : 6,014,649
DATED : January 11, 2000
INVENTOR(S) : Kobayashi, et. al.

It is certified that error appears in the above-identified patent and that said Letters Patent is hereby corrected as shown below:

Title page, item [73] Assignee: change "Fujits Limited" to --Fujitsu Limited.

Signed and Sealed this

Twenty-seventh Day of June, 2000

Attest:

Q. TODD DICKINSON

Attesting Officer

Director of Patents and Trademarks